US011964491B2

(12) United States Patent
Aoki et al.

(10) Patent No.: US 11,964,491 B2
(45) Date of Patent: *Apr. 23, 2024

(54) CARTRIDGE, PRINTING MATERIAL SUPPLY SYSTEM, AND PRINTING APPARATUS

(71) Applicant: SEIKO EPSON CORPORATION, Tokyo (JP)

(72) Inventors: Yuji Aoki, Matsumoto (JP); Hiroshi Satoh, Nirasaki (JP)

(73) Assignee: SEIKO EPSON CORPORATION, Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 17/677,054

(22) Filed: Feb. 22, 2022

(65) Prior Publication Data

US 2022/0176704 A1 Jun. 9, 2022

Related U.S. Application Data

(60) Continuation of application No. 16/798,885, filed on Feb. 24, 2020, now Pat. No. 11,285,725, which is a (Continued)

(30) Foreign Application Priority Data

Jan. 13, 2012 (JP) ................................ 2012-005347
Jan. 25, 2012 (JP) ................................ 2012-013238
Feb. 6, 2012 (JP) ................................ 2012-022819

(51) Int. Cl.
*B41J 2/175* (2006.01)

(52) U.S. Cl.
CPC .......... *B41J 2/175* (2013.01); *B41J 2/17509* (2013.01); *B41J 2/1752* (2013.01); (Continued)

(58) Field of Classification Search
None
See application file for complete search history.

(56) References Cited

U.S. PATENT DOCUMENTS 5,847,731 A 12/1998 Kashimura et al.
5,847,736 A 12/1998 Kanbayashi et al.
(Continued)

FOREIGN PATENT DOCUMENTS

CA 2782610 A1 12/2011
CN 1874896 A 12/2006
(Continued)

OTHER PUBLICATIONS

Oct. 8, 2020 Office Action issued in U.S. Appl. No. 15/794,690.
(Continued)

*Primary Examiner* — Erica S Lin
(74) *Attorney, Agent, or Firm* — Oliff PLC

(57) ABSTRACT

A cartridge includes a concave portion. The concave portion has an opening, first and second side walls, and a bottom wall, and the bottom wall has a tilted surface tilted. The tilted surface is provided with a cartridge side terminal group. The first side wall is provided with a first restriction portion which restricts movements in a +Z axis direction and a +X axis direction of an apparatus side terminal unit, and the second side wall is provided with a second restriction portion which restricts movements in the +Z axis direction and a −X axis direction of an apparatus side terminal unit.

12 Claims, 45 Drawing Sheets

Related U.S. Application Data division of application No. 15/794,690, filed on Oct. 26, 2017, now abandoned, which is a division of application No. 14/879,593, filed on Oct. 9, 2015, now Pat. No. 9,821,557, which is a division of application No. 13/738,347, filed on Jan. 10, 2013, now Pat. No. 9,266,337.

(52) U.S. Cl.
CPC ....... *B41J 2/17526* (2013.01); *B41J 2/17546* (2013.01); *B41J 2/17553* (2013.01)

(56) References Cited

U.S. PATENT DOCUMENTS

| | | | |
|---|---|---|---|
| 5,896,151 | A | 4/1999 | Miyazawa et al. |
| 6,106,112 | A | 8/2000 | Okubo et al. |
| 6,203,147 | B1 | 3/2001 | Battey et al. |
| 6,220,702 | B1 | 4/2001 | Nakamura et al. |
| 6,422,674 | B1 | 7/2002 | Hinami et al. |
| 6,435,673 | B1 | 8/2002 | Hattori et al. |
| 6,588,880 | B1 | 7/2003 | Gasvoda et al. |
| 6,591,874 | B2 | 7/2003 | Credle, Jr. |
| 6,609,789 | B1 | 8/2003 | Hunt |
| 6,832,830 | B2 | 12/2004 | Seino et al. |
| 7,137,690 | B2 | 11/2006 | Kawamura et al. |
| 7,178,908 | B2 | 2/2007 | Katayama |
| 7,178,910 | B2 | 2/2007 | Suzuki et al. |
| 7,278,721 | B2 | 10/2007 | Shimizu et al. |
| 7,380,912 | B2 | 6/2008 | Silverbrook |
| 7,380,921 | B2 | 6/2008 | Nanjo et al. |
| 7,814,656 | B2 | 10/2010 | Prasad |
| 7,984,980 | B2 | 7/2011 | Kachi |
| D656,184 | S | 3/2012 | Iwamuro et al. |
| 8,197,045 | B2 | 6/2012 | Takeuchi |
| 8,346,105 | B2 | 1/2013 | Takahashi et al. |
| D682,929 | S | 5/2013 | Aoki et al. |
| D682,930 | S | 5/2013 | Aoki et al. |
| D682,931 | S | 5/2013 | Aoki et al. |
| D712,466 | S | 9/2014 | Nagashima et al. |
| 2001/0010532 | A1 | 8/2001 | Battey et al. |
| 2002/0140778 | A1 | 10/2002 | Yoshiyama et al. |
| 2003/0234844 | A1 | 12/2003 | Yamamoto et al. |
| 2004/0174418 | A1* | 9/2004 | Toba .................... B41J 2/17556 347/86 |
| 2005/0093942 | A1 | 5/2005 | Kawamura et al. |
| 2005/0151811 | A1 | 7/2005 | Shimizu et al. |
| 2006/0012638 | A1 | 1/2006 | Lee |
| 2006/0038865 | A1 | 2/2006 | Nagasaki et al. |
| 2006/0203045 | A1 | 9/2006 | Kobayashi et al. |
| 2006/0290722 | A1* | 12/2006 | Kitagawa ............... B41J 2/1752 347/7 |
| 2007/0229622 | A1 | 10/2007 | Kawamura |
| 2008/0049081 | A1 | 2/2008 | Hayashi et al. |
| 2008/0151018 | A1 | 6/2008 | Aoki et al. |
| 2008/0198211 | A1 | 8/2008 | Aoki et al. |
| 2008/0252669 | A1 | 10/2008 | Aoki et al. |
| 2008/0252702 | A1 | 10/2008 | Aoki et al. |
| 2008/0316249 | A1 | 12/2008 | Aoki et al. |
| 2009/0064501 | A1 | 3/2009 | Kimura et al. |
| 2009/0167828 | A1 | 7/2009 | Ito et al. |
| 2009/0256893 | A1 | 10/2009 | Kobayashi et al. |
| 2009/0303299 | A1 | 12/2009 | Gilson et al. |
| 2010/0091070 | A1 | 4/2010 | Kimura |
| 2010/0134574 | A1 | 6/2010 | Kobayashi et al. |
| 2011/0198360 | A1 | 8/2011 | Aoki |
| 2011/0199439 | A1 | 8/2011 | Aoki |
| 2011/0205284 | A1 | 8/2011 | Yoshino et al. |
| 2011/0279587 | A1 | 11/2011 | Kobayashi et al. |
| 2012/0056956 | A1 | 3/2012 | Kodama et al. |
| 2012/0147102 | A1 | 6/2012 | Aoki et al. |
| 2012/0200646 | A1 | 8/2012 | Karasawa et al. |
| 2012/0200871 | A1 | 8/2012 | Takahashi et al. |
| 2012/0212526 | A1 | 8/2012 | Karasawa et al. |
| 2013/0182050 | A1 | 7/2013 | Aoki et al. |
| 2013/0182051 | A1 | 7/2013 | Aoki et al. |
| 2013/0186513 | A1 | 7/2013 | Aoki et al. |
| 2013/0187993 | A1 | 7/2013 | Aoki et al. |
| 2013/0194357 | A1 | 8/2013 | Karasawa et al. |
| 2013/0201260 | A1 | 8/2013 | Aoki et al. |
| 2013/0278687 | A1 | 10/2013 | Karasawa et al. |
| 2013/0307908 | A1 | 11/2013 | Aoki et al. |
| 2014/0036012 | A1 | 2/2014 | Kobayashi et al. |

FOREIGN PATENT DOCUMENTS

| | | | |
|---|---|---|---|
| CN | 102285237 | A | 12/2011 |
| EP | 0 968 090 | A1 | 1/2000 |
| EP | 0 997 297 | A1 | 5/2000 |
| EP | 1 004 447 | A2 | 5/2000 |
| EP | 1 504 908 | A2 | 2/2005 |
| EP | 1 547 783 | A2 | 6/2005 |
| EP | 1 772 270 | A2 | 4/2007 |
| EP | 1 892 103 | A2 | 2/2008 |
| EP | 2 397 336 | A1 | 12/2011 |
| JP | S63-176635 | U | 11/1988 |
| JP | 2000-218813 | A | 8/2000 |
| JP | 2002-505212 | A | 2/2002 |
| JP | 2002-513340 | A | 5/2002 |
| JP | 2002-513341 | A | 5/2002 |
| JP | 2003-341086 | A | 12/2003 |
| JP | 2003-341100 | A | 12/2003 |
| JP | 2006-072285 | A | 3/2006 |
| JP | 2006-082294 | A | 3/2006 |
| JP | 2006-212846 | A | 8/2006 |
| JP | 2007-083677 | A | 4/2007 |
| JP | 2007-098594 | A | 4/2007 |
| JP | 2007-196648 | A | 8/2007 |
| JP | 2007-245 738 | A | 9/2007 |
| JP | 2007-230249 | A | 9/2007 |
| JP | 2007-268984 | A | 10/2007 |
| JP | 2008-087159 | A | 4/2008 |
| JP | 2008-273173 | A | 11/2008 |
| JP | 2009-226687 | A | 10/2009 |
| JP | 2009-269371 | A | 11/2009 |
| JP | 2010-111116 | A | 5/2010 |
| JP | 2010-228377 | A | 10/2010 |
| JP | 4843112 | B1 | 12/2011 |
| JP | 2012-000854 | A | 1/2012 |
| JP | 2012-000858 | A | 1/2012 |
| WO | 98/55318 | A1 | 12/1998 |
| WO | 98/55324 | A1 | 12/1998 |
| WO | 99/44830 | A1 | 9/1999 |
| WO | 2006/082836 | A1 | 8/2006 |

OTHER PUBLICATIONS

Jun. 8, 2021 Office Action Issued in U.S. Appl. No. 16/798,885.

Nov. 23, 2021 Notice of Allowance Issued In U.S. Appl. No. 16/798,885.

Non-Final Office Action on U.S. Appl. No. 151794,690 dated Mar. 24, 2020.

"Modular Connectors," product sheet, Assmann WSW Components GmbH, Jan. 2009 (34 pgs.).

* cited by examiner

CARTRIDGE, PRINTING MATERIAL SUPPLY SYSTEM, AND PRINTING APPARATUS

CROSS-REFERENCE TO RELATED APPLICATIONS

This application is a continuation of U.S. patent application Ser. No. 16/798,885, filed Feb. 24, 2020, which is a divisional application of U.S. patent application Ser. No. 15/794,690, filed Oct. 26, 2017, now abandoned, which is a divisional of U.S. patent application Ser. No. 14/879,593, filed on Oct. 9, 2015, now U.S. Pat. No. 9,821,557, which is a divisional application of U.S. patent application Ser. No. 13/738,347, filed on Jan. 10, 2013, now U.S. Pat. No. 9,266,337, which claims priority under 35 U.S.C. § 119 to Japanese Application No. 2012-022819 filed on Feb. 6, 2012, No. 2012-005347 filed on Jan. 13, 2012, and No. 2012-013238 filed on Jan. 25, 2012, each of which is hereby incorporated by reference in its entirety.

BACKGROUND

1. Technical Field

The present invention relates to a cartridge which accommodates a printing material therein, a printing material supply system which includes a cartridge and a printing apparatus, and printing apparatus to which the cartridge is detachably mounted.

2. Related Art

A printer which is an example of a printing apparatus has a cartridge that accommodates ink therein and is detachably mounted thereto, and performs printing by supplying the ink from the cartridge to a printing head. Recently, a cartridge in which a circuit board that stores information regarding ink (for example, the color of ink) is mounted is used (for example, JP-A-2003-341100, JP-A-2007-230249, Specification of U.S. Pat. No. 6,203,147, JP-T-2002-505212, and JP-T-2002-513341). The circuit board mounted in the cartridge includes a storage device that stores the information regarding the ink and a terminal group (also referred to as a "cartridge side terminal group") for electrical connection to a printer. As the cartridge is mounted to a cartridge mounting unit of the printer, the cartridge side terminal group comes into contact with a terminal group (also referred to as an "apparatus side terminal group") provided in the cartridge mounting unit. Accordingly, each terminal of the cartridge side terminal group is electrically connected to the corresponding terminal of the apparatus side terminal group, such that signal reception and transmission between the printer and the cartridge is performed.

However, in the techniques of JP-A-2003-341100 and JP-A-2007-230249, due to manufacturing errors in the cartridge mounting unit or the cartridge, there is a possibility that the cartridge side terminal group and the apparatus side terminal group may not come into contact with each other so as to be electrically connected.

In the technique of Specification of U.S. Pat. No. 6,203,147, a connector provided with the apparatus side terminal group is movably provided in the cartridge mounting unit. Specifically, the connector is configured so as to be movable in a direction (the X axis direction and the Y axis direction in FIG. 7 of Specification of U.S. Pat. No. 6,203,147,) orthogonal to an insertion direction (the Z axis direction in FIG. 7 of Specification of U.S. Pat. No. 6,203,147,) of the cartridge. In addition, in the technique of Specification of U.S. Pat. No. 6,203,147, a recessed portion is provided in the front surface of the cartridge, and the cartridge side terminal group is arranged on the side surface in the recessed portion along the insertion direction. In this technique, since the connector is configured to be movable, the connector is moved according to the position of the cartridge when the cartridge is mounted to the cartridge mounting unit. Accordingly, there is an attempt to achieve proper connection between the cartridge side terminal group and the apparatus side terminal group.

In the technique described above, positioning in the X axis direction and the Y axis direction of the connector is performed by four side surfaces of the recessed portion in which the cartridge side terminal group is arranged. Therefore, errors in the shape of the recessed portion occur due to design errors in the cartridge, and thus there is a possibility that contact between the cartridge side terminal group and the apparatus side terminal group may not be properly achieved.

In addition, in the technique described above, there is a possibility that the apparatus side terminal group may rub against the side surface of the recessed portion or the cartridge side terminal group between when the cartridge is inserted into the cartridge mounting unit and when the cartridge is mounted to the cartridge mounting unit. There may be cases where the apparatus side terminal group rubs against the side surface of the recessed portion or the like, the constituent member of the cartridge is cut, and shavings are generated. In addition, there may be cases where dust is pulled therein due to static electricity generated by rubbing of the apparatus side terminal group against the side surface of the recessed portion or the like. When shavings, dust, and the like are present at the periphery of the apparatus side terminal group and the cartridge side terminal group, there may be cases where contact between the apparatus side terminal group and the cartridge side terminal group is not properly achieved.

In addition, in the techniques of JP-T-2002-505212 and JP-T-2002-513341, the connector is configured to be movable in the X axis direction which is a direction perpendicular to the insertion direction of the cartridge. In addition, in the techniques of JP-T-2002-505212 and JP-T-2002-513341, the recessed portion is provided in the front surface of the cartridge, and the cartridge side terminal group is provided on the bottom surface that is perpendicular to the insertion direction of the recessed portion. In the techniques of JP-T-2002-505212 and JP-T-2002-513341, as a guiding member provided in the recessed portion is inserted into a guiding slot of the cartridge mounting unit, positioning of the cartridge side terminal group and the apparatus side terminal group is performed.

In the techniques described above, the cartridge side terminal group is provided on the bottom surface of the recessed portion which is recessed in the reverse direction to the insertion direction and has a relationship of opposing the apparatus side terminal group in the insertion direction. Therefore, when the cartridge is attached to and detached from the cartridge mounting unit, the possibility of the apparatus side terminal group rubbing against the cartridge may be reduced. However, the cartridge side terminal group and the apparatus side terminal group come into point contact with each other between when the cartridge is inserted into the cartridge mounting unit and is connected thereto. Therefore, there is a possibility that contact between the cartridge side terminal group and the apparatus side terminal group may not be achieved due to a slight manufacturing error in the cartridge mounting unit or the cartridge.

The problems as described above are significant particularly in a large printer which performs printing on a large-sized sheet (for example, A2 to A0 sizes) because the size of the cartridge is increased.

The problems as mentioned above are problems that are not limited to the cartridge and the printer having the cartridge that is detachable, but are common to a printing apparatus that supplies (ejects) different types of printing materials (for example, toner) from ink and a cartridge that is detachably mounted to the printing apparatus.

SUMMARY

An advantage of some aspects of the invention is that it provides a technique of properly achieving contact between a cartridge side terminal group and an apparatus side terminal group.

The invention can be realized in the following forms or application examples.

Application Example 1

According to Application Example 1, there is provided a cartridge detachably mounted to a printing apparatus which includes, assuming that three orthogonal spatial axes respectively are an X axis, a Y axis, and a Z axis, directions along the X axis, the Y axis, and the Z axis respectively are an X axis direction, a Y axis direction, and a Z axis direction, positive directions along the X axis, the Y axis, and the Z axis respectively are a +X axis direction, a +Y axis direction, and a +Z axis direction, and negative directions along the X axis, the Y axis, and the Z axis respectively are a −X axis direction, a −Y axis direction, and a −Z axis direction, a cartridge mounting unit into which the cartridge is inserted in the −Y axis direction toward an apparatus side front wall portion on a −Y axis direction side from an insertion hole on a +Y axis direction side, a printing material supply tube provided in the apparatus side front wall portion, and an apparatus side terminal unit which is provided closer to +Z axis direction side than the printing material supply tube of the apparatus side front wall portion, the apparatus side terminal unit having an apparatus side terminal group provided with a contact point on a surface tilted in a direction including a +Y axis direction component and a −Z axis direction component and first and second positioning portions respectively provided on a +X axis direction side and a −X axis direction side of the surface and being mounted in a state of being movable in the X axis direction and the Z axis direction with respect to the apparatus side front wall portion, the cartridge including: assuming that the X axis, the Y axis, and the Z axis for the cartridge in a mounted state in which the cartridge is mounted to the cartridge mounting unit respectively are an X axis, a Y axis, and a Z axis of the cartridge, two surfaces which oppose each other in the Y axis direction, the two surfaces including a rear surface positioned on the +Y axis direction side and an approximately rectangular front surface that is positioned on the −Y axis direction side and has a dimension in the Z axis direction greater than a dimension in the X axis direction; two surfaces which intersect the front surface and the rear surface and oppose each other in the Z axis direction, the two surfaces including a first side surface positioned on the +Z axis direction side and a second side surface positioned on a −Z axis direction side; two surfaces which intersect the front surface, the rear surface, the first side surface, and the second side surface and oppose each other in the X axis direction, the two surfaces including a third side surface positioned on the +X axis direction side and a fourth side surface positioned on the −X axis direction side; a supply tube insertion hole which is provided in the front surface and into which the printing material supply tube is inserted; and a concave portion which is provided in a corner portion at which the front surface and the first side surface intersect each other and into which the apparatus side terminal unit is inserted in the mounted state, wherein the concave portion includes an opening which is an entrance when the apparatus side terminal unit is inserted into the concave portion, and a first side wall, a second side wall, and a bottom wall that constitute at least a part of an inner wall of the concave portion, the first side wall and the second side wall oppose each other in the X axis direction, and the first side wall is positioned on the +X axis direction side and the second side wall is positioned on the −X axis direction side, the bottom wall is tilted in a direction including a −Y axis direction component and a +Z axis direction component and has a tilted surface provided with a cartridge side terminal group that comes into contact with the apparatus side terminal group in the mounted state, the first side wall is provided with a first restriction portion which restricts movements in the +Z axis direction and the +X axis direction of the apparatus side terminal unit by coming into contact with the first positioning portion in the +Z axis direction and the +X axis direction in the mounted state, and the second side wall is provided with a second restriction portion which restricts movements in the +Z axis direction and the −X axis direction of the apparatus side terminal unit by coming into contact with the second positioning portion in the +Z axis direction and the −X axis direction in the mounted state.

In the printing apparatus to which the cartridge according to Application Example 1 is mounted, the apparatus side terminal unit is movable in the X axis direction and the Z axis direction, and the cartridge according to Application Example 1 has the concave portion into which the apparatus side terminal unit is inserted. Accordingly, even in a case where the cartridge mounting unit or the cartridge has a manufacturing error, the apparatus side terminal unit is guided into the concave portion of the cartridge while absorbing the error as the apparatus side front wall portion is moved when the cartridge is mounted to the cartridge mounting unit. In addition, finally, the positioning of the apparatus side terminal group and the apparatus side terminal group is performed by the first and second restriction portions provided in the concave portion. That is, during the completion of the mounting and in the mounted state, the first and second restriction portions provided in the concave portion of the cartridge restrict the movements in the +Z axis direction and the ±X axis direction of the first and second positioning portions of the apparatus side terminal unit, thereby positioning the apparatus side terminal group and the cartridge side terminal group. Therefore, contact between the apparatus side terminal group and the cartridge side terminal group may be properly achieved.

In addition, in the printing apparatus to which the cartridge according to Application Example 1 is mounted, the apparatus side terminal group is provided on the surface tilted in the direction including the +Y axis direction component and the −Z axis direction component, and in the cartridge according to Application Example 1, the cartridge side terminal group is provided on the tilted surface tilted in the direction including the −Y axis direction component and the +Z axis direction component. That is, both the apparatus side terminal group and the cartridge side terminal group are provided on the surfaces tilted in the −Y axis direction which is the insertion direction of all the cartridges. When the cartridge is inserted into the cartridge mounting unit, the cartridge proceeds in the −Y axis direction. Here, the cartridge side terminal group also proceeds in the −Y axis direction and slowly approaches the apparatus side terminal group. However, the two do not come into contact with each other immediately before completing the mounting. In the final stage of the mounting, after the apparatus side terminal unit is inserted into the concave portion of the cartridge, the apparatus side terminal group and the cartridge side terminal group slightly rub against each other immediately before completing the mounting. In addition, during the completion of the mounting and in the mounted state, the first and second restriction portions provided in the concave portion of the cartridge restrict the movements in the +Z axis direction and the ±X axis directions of the first and second positioning portions of the apparatus side terminal unit, thereby positioning the apparatus side terminal group and the cartridge side terminal group. As such, while the apparatus side terminal group and the cartridge side terminal group rarely rub against each other during the mounting of the cartridge, the apparatus side terminal group and the cartridge side terminal group rub slightly against each other immediately before completing the mounting of the cartridge, thereby reducing the possibility of shavings being generated as the apparatus side terminal group rubs against the cartridge during the mounting of the cartridge. In addition, even in a case where dust is present in the vicinity of the apparatus side terminal group and is interposed between the apparatus side terminal group and the cartridge side terminal group, the apparatus side terminal group comes into contact while linearly rubbing on the surface of the cartridge side terminal group and thus an effect of discharging the dust from the contact portion (a wiping effect) is exhibited, thereby reducing the possibility of dust being interposed between the apparatus side terminal group and the cartridge side terminal group.

Application Example 2

According to Application Example 1, each of the first restriction portion and the second restriction portion may include a +Z axis direction side contact surface which comes into contact with a +Z axis direction end portion of the corresponding positioning portion from the first and second positioning portions and a −Z axis direction side contact surface which comes into contact with a −Z axis direction end portion of the corresponding positioning portion from the first and second positioning portions.

In the cartridge according to Application Example 2, in the mounted state, the first restriction portion has the +Z axis direction side contact surface which comes into contact with the +Z axis direction end portion of the first positioning portion and the −Z axis direction side contact surface which comes into contact with the −Z axis direction end portion thereof, and the second restriction portion has the +Z axis direction side contact surface which comes into contact with the +Z axis direction end portion of the second positioning portion and the −Z axis direction side contact surface which comes into contact with the −Z axis direction end portion thereof. That is, the first and second restriction portions restrict the movements in the ±Z direction of the first and second positioning portions. Accordingly, the positioning of the apparatus side terminal group with respect to the cartridge side terminal group may be performed with good accuracy. Therefore, contact between the apparatus side terminal group and the cartridge side terminal group may be more properly achieved. Moreover, since the apparatus side terminal unit is able to be held on both sides in the +Z axis direction and the −Z axis direction, even when vibration or impacts from the outside are exerted during the use of the printing apparatus, a deviation of the contact position between the apparatus side terminal group and the cartridge side terminal group due to the vibration and impacts may be suppressed.

Application Example 3

In the cartridge according to Application Example 2, each of the first restriction portion and the second restriction portion may include an entrance part which extends toward the +Y axis direction side from the opening provided at an end surface on the −Y axis direction side and of which a dimension in the Z axis direction is monotonically decreased in the +Y axis direction, and a contact part which extends from an end portion in the +Y axis direction of the entrance part in the +Y axis direction, has a constant dimension in the Z axis direction, and comes into contact with the corresponding positioning portion from the first and second positioning portions in the mounted state.

In the cartridge according to Application Example 3, since the entrance part of which the dimension in the Z axis direction is monotonically decreased in the +Y axis direction from the −Y axis direction is included, even in a case where the cartridge or the cartridge mounting unit has a manufacturing error in the Z axis direction, the positioning portion of the apparatus side terminal unit which is movable in the Z axis direction may be easily guided to the restriction portion provided in the concave portion of the cartridge. In addition, since the contact part which has a constant dimension in the Z axis direction is included, the positioning of the apparatus side terminal group with respect to the cartridge side terminal group may be performed with good accuracy by causing the positioning portion of the apparatus side terminal unit to advance to the contact part after being guided to the entrance part.

Application Example 4

In the cartridge according to any one of Application Examples 1 to 3, each of the first and second restriction portions may include a +Y axis direction side contact surface that comes into contact with a +Y axis direction side end portion of the corresponding positioning portion from the first and second positioning portions in the mounted state.

In the cartridge according to Application Example 4, the first and second restriction portions respectively restrict the positions of the +Y axis direction side end portions of the first and second positioning portions. Accordingly, the apparatus side terminal unit may be prevented from strongly impacting the bottom wall in the cartridge concave portion by proceeding to far in the +Y axis direction when the cartridge is inserted into the cartridge mounting unit. Accordingly, the apparatus side terminal unit may be prevented from being broken.

Application Example 5

In the cartridge according to any one of Application Examples 1 to 4, a pair of bottom wall side concave portions may be formed in the bottom wall between the tilted surface and the first side wall and between the tilted surface and the second side wall.

In the cartridge according to Application Example 5, approximately triangular surfaces are exposed on the +X axis direction side and the −X axis direction side of the cartridge side terminal group. Accordingly, in a case where the cartridge side terminal group is provided on a circuit board, it is possible to easily perform mounting or removal of the circuit board. In addition, when a pair of protrusions that protrude in the direction including the +Y axis direction component and the −Z axis direction component with respect to the surface are provided on the +X axis direction side and the −X axis direction side of the apparatus side terminal group so as to be received by the bottom wall side concave portions, in addition to the positioning of or suppressing of a positional deviation between the cartridge side terminal group and the apparatus side terminal group by the restriction portion and the positioning portion, it is possible to position the two or suppress a positional deviation therebetween even at the positions close to the cartridge side terminal group and the apparatus side terminal group. Therefore, contact between the apparatus side terminal group and the cartridge side terminal group may be more properly achieved.

Application Example 6

In the cartridge according to any one of Application Examples 1 to 5, a rod insertion hole which is provided at an intermediate position in the Z axis direction of the front surface between the first side surface and the second side surface and into which a rod provided in the apparatus side front wall portion is inserted may further be included, and the supply tube insertion hole may be provided between the rod insertion hole and the concave portion.

In the cartridge according to Application Example 6, as the rod is inserted into the rod insertion hole, positioning of the entirety of the cartridge with respect to the cartridge mounting unit is performed, and thus a positional deviation from the correct mounting position is suppressed. Therefore, a positional deviation in the vicinity of the rod insertion hole may be properly suppressed. However, the cartridge side terminal group provided in the corner portion of the front surface and the rod insertion hole are at positions separated from each other, and thus there may be cases where it is difficult to suppress a positional deviation of such a member that is at a position separated from the rod insertion hole. In particular, the large-capacity type cartridge used in the printing apparatus for large-sized printing has a large size, and the cartridge side terminal group and the rod insertion hole are at positions somewhat separated from each other. However, as described above, by employing the configurations of the apparatus side terminal unit that is movable in the X axis direction and the Z axis direction and the concave portion into which the apparatus side terminal unit is inserted, positioning of the cartridge side terminal group and the apparatus side terminal group may be performed with good accuracy. That is, even with the large-capacity type cartridge having a large size, it is possible to position the apparatus side terminal group and the cartridge side terminal group with good accuracy while performing the positioning of the entirety of the cartridge with good accuracy and absorbing a manufacturing error in the cartridge.

In addition, according to this application example, the supply tube insertion hole into which the printing material supply tube is inserted is provided between the rod insertion hole and the concave portion. That is, the printing material supply tube is provided at a position close to the rod. In addition, the supply tube insertion hole is provided at a position close to the rod insertion hole. Therefore, a positional deviation between the printing material supply tube and the supply tube insertion hole may be properly suppressed.

Application Example 7

In the cartridge according to any one of Application Examples 1 to 6, the first restriction portion may be a groove recessed in the +X axis direction from the first side wall, and the second restriction portion may be a groove recessed in the −X axis direction from the second side wall.

In the cartridge according to Application Example 7, since the grooves are respectively formed in the first and second side walls, the first and second restriction portions for restricting the movements of the first and second positioning portions may be easily formed.

Application Example 8

In the cartridge according to any one of Application Examples 1 to 6, the first restriction portion may be configured as a convex portion that protrudes in the −X axis direction from the first side wall, and the second restriction portion may be configured as a convex portion that protrudes in the +X axis direction from the second side wall.

In the cartridge according to Application Example 8, since the convex portions that protrude in the X axis direction are respectively provided to the first side wall and the second side wall, the first positioning portion and the second positioning portion may be easily formed.

Application Example 9

According to Application Example 9, there is provided a printing material supply system including: a printing apparatus; and the cartridge according to any one of Application Examples 1 to 8, wherein the printing apparatus includes, assuming that three orthogonal spatial axes respectively are an X axis, a Y axis, and a Z axis, directions along the X axis, the Y axis, and the Z axis respectively are an X axis direction, a Y axis direction, and a Z axis direction, positive directions along the X axis, the Y axis, and the Z axis respectively are a +X axis direction, a +Y axis direction, and a +Z axis direction, and negative directions along the X axis, the Y axis, and the Z axis respectively are a −X axis direction, a −Y axis direction, and a −Z axis direction, a cartridge mounting unit into which the cartridge is inserted in the −Y axis direction toward an apparatus side front wall portion on a −Y axis direction side from an insertion hole on a +Y axis direction side, a printing material supply tube provided in the apparatus side front wall portion, and an apparatus side terminal unit which is provided closer to a +Z axis direction side than the printing material supply tube of the apparatus side front wall portion, and the apparatus side terminal unit has an apparatus side terminal group provided with a contact point on a surface tilted in a direction including a +Y axis direction component and a −Z axis direction component and first and second positioning portions respectively provided on a +X axis direction side and a −X axis direction side of the surface, and is mounted in a state of being movable in the X axis direction and the Z axis direction with respect to the apparatus side front wall portion.

In the printing material supply system according to Application Example 9, a holder provided with the apparatus side terminal group is configured to be movable in the X axis direction and the Z axis direction. Accordingly, even in the case where the cartridge mounting unit or the cartridge has a manufacturing error, the apparatus side terminal group provided in the holder is moved to the position that comes into contact with the cartridge side terminal group when the cartridge is mounted to the cartridge mounting unit. In addition, finally, the positioning of the apparatus side terminal group and the cartridge side terminal group is performed by the first and second restriction portions provided in the concave portion of the cartridge. That is, during the completion of the mounting and in the mounted state, the movements in the +Z axis direction and the ±X axis direction of the first and second positioning portions of the apparatus side terminal unit are restricted by the first and second restriction portions provided in the concave portion of the cartridge, thereby positioning the apparatus side terminal group and the cartridge side terminal group. Therefore, contact between the apparatus side terminal group and the cartridge side terminal group may be properly achieved. In addition, by employing the cartridge according to any one of Application Examples 1 to 8, the same effects as those described in Application Examples 1 to 8 are exhibited.

Application Example 10

According to Application Example 10, there is provided a printing apparatus to which a cartridge having a cartridge side terminal group is detachably mounted, including: assuming that three orthogonal spatial axes respectively are an X axis, a Y axis, and a Z axis, directions along the X axis, the Y axis, and the Z axis respectively are an X axis direction, a Y axis direction, and a Z axis direction, positive directions along the X axis, the Y axis, and the Z axis respectively are a +X axis direction, a +Y axis direction, and a +Z axis direction, and negative directions along the X axis, the Y axis, and the Z axis respectively are a −X axis direction, a −Y axis direction, and a −Z axis direction, a cartridge mounting unit into which the cartridge is inserted in the −Y axis direction toward an apparatus side front wall portion on a −Y axis direction side from an insertion hole on a +Y axis direction side; a printing material supply tube provided in the apparatus side front wall portion; and an apparatus side terminal unit which is provided closer to a +Z axis direction side than the printing material supply tube of the apparatus side front wall portion, wherein the apparatus side terminal unit has an apparatus side terminal group provided with a contact point on a surface tilted in a direction including a +Y axis direction component and a −Z axis direction component and first and second positioning portions respectively provided on a +X axis direction side and a −X axis direction side of the surface, and is mounted in a state of being movable in the X axis direction and the Z axis direction with respect to the apparatus side front wall portion.

In the printing apparatus according to Application Example 10, the apparatus side terminal unit having the apparatus side terminal group is movable in the X axis direction and the Z axis direction. Accordingly, even in the case where the cartridge mounting unit or the cartridge has a manufacturing error, the apparatus side terminal group is moved to the position that comes into contact with the cartridge side terminal group when the cartridge is mounted to the cartridge mounting unit. Therefore, contact between the apparatus side terminal group and the cartridge side terminal group may be properly achieved.

Application Example 11

In the printing apparatus according to Application Example 10, the cartridge mounting unit may include two wall portions that intersect the apparatus side front wall portion and oppose each other in the Z axis direction, the two wall portions including a first apparatus side side wall portion disposed on the +Z axis direction side and a second apparatus side side wall portion disposed on a −Z axis direction side, a rod having a center axis parallel to the Y axis direction may be provided at an intermediate position in the apparatus side front wall portion between the first apparatus side side wall portion and the second apparatus side side wall portion, and the printing material supply tube may be provided between the rod and the apparatus side terminal unit.

In the printing apparatus according to Application Example 11, the entirety of the cartridge with respect to the cartridge mounting unit is positioned by the rod, and thus a positional deviation from the correct mounting position may be suppressed. In addition, the printing material supply tube is provided between the rod and the apparatus side terminal unit. That is, the printing material supply tube is provided at a position relatively close to the rod. Therefore, a positional deviation between the printing material supply tube and the supply tube insertion hole of the cartridge into which the printing material supply tube is inserted may be properly suppressed. As such, although the positional deviation in the vicinity of the rod is able to be properly suppressed, the apparatus side terminal group and the rod are at positions separated from each other, and there may be cases where it is difficult to suppress the positional deviation. In particular, the printer for large-sized printing has a large size, and the apparatus side terminal unit and the rod are at positions somewhat separated from each other. However, as such, by employing the apparatus side terminal unit that is movable in the X axis direction and the Z axis direction, the apparatus side terminal group is moved to the position that comes into contact with the cartridge side terminal group when the cartridge is mounted to the cartridge mounting unit. Therefore, positioning of the cartridge side terminal group and the apparatus side terminal group may be performed with good accuracy.

In addition, the invention is able to be realized as various forms, and be realized as a printing apparatus, a method of manufacturing a printing apparatus, a method of manufacturing a cartridge, and the like besides the configurations of the above-described cartridge and the printing material supply system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, embodiments of the invention will be described in the following order:

A. First Example

B. Second Example

C. Modified Example

A. First Example

A-1. Entire Configuration of Printing Material Supply System

Figure 1:
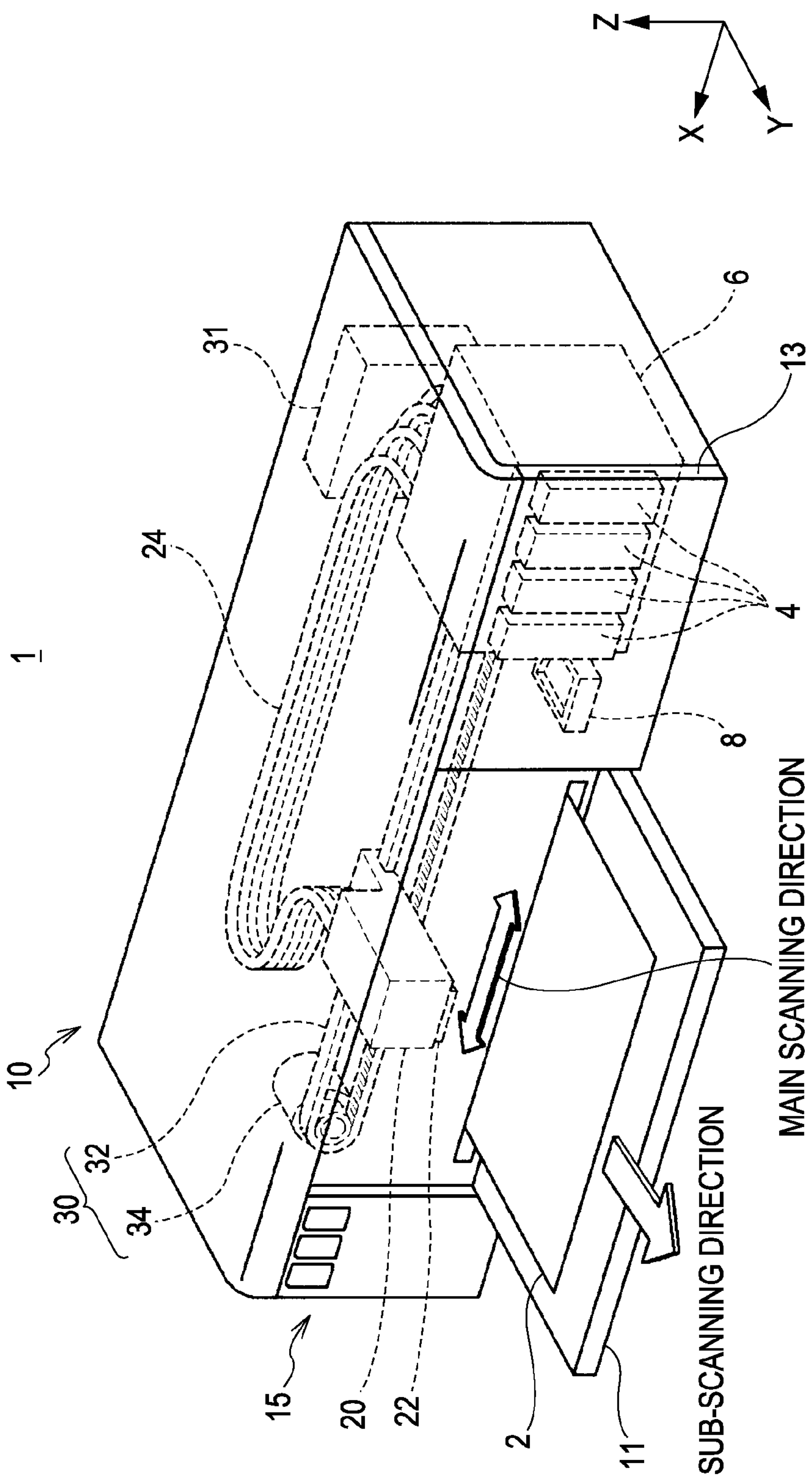
FIG. 1 is a perspective view illustrating the configuration of a printing material supply system.

FIG. 1 is a perspective view illustrating the configuration of a printing material supply system 1. In FIG. 1, the X, Y, and Z axes which are three orthogonal spatial axes are drawn. The directions in which the arrows of the X axis, the Y axis, and the Z axis are directed respectively represent positive directions along the X axis, the Y axis, and the Z axis. The positive directions along the X axis, the Y axis, and the Z axis are respectively denoted by a +X axis direction, a +Y axis direction, and a +Z axis direction. The directions reverse to the directions in which the arrows of the X axis, the Y axis, and the Z axis are directed respectively represent negative directions along the X axis, the Y axis, and the Z axis. The negative directions along the X axis, the Y axis, and the Z axis are respectively denoted by a −X axis direction, a −Y axis direction, and a −Z axis direction. Directions along the X axis, the Y axis, and the Z axis regardless of whether being positive or negative are respectively called an X axis direction, a Y axis direction, and a Z axis direction. This applies the same to the figures and description described later. The directions of the X, Y, and Z axes drawn in the other figures correspond to those of the X, Y, and Z axes of FIG. 1. The printing material supply system 1 includes a printer 10 as a printing apparatus and a cartridge 4.

The printer 10 of this embodiment is an ink jet printer that discharges ink from a head 22. The printer 10 is a large printer that performs printing on a large-sized sheet (A2 to A0 and the like) such as a poster. The printer 10 includes a cartridge mounting unit 6, a control unit 31, a carriage 20, the head 22, and a driving mechanism 30. In addition, the printer 10 includes an operation button 15 for a user to operate the operations of the printer 10.

In the cartridge mounting unit 6, each of a plurality of cartridges 4 is detachably mounted. In this example, four types of single cartridges 4 respectively corresponding to four colors (black, yellow, magenta, and cyan) of ink, that is, a total of four cartridges 4 are mounted to the cartridge mounting unit 6. In the printer 10 of this example, an exchange cover 13 is provided as the front surface (the surface on the +Y axis direction side). The +Z axis direction side of the exchange cover 13 is tilted forward (the +Y axis direction side), the opening of the cartridge mounting unit 6 appears, and thus attaching and detaching of the cartridge 4 becomes possible. When the cartridge 4 is mounted to the cartridge mounting unit 6, the ink is able to be supplied to the head 22 provided in the carriage 20 via a tube 24. In this example, the ink in the cartridge 4 is suctioned by a pumping mechanism (not shown) of the printer 10, thereby supplying the ink to the head 22. In addition, the tube 24 is provided for each of the types of the ink. In addition, a state in which the cartridge 4 is mounted to the cartridge mounting unit 6 is also called a "mounted state".

In the head 22, a nozzle is provided for each of the types of the ink. The head 22 prints data such as text and images by ejecting the ink toward a printing sheet 2 from ejection nozzles. In addition, a form in which the cartridge 4 is mounted to the cartridge mounting unit 6 and detailed configurations of the cartridge 4 and the cartridge mounting unit 6 will be described later. In addition, in this example, the printer 10 is a printer called a so-called "off-carriage type" in which the cartridge mounting unit 6 is not linked to the movement of the carriage 20. The invention may also be applied to a printer called a so-called "on-carriage type" in which the cartridge mounting unit 6 is provided in the carriage 20 and the cartridge mounting unit 6 is moved along with the carriage 20.

The control unit 31 performs control of each unit of the printer 10 and signal reception and transmission with the cartridge 4. The carriage 20 moves the head 22 relative to the printing sheet 2.

The driving mechanism 30 reciprocates the carriage 20 on the basis of a control signal from the control unit 31. The driving mechanism 30 includes a timing belt 32 and a driving motor 34. By transmitting the power of the driving motor 34 to the carriage 20 via the timing belt 32, the carriage 20 is reciprocated in a main scanning direction (the X axis direction). In addition, the printer 10 includes a transport mechanism for moving the printing sheet 2 in a sub-scanning direction (the +Y axis direction). When printing is performed, the printing sheet 2 is moved in the sub-scanning direction by the transport mechanism, and the printing sheet 2 is output onto the front surface cover 11 after completing the printing.

In addition, at a position outside a printing region in which the carriage 20 is moved in the main scanning direction, a region called a home position is provided. At the home position, a maintenance mechanism that performs maintenance for enabling normal printing is mounted. The maintenance mechanism is constituted by a cap member 8 which is pressed against a surface (nozzle surface) where the nozzles are formed on the bottom surface side (a side toward the printing sheet 2) of the head 22 and forms a closed space to surround the ejection nozzles, an elevating mechanism (not shown) that elevates the cap member 8 so as to be pressed against the nozzle surface of the head 22, a suction pump (not shown) that introduces a negative pressure to the closed space formed by the cap member 8 pressed against the nozzle surface of the head 22, and the like.

In this example, in a use state of the printing material supply system 1 (the printer 10 and the cartridge 4), the axis along the sub-scanning direction in which the printing sheet 2 is transported is referred to as the Y axis, the axis along the direction of gravity (upward and rearward direction) is referred to as the Z axis, and the axis along the movement direction (left and right direction) of the carriage 20 is referred to as the X direction. Here, the "use state of the printing material supply system 1" is referred to as a state in which the printing material supply system 1 is installed on a horizontal surface. In addition, in this example, the sub-scanning direction (forward direction) is referred to as the +Y axis direction, the reverse direction thereto (rearward direction) is referred to as the −Y axis direction, a direction (upward direction) directed upward from below in the direction of gravity is referred to as the +Z axis direction, and the reverse direction thereto (downward direction) is referred to as the −Z axis direction. In addition, when the printing material supply system 1 is viewed from the forward side (the +Y axis direction side), a direction directed to the left from the right is referred to as the +X axis direction, and the reverse direction thereto is referred to as the −X axis direction. In addition, in this example, the insertion direction in which the cartridge 4 is mounted to the cartridge mounting unit 6 is also referred to as the −Y axis direction, and the direction in which the cartridge 4 is detached from the cartridge mounting unit 6 is also referred to as the +Y axis direction. Therefore, in the cartridge mounting unit 6, the −Y axis direction side is also called an inner side, and the +Y axis direction side is also called a forward side. In addition, in this example, the arrangement direction of the plurality of cartridges 4 is also referred to as the X axis direction.

Figure 2:
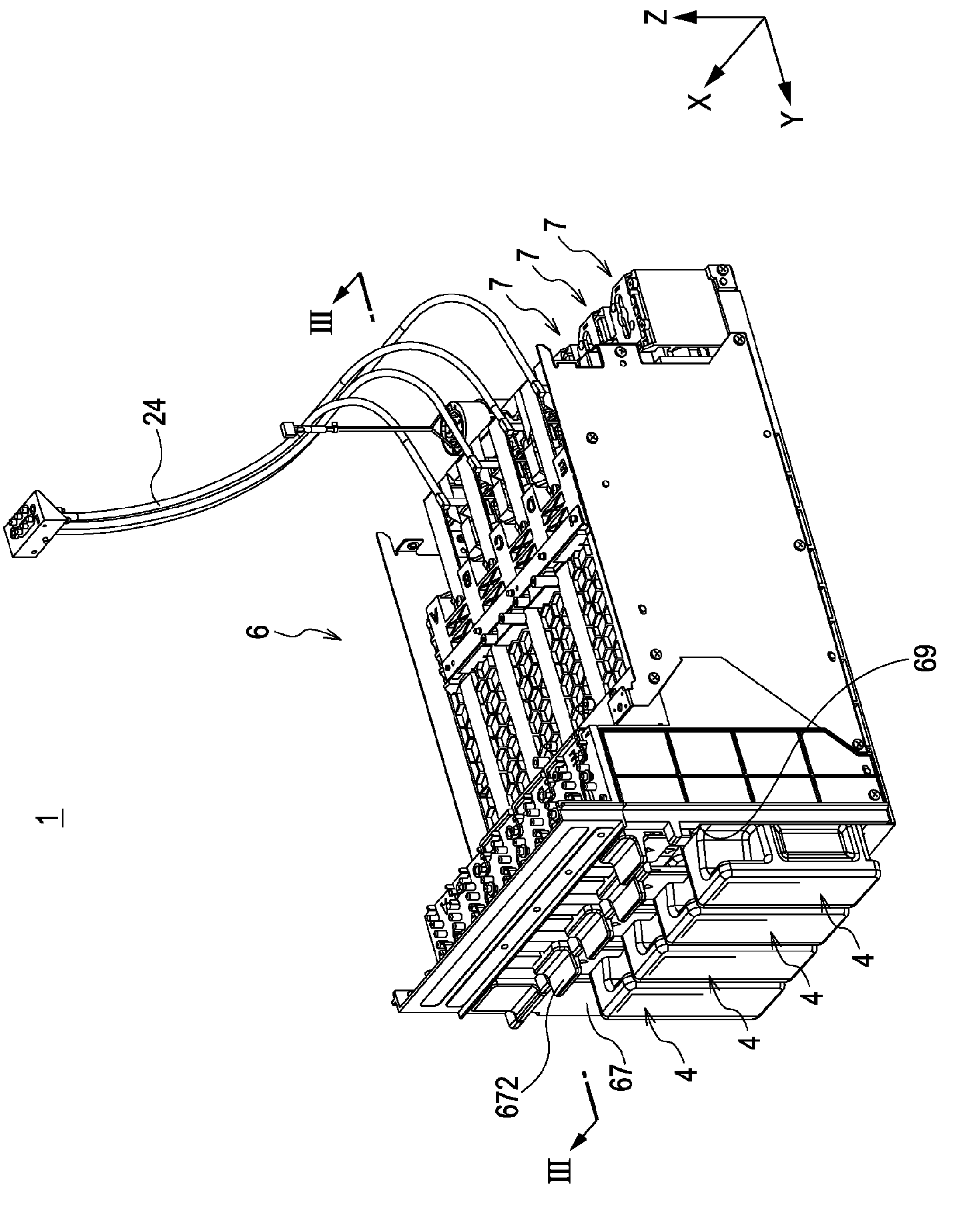
FIG. 2 is an external perspective view illustrating a mounted cartridge mounting unit.

FIG. 2 is an external perspective view illustrating the cartridge mounting unit 6 in the mounted state. In FIG. 2, a form in which the four cartridges 4 are mounted to the respective slots of the cartridge mounting unit 6 is illustrated. Levers 672 are pushed down to the three slots excluding one slot in the −X axis direction side from the four slots. As such, since the levers 672 are pushed down after the cartridges 4 are mounted to the cartridge mounting unit 6, the movement of the cartridge 4 is restricted, and thus the cartridge 4 is prevented from coming away from the cartridge mounting unit 6. When the cartridge 4 is detached from the cartridge mounting unit 6, the lever 672 is pushed up to release the restriction, and the cartridge 4 is detached. The lever 672 is provided to be movable in the Z axis direction in a wall portion 67 in which an insertion hole 69 through which the cartridge 4 passes when being attached and detached is formed. The ink of the mounted cartridge 4 is circulated to the tube 24 as the pumping mechanism 7 is driven. In addition, the detailed configuration of the cartridge mounting unit 6 will be described later.

Figure 3:
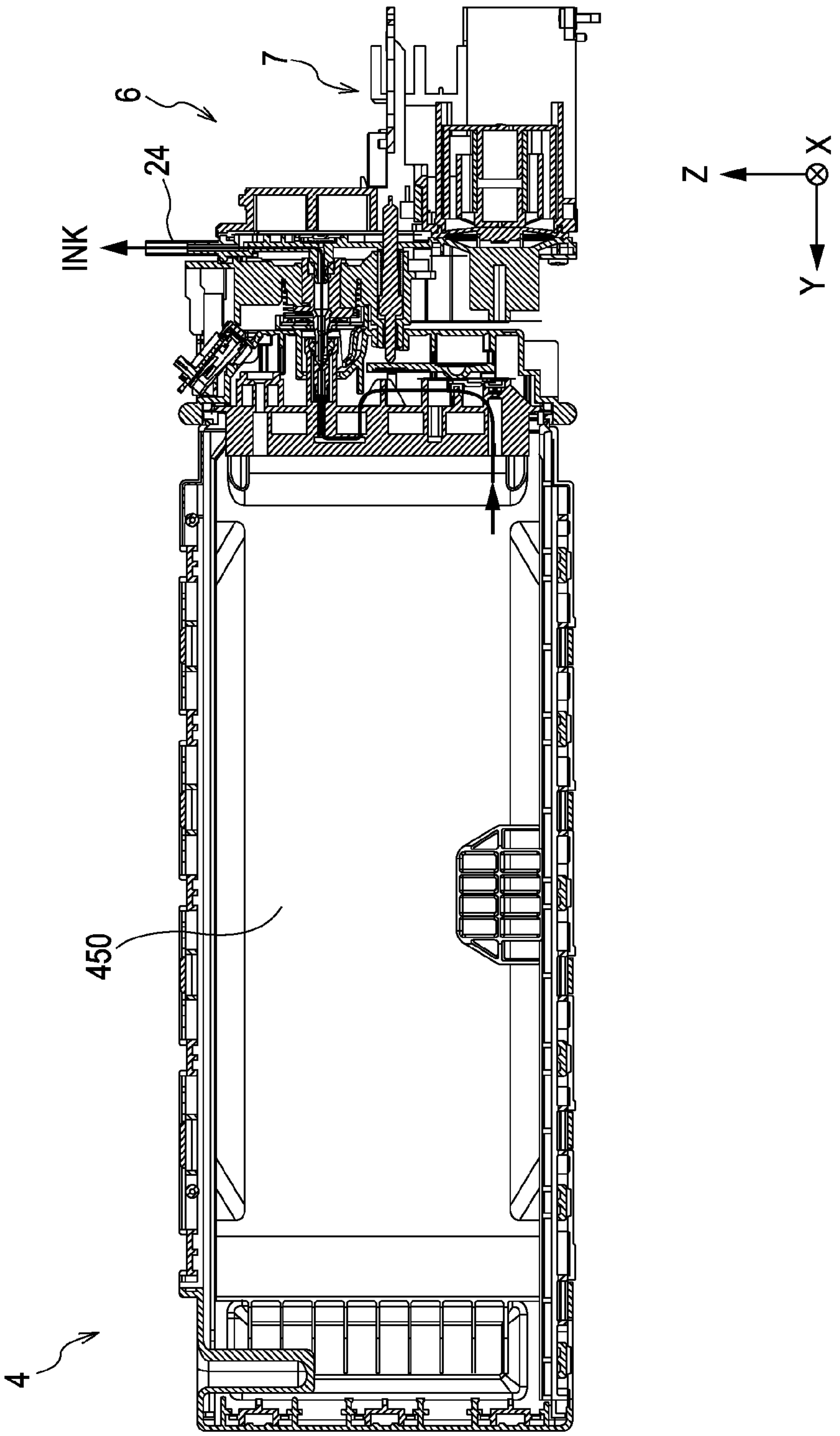
FIG. 3 is a cross-sectional view taken along the line III-III of FIG. 2.

FIG. 3 is a cross-sectional view taken along the line III-III of FIG. 2. FIG. 3 illustrates a part of the cartridge mounting unit 6 and the cartridge 4. When the cartridge 4 is mounted to the cartridge mounting unit 6, the ink from a printing material accommodation portion 450 of the cartridge 4 is circulated to the tube 24 as indicated by the arrow by driving of the pumping mechanism 7.

Figure 4:
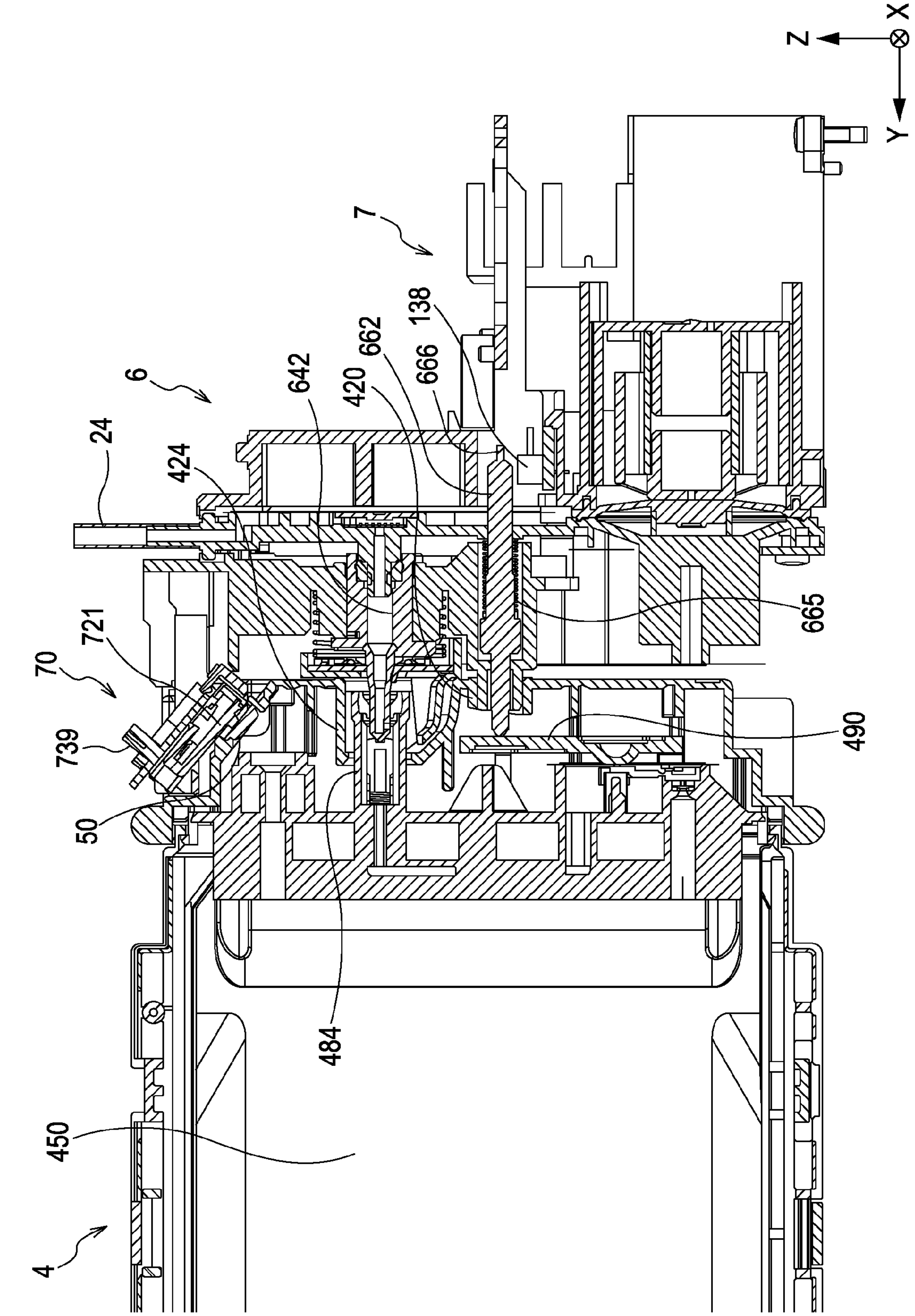
FIG. 4 is an enlarged diagram of a circulation part on a cartridge mounting unit side.

FIG. 4 is an enlarged diagram of a part on the −Y axis direction side in FIG. 3. In the mounted state, each constituent member of the cartridge 4 and the cartridge mounting unit 6 is arranged as follows.

That is, a printing material supply tube 642 of the cartridge mounting unit 6 is inserted into and connected to a printing material lead-out tube 484 of the cartridge 4. The printing material lead-out tube 484 circulates the ink of the printing material accommodation portion 450 to the outside (the printing material supply tube 642). The printing material supply tube 642 circulates the ink discharged from the printing material lead-out tube 484 so as to be sent toward the head. In addition, in the mounted state, a rod 662 of the cartridge mounting unit 6 abuts onto a lever member 490 of the cartridge 4. The rod 662 and the lever member 490 are used to detect a state in which the ink of the printing material accommodation portion 450 is exhausted (also called an "ink end state") by the printer 10 side. Specifically, the ink end state is detected by detecting the displacement of the rod 662 using a sensor 138. Here, the ink end state is referred to as a state in which the ink inside the cartridge 4 is depleted or a state in which little ink is left.

In addition, each terminal of a cartridge side terminal group (not shown) provided on the surface of a circuit board 50 of the cartridge 4 comes into contact with the corresponding terminal of an apparatus side terminal group 721 of the cartridge mounting unit 6. The apparatus side terminal group 721 is electrically connected to a connector 739, and wires (not shown) connected to the connector 739 are electrically connected to the control unit 31 of the printer 10. Accordingly, a storage device of the circuit board 50 and the control unit 31 are electrically connected to each other, and thus signal reception and transmission between the control unit 31 and the circuit board 50 becomes possible. Here, the apparatus side terminal group 721 and the connector 739 are constituent members of an apparatus side terminal unit 70. In addition, the detailed configuration of the apparatus side terminal unit 70 will be described later.

A-2. Detailed Configuration of Cartridge Mounting Unit

Figure 5:
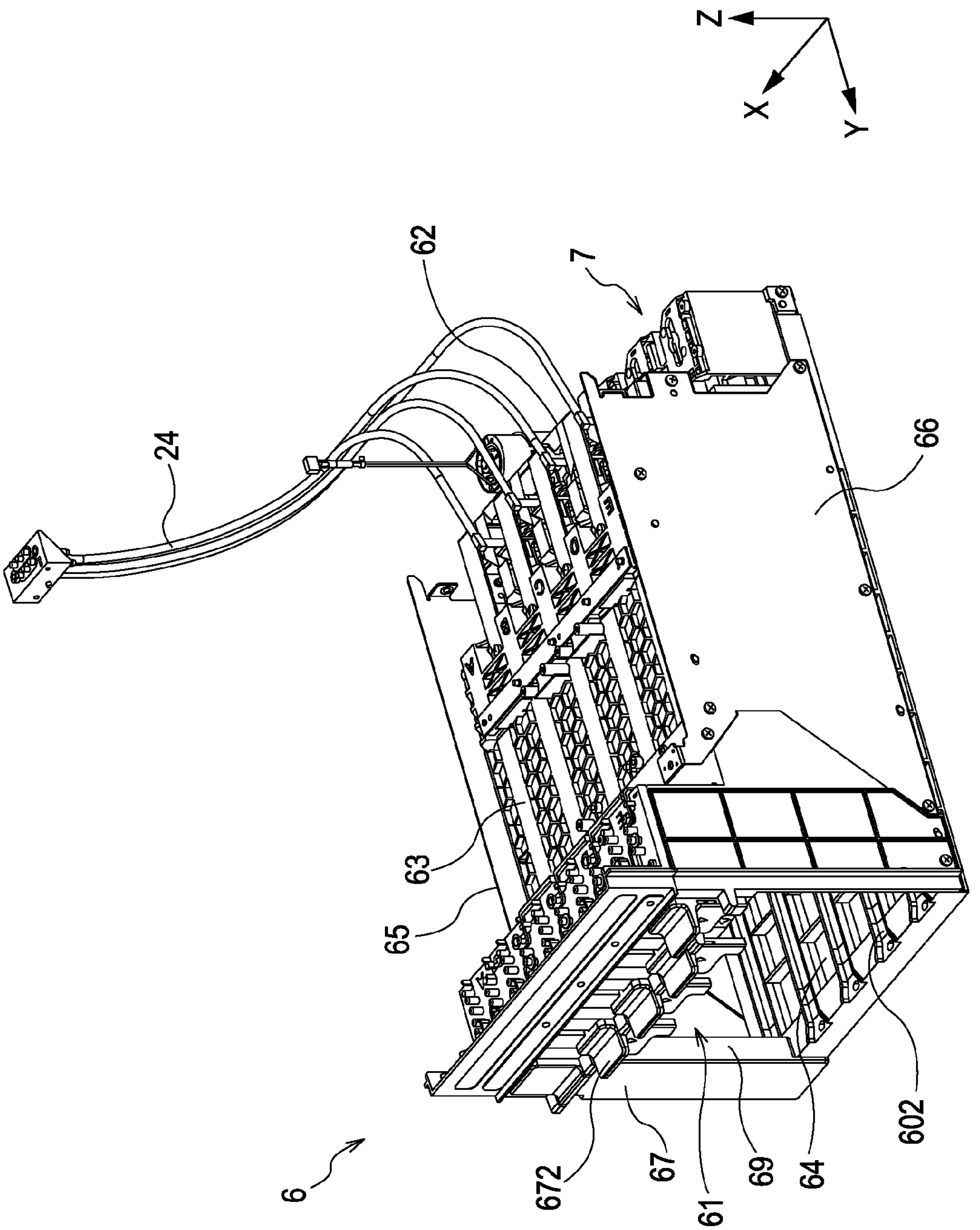
FIG. 5 is a first external perspective view of the cartridge mounting unit.
Figure 6:
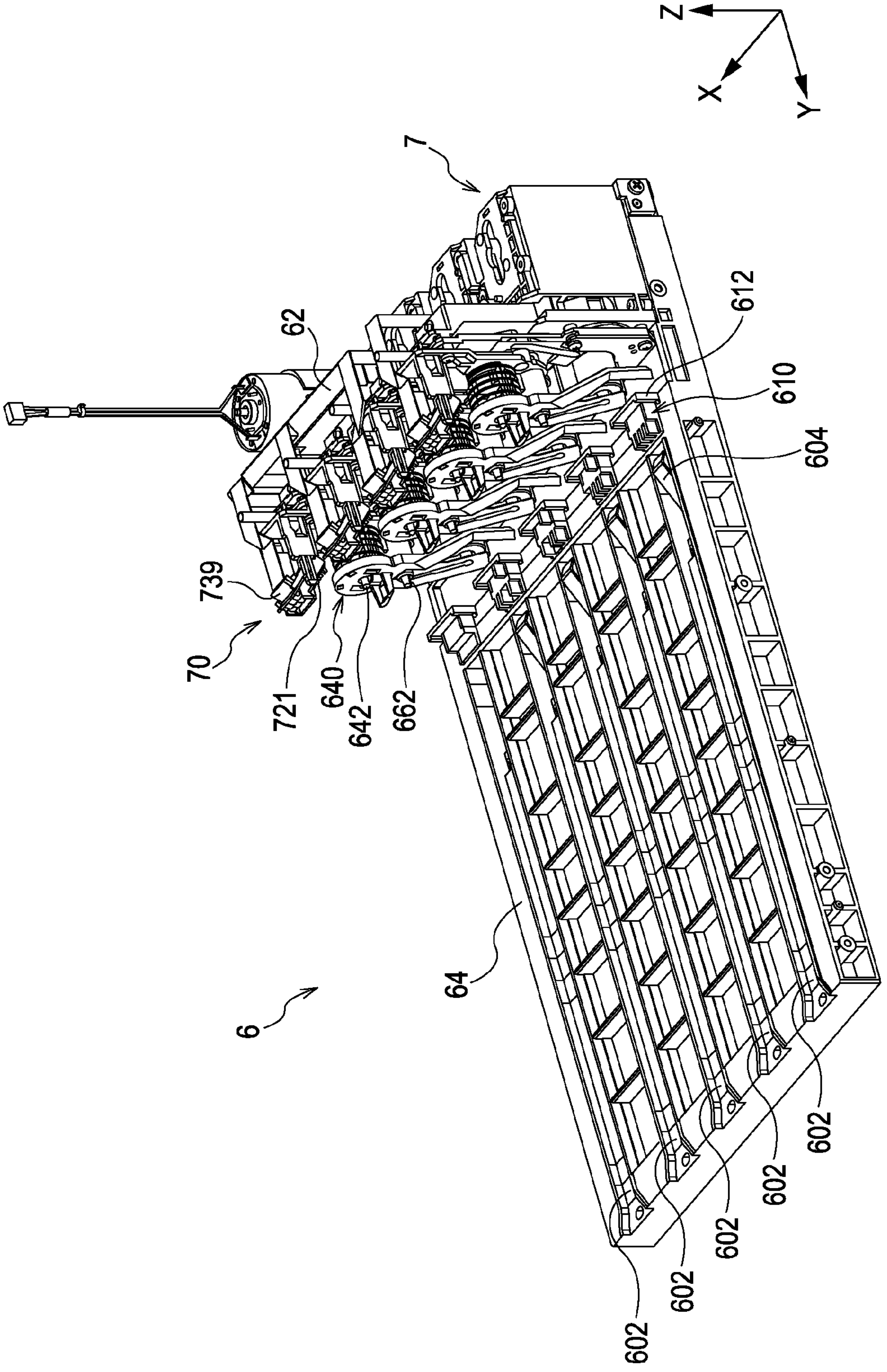
FIG. 6 is a second external perspective view of the cartridge mounting unit.
Figure 7:
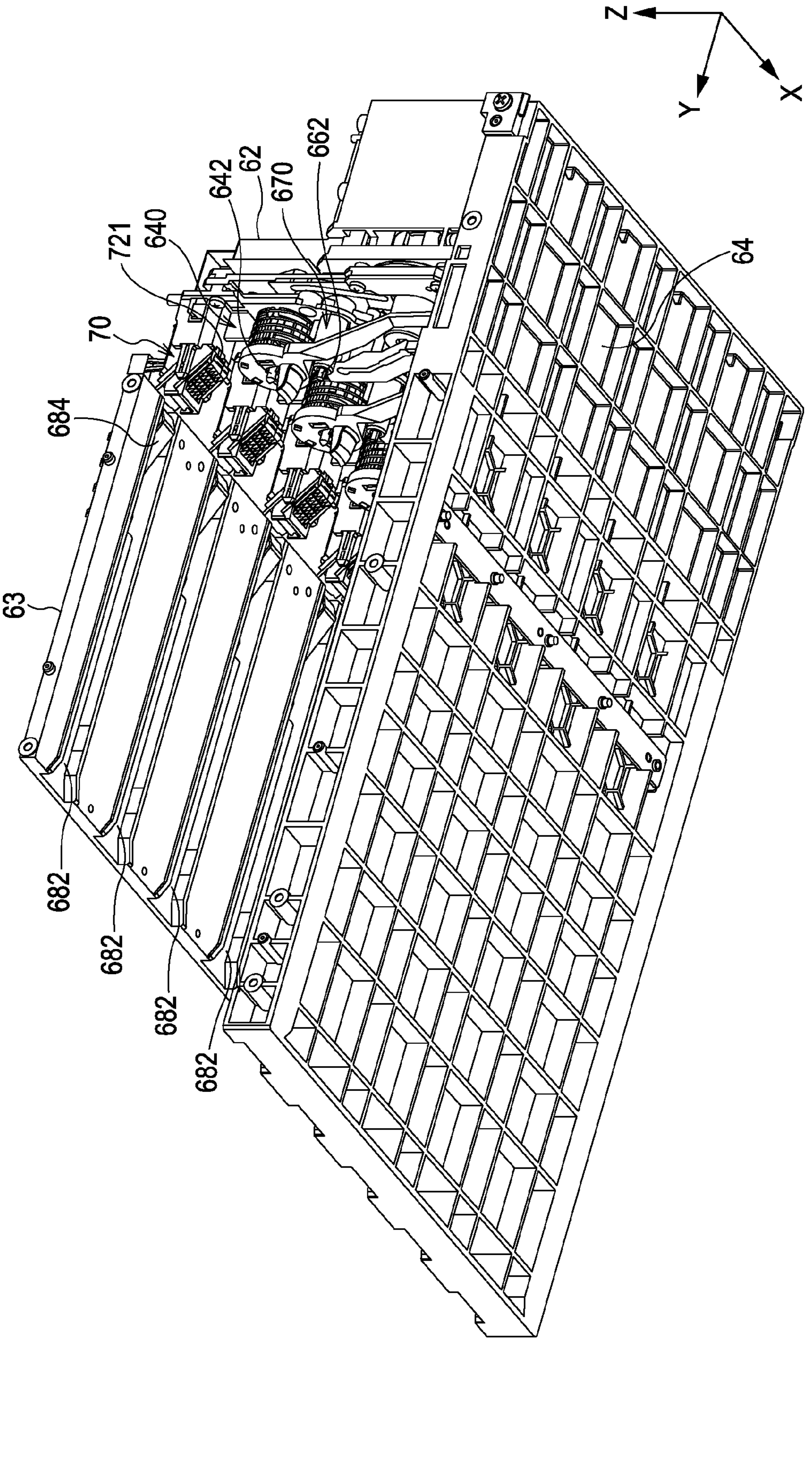
FIG. 7 is a third external perspective view of the cartridge mounting unit.
Figure 8:
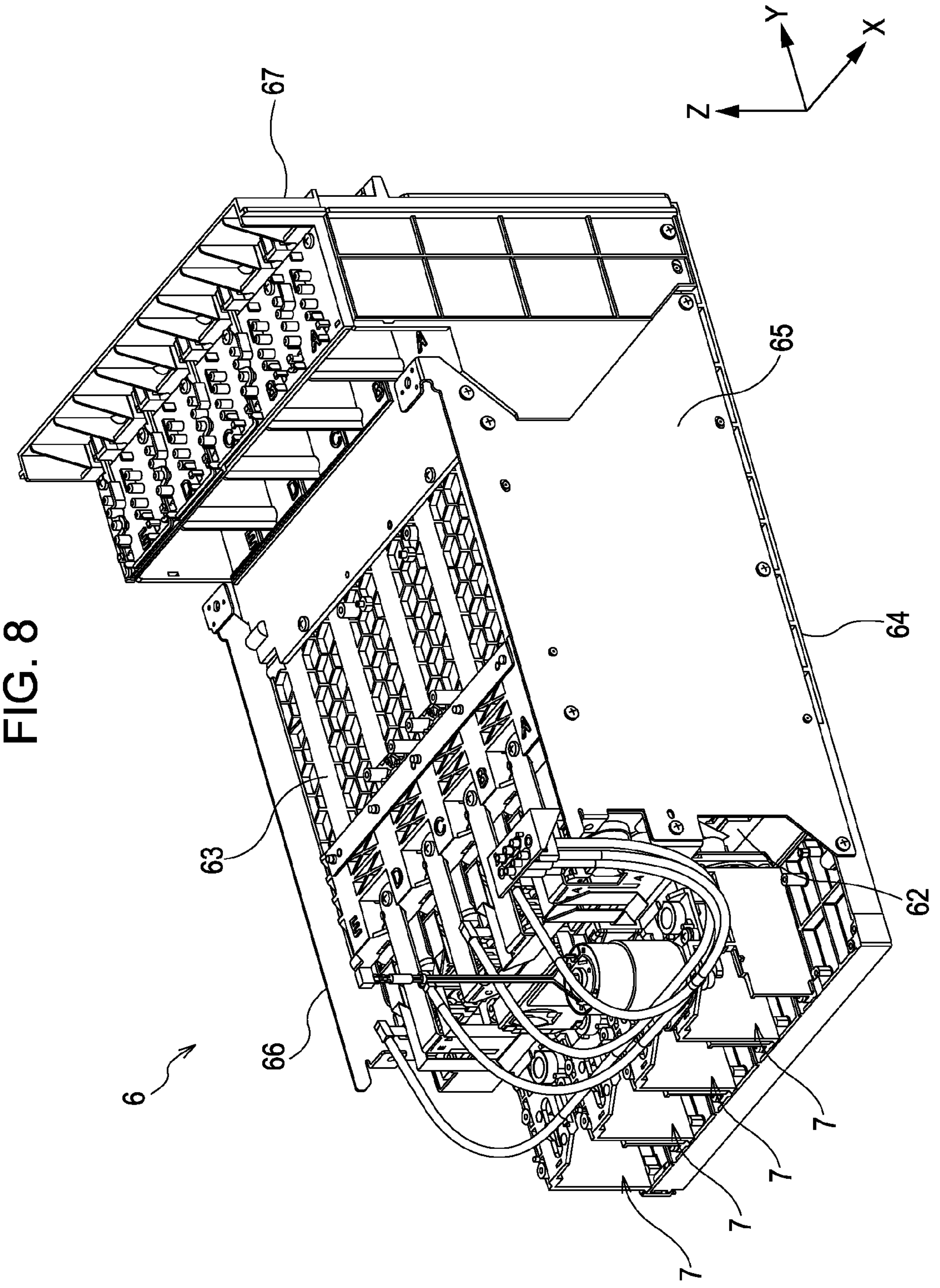
FIG. 8 is a fourth external perspective view of the cartridge mounting unit.
Figure 9:
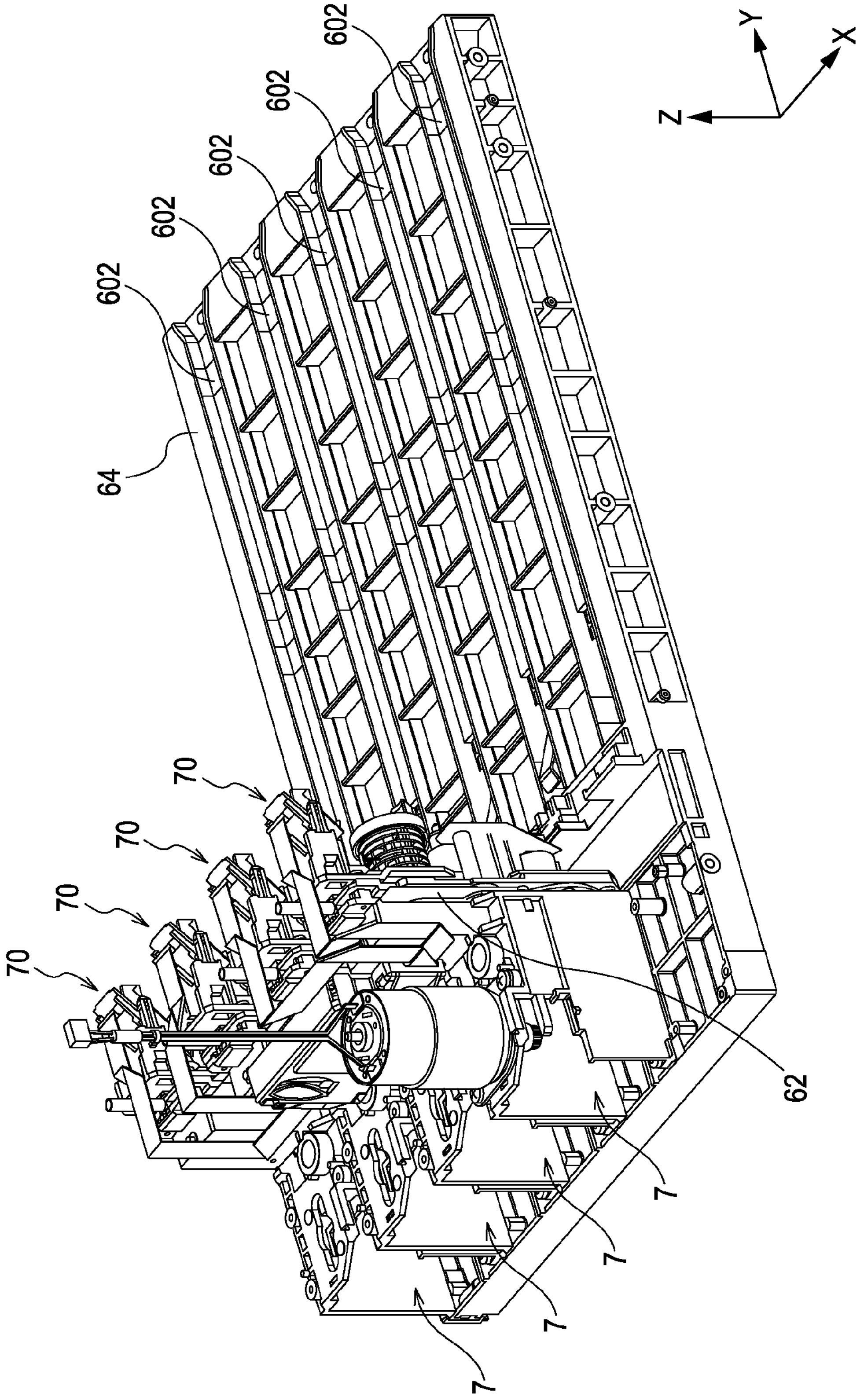
FIG. 9 is a fifth external perspective view of the cartridge mounting unit.

The detailed configuration of the cartridge mounting unit 6 will be described using FIGS. 5 to 9. FIG. 5 is a first external perspective view of the cartridge mounting unit 6. FIG. 6 is a second external perspective view of the cartridge mounting unit 6. FIG. 7 is a third external perspective view of the cartridge mounting unit 6. FIG. 8 is a fourth external perspective view of the cartridge mounting unit 6. FIG. 9 is a fifth external perspective view of the cartridge mounting unit 6. In addition, in FIGS. 5 and 8, the tube 24 mounted to the cartridge mounting unit 6 is illustrated. In addition, in FIGS. 6, 7, and 9, illustration of partial configurations is omitted so that the internal configuration of cartridge mounting unit 6 is visible. In addition, the cartridge mounting unit 6 of this example has the four cartridges 4 that are independently attachable and detachable and is configured so that the number of cartridges 4 attached and detached is increased depending on the specification of the printer 10. That is, as illustrated in FIG. 6, on the farthest +X axis direction side, reserve mounting spaces or members are provided so that the increased number of cartridges 4 are able to be mounted thereto.

As illustrated in FIG. 5, in the cartridge mounting unit 6, a cartridge accommodation chamber 61 that accommodates the cartridges 4 is formed by six wall portions mentioned below. The cartridge accommodation chamber 61 has an approximate rectangular parallelepiped shape. The shape of the cartridge accommodation chamber 61 corresponds to the external shape of the cartridges 4. In addition, in the cartridge accommodation chamber 61, each part that accommodates one of the four cartridges 4 is called a slot.

The cartridge mounting unit 6 includes an apparatus side front wall portion 62, a first apparatus side side wall portion 63, and a second apparatus side side wall portion 64. In addition, the cartridge mounting unit 6 includes a third apparatus side side wall portion 65, a fourth apparatus side side wall portion 66, and an opening wall portion 67. The cartridge accommodation chamber 61 is partitioned and formed by the six wall portions 62, 63, 64, 65, 66, and 67. Each of the external shapes of the six wall portions 62, 63, 64, 65, 66, and 67 is an approximately rectangular shape.

As illustrated in FIGS. 5 and 6, the apparatus side front wall portion 62 is positioned on the −Y axis direction side with respect to the cartridge accommodation chamber 61. The apparatus side front wall portion 62 is a vertical wall portion in the use state of the printer 10.

As illustrated in FIG. 6, in the apparatus side front wall portion 62, the apparatus side terminal unit 70, a printing material supply mechanism 640, and the rod 662 are provided. Specifically, in the order directed from the +Z axis direction to the −Z axis direction, the apparatus side terminal unit 70, the printing material supply mechanism 640, and the rod 662 are arranged. The apparatus side terminal unit 70 and the printing material supply mechanism 640 are provided in the surface on the +Y axis direction side (the side where the cartridge accommodation chamber 61 is positioned) of the apparatus side front wall portion 62. In addition, the rod 662 is provided to penetrate through the apparatus side front wall portion 62 in the Y axis direction. On the −Y axis direction side (on the opposite side to the cartridge accommodation chamber 61) of the apparatus side front wall portion 62, the pumping mechanism 7 is provided.

The printing material supply mechanism 640 includes the printing material supply tube 642 described above and is used to circulate the ink in the cartridge 4 toward the printer 10. The apparatus side terminal unit 70 includes the above-described apparatus side terminal group 721 (FIG. 7) and the connector 739 (FIG. 6) and is used to electrically connect the cartridge 4 and the printer 10 to each other. As illustrated in FIG. 6, the apparatus side terminal unit 70 is provided closer to the first apparatus side side wall portion 63 side (the +Z axis direction side) than the printing material supply tube 642. The rod 662 is used to detect the ink end state of the cartridge 4 by the printer 10 side. That is, the rod 662 constitutes a part of a detecting mechanism of the printer 10 described later. In addition, the rod 662 also functions as a positioning member for suppressing a positional deviation from the correct mounting position when the cartridge 4 is mounted to the cartridge mounting unit 6. In addition, the detailed configuration of each of the apparatus side terminal unit 70, the printing material supply mechanism 640, and the rod 662 will be described later.

As illustrated in FIG. 5, the first apparatus side side wall portion 63 is positioned on the +Z axis direction side with respect to the cartridge accommodation chamber 61. The first apparatus side side wall portion 63 is provided in a direction intersecting the apparatus side front wall portion 62. In this example, the first apparatus side side wall portion 63 is provided in a direction orthogonal to the apparatus side front wall portion 62. The first apparatus side side wall portion 63 is a horizontal wall portion in the use state of the printer 10. The first apparatus side side wall portion 63 constitutes the upper surface of the cartridge mounting unit 6. In addition, in this specification, "intersect" means any state of (i) a state where two elements intersect each other and actually intersect, (ii) a state where one element intersects the other element when extending, and (iii) a state where mutual elements intersect each other in a case where each of the mutual elements extends.

As illustrated in FIG. 7, the first apparatus side side wall portion 63 has first rails 682 for guiding the cartridges 4 to the mounting positions. The first rails 682 are provided to correspond to at least the number of cartridges 4 mounted. In this example, four corresponding to the number of cartridges 4 actually mounted and one reserve, that is, a total of five first rails 682 are provided. The first rails 682 are grooves which extend in the Y axis direction and into which parts of the cartridges 4 are inserted. In addition, an end portion on the −Y axis direction side of the first rail 682 is provided with a leaf spring 684 as a locking member. In the mounted state, as the leaf spring 684 locks the cartridge 4, the cartridge 4 is prevented from coming away from the cartridge mounting unit 6.

As illustrated in FIGS. 5, 6, and 9, the second apparatus side side wall portion 64 is positioned on the −Z axis direction side with respect to the cartridge accommodation chamber 61. The second apparatus side side wall portion 64 opposes the first apparatus side side wall portion 63 with the cartridge accommodation chamber 61 interposed therebetween. The second apparatus side side wall portion 64 is provided in a direction intersecting the apparatus side front wall portion 62. In this example, the second apparatus side side wall portion 64 is orthogonal to the apparatus side front wall portion 62. The second apparatus side side wall portion 64 is a horizontal wall portion in the use state of the printer 10. The second apparatus side side wall portion 64 constitutes the bottom surface of the cartridge mounting unit 6.

As illustrated in FIG. 6, the second apparatus side side wall portion 64 has second rails 602 for guiding the cartridges 4 to the mounting positions. The second rails 602 are provided to correspond to at least the number of cartridges 4 mounted. In this example, five second rails 602 are provided like the first rails 682. The second rails 602 are grooves which extend in the Y axis direction and into which parts of the cartridges 4 are inserted. In addition, an end portion on the −Y axis direction side of the second rail 602 is provided with a leaf spring 604 as a locking member. In the mounted state, as the leaf spring 604 locks the cartridge 4, the cartridge 4 is prevented from coming away from the cartridge mounting unit 6. The first rail 682 and the second rail 602 having the same cartridge 4 mounted therebetween are provided at positions facing each other with the cartridge accommodation chamber 61 interposed therebetween.

The dimensions in the X axis direction of the first rail 682 and the second rail 602 are different from each other. Specifically, the dimension in the X axis direction of the first rail 682 is smaller than that of the second rail 602. Accordingly, in a case where the cartridge 4 is to be inserted into the cartridge mounting unit 6 while the dimension in the Z axis direction is reversed by mistake, a configuration in which the cartridge 4 is not able to be inserted between the first and second rails 682 and 602 is achieved. Accordingly, the possibility of the cartridge 4 being inserted into the cartridge mounting unit 6 in a wrong state in which the direction in the Z axis direction is reversed may be reduced.

In addition, as illustrated in FIG. 6, in the second apparatus side side wall portion 64, at positions close to the apparatus side front wall portion 62, apparatus side identification members 610 are provided. The apparatus side identification members 610 are provided to correspond to the number of cartridges 4 mounted. In this example, four apparatus side identification members 610 are provided. The apparatus side identification members 610 are used to identify whether or not the correct type (in this example, ink color) of cartridge 4 is mounted in each slot of the cartridge accommodation chamber 61. The apparatus side identification members 610 form different shapes depending on the colors of ink in the mounted cartridges 4. Specifically, each of the apparatus side identification members 610 is formed by one or more ribs, and a pattern determined by the number of ribs and the positions thereof varies depending on the type of the cartridge 4. In the cartridge 4, an identification member (also referred to as a "cartridge side identification member") formed by ribs is provided. The identification members of the cartridges 4 form different shapes depending on the colors of the ink accommodated. In addition, in a case where the correct type of cartridge 4 is inserted into the slot, the apparatus side identification member 610 and the cartridge side identification member are fitted to each other. On the other hand, in a case where a wrong type of cartridge 4 is inserted into the slot, the apparatus side identification member 610 and the cartridge side identification member are not able to be fitted to each other. Accordingly, the possibility of a wrong type of cartridge 4 being mounted into each of the slots of the cartridge mounting unit 6 may be reduced.

In addition, as illustrated in FIG. 6, in the second apparatus side side wall portion 64, at positions close to the apparatus side front wall portion 62, restriction members 612 are provided. The restriction members 612 are provided to correspond to the number of cartridges 4 mounted. In this example, although five restriction members 612 are provided, the number that is actually used is four. The restriction member 612 abuts onto the cartridge 4 when the cartridge 4 is inserted into the cartridge accommodation chamber 61 of the cartridge mounting unit 6 toward the apparatus side front wall portion 62 on the −Y axis direction side from the insertion hole 69 (FIG. 5) on the +Y axis side and reaches the correct mounting position. Accordingly, the possibility of the cartridge 4 being further pushed from the correct mounting position may be reduced.

As illustrated in FIG. 5, the opening wall portion 67 is positioned on the +Y axis direction side with respect to the cartridge accommodation chamber 61. The opening wall portion 67 has the insertion hole 69 for passing the cartridge 4 therethrough during attaching and detaching of the cartridge 4. The opening wall portion 67 opposes the apparatus side front wall portion 62 with the cartridge accommodation chamber 61 interposed therebetween. The opening wall portion 67 is provided in the direction intersecting the first apparatus side side wall portion 63 and the second apparatus side side wall portion 64. In this example, the opening wall portion 67 is orthogonal to the first apparatus side side wall portion 63 and the second apparatus side side wall portion 64. The opening wall portion 67 is a vertical wall portion in the use state of the printer 10.

The opening wall portion 67 is provided with the levers 672 that are movable in the Z axis direction. The lever 672 is moved in the −Z axis direction after the cartridge 4 is mounted to the cartridge mounting unit 6. Accordingly, the lever 672 is caught on the cartridge 4 and prevents the cartridge 4 from being detached by mistake. The state in which the lever 672 is caught on the cartridge 4 is a state shown by the three levers 672 corresponding to the three cartridges 4 positioned on the +X axis direction of FIG. 2.

As illustrated in FIGS. 5 and 8, the third apparatus side side wall portion 65 is positioned on the +X axis direction side with respect to the cartridge accommodation chamber 61. The third apparatus side side wall portion 65 is provided in a direction intersecting the apparatus side front wall portion 62, the first apparatus side side wall portion 63, the second apparatus side side wall portion 64, and the opening wall portion 67. In this example, the third apparatus side side wall portion 65 is orthogonal to the apparatus side front wall portion 62, the first apparatus side side wall portion 63, the second apparatus side side wall portion 64, and the opening wall portion 67. The third apparatus side side wall portion 65 is a vertical wall portion in the use state of the printer 10. The third apparatus side side wall portion 65 constitutes the side surface of the cartridge mounting unit 6.

As illustrated in FIG. 5, the fourth apparatus side side wall portion 66 is positioned on the −X axis direction side with respect to the cartridge accommodation chamber 61. The fourth apparatus side side wall portion 66 opposes the third apparatus side side wall portion 65 with the cartridge accommodation chamber 61 interposed therebetween. The fourth apparatus side side wall portion 66 is provided in a direction intersecting the apparatus side front wall portion 62, the first apparatus side side wall portion 63, the second apparatus side side wall portion 64, and the opening wall portion 67. In this example, the fourth apparatus side side wall portion 66 is orthogonal to the apparatus side front wall portion 62, the first apparatus side side wall portion 63, the second apparatus side side wall portion 64, and the opening wall portion 67. The fourth apparatus side side wall portion 66 is a vertical wall portion in the use state of the printer 10. The fourth apparatus side side wall portion 66 constitutes the side surface of the cartridge mounting unit 6.

From the arrangement of the wall portions 62, 63, 64, 65, 66, and 67, the following relationship may be defined. The direction in which the apparatus side front wall portion 62 and the opening wall portion 67 or the insertion hole 69 oppose each other is the Y axis direction. The direction directed from the opening wall portion 67 or the insertion hole 69 to the apparatus side front wall portion 62, that is, the direction in which the cartridge 4 is inserted (mounted) into the cartridge mounting unit 6 is the −Y axis direction, and the reverse direction, that is, the direction in which the cartridge 4 is pulled out of (detached from) the cartridge mounting unit 6 is the +Y axis direction. The direction in which the first apparatus side side wall portion 63 and the second apparatus side side wall portion 64 oppose each other is the Z axis direction. The direction directed from the first apparatus side side wall portion 63 to the second apparatus side side wall portion 64 is the −Z axis direction, and the reverse direction is the +Z axis direction. The direction in which the third apparatus side side wall portion 65 and the fourth apparatus side side wall portion 66 oppose each other is the X axis direction. The direction directed from the third apparatus side side wall portion 65 to the fourth apparatus side side wall portion 66 is the −X axis direction, and the reverse direction is the +X axis direction.

Figure 10:
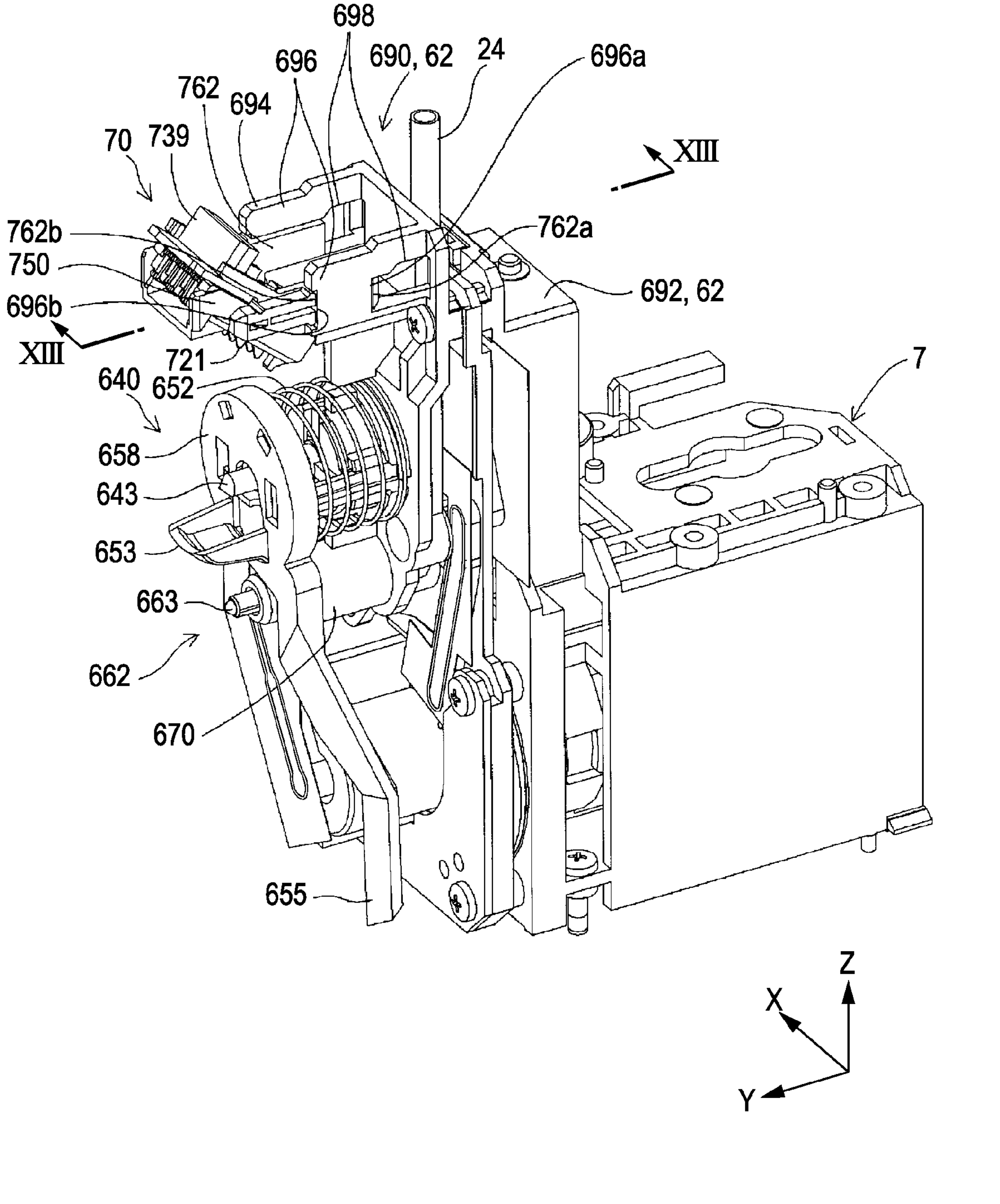
FIG. 10 is a first external perspective view of an apparatus side front wall portion and the peripheral members thereof.
Figure 11:
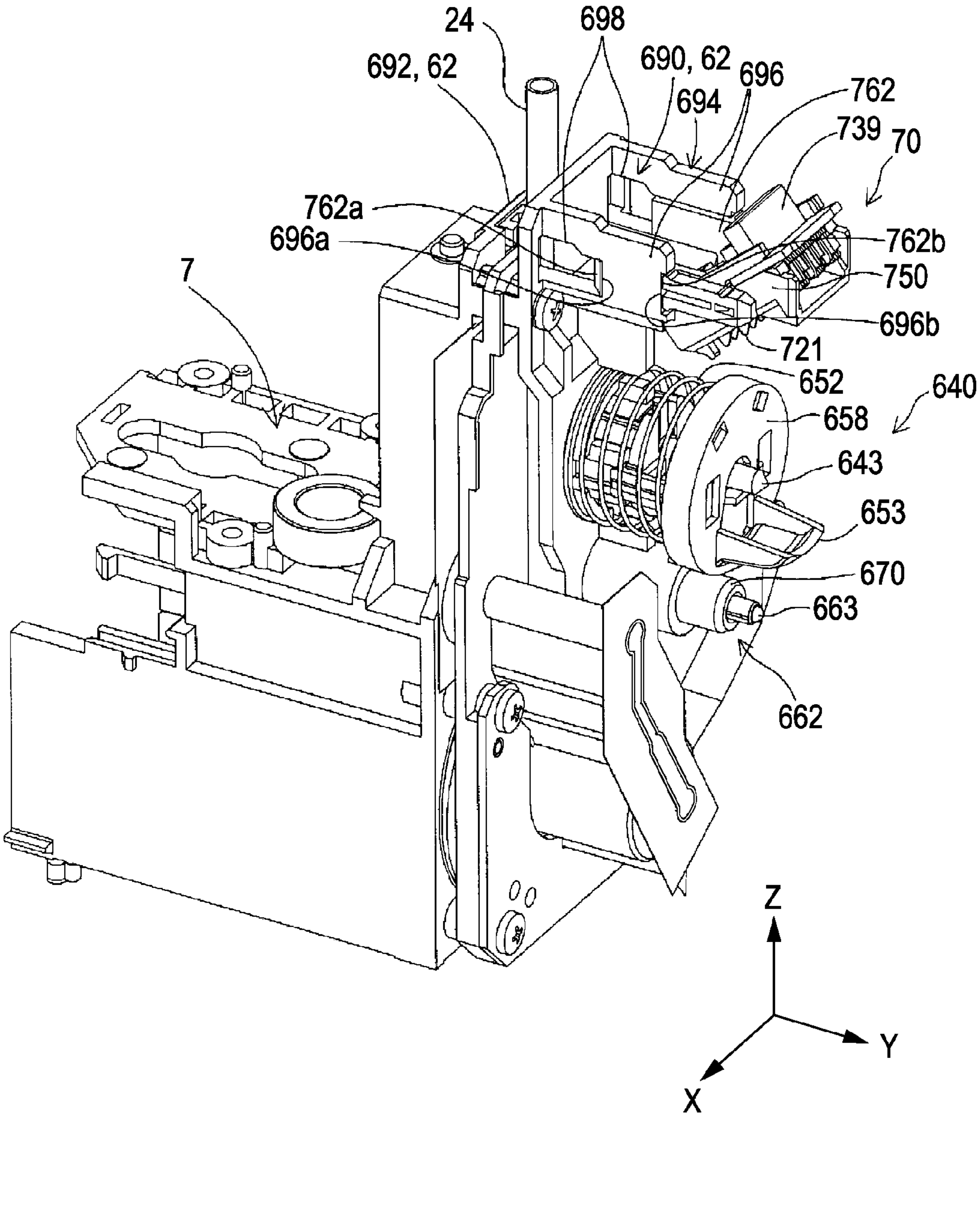
FIG. 11 is a second external perspective view of the apparatus side front wall portion and the peripheral members thereof.
Figure 12:
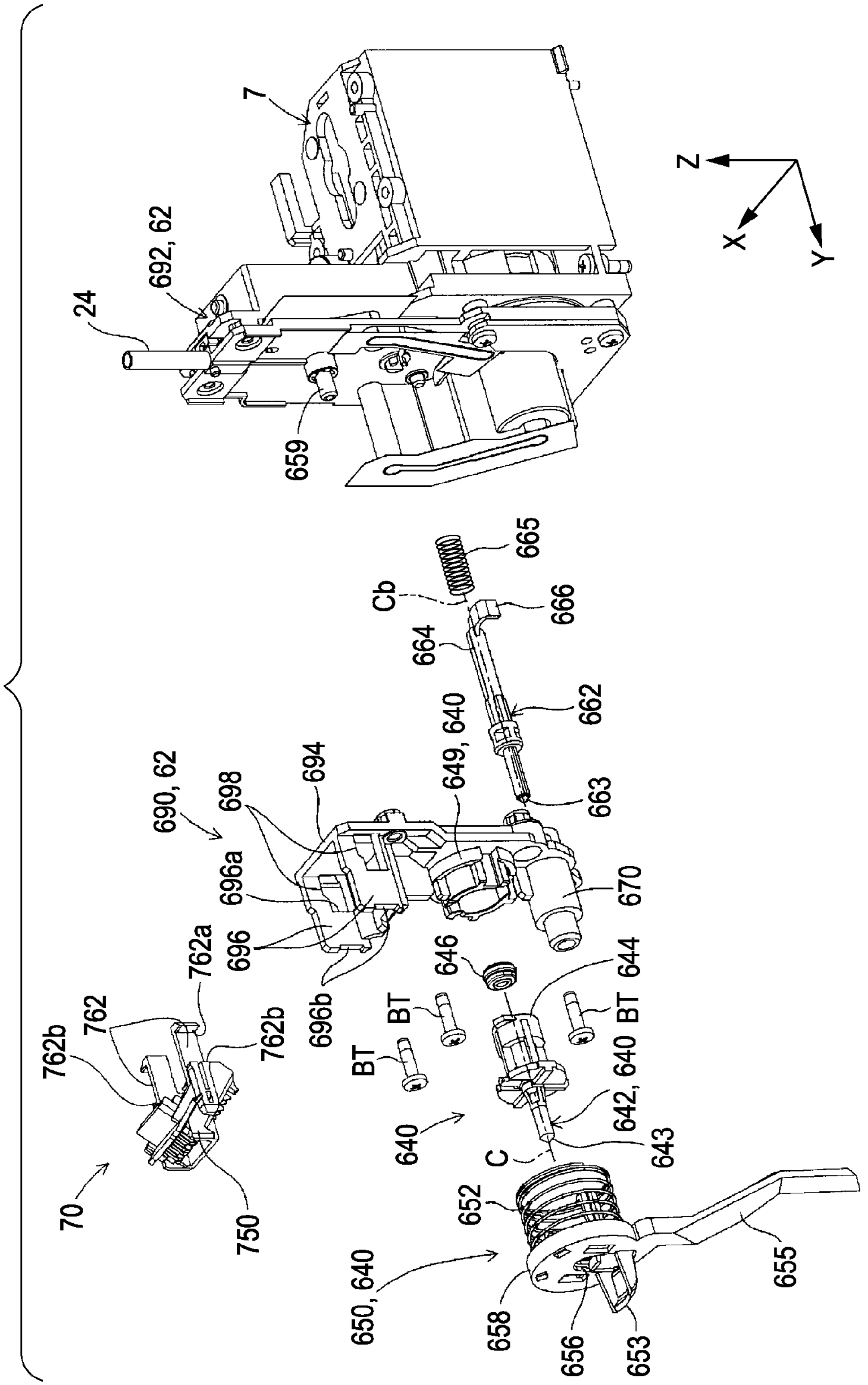
FIG. 12 is an exploded perspective view of the apparatus side front wall portion and the peripheral members thereof.
Figure 13:
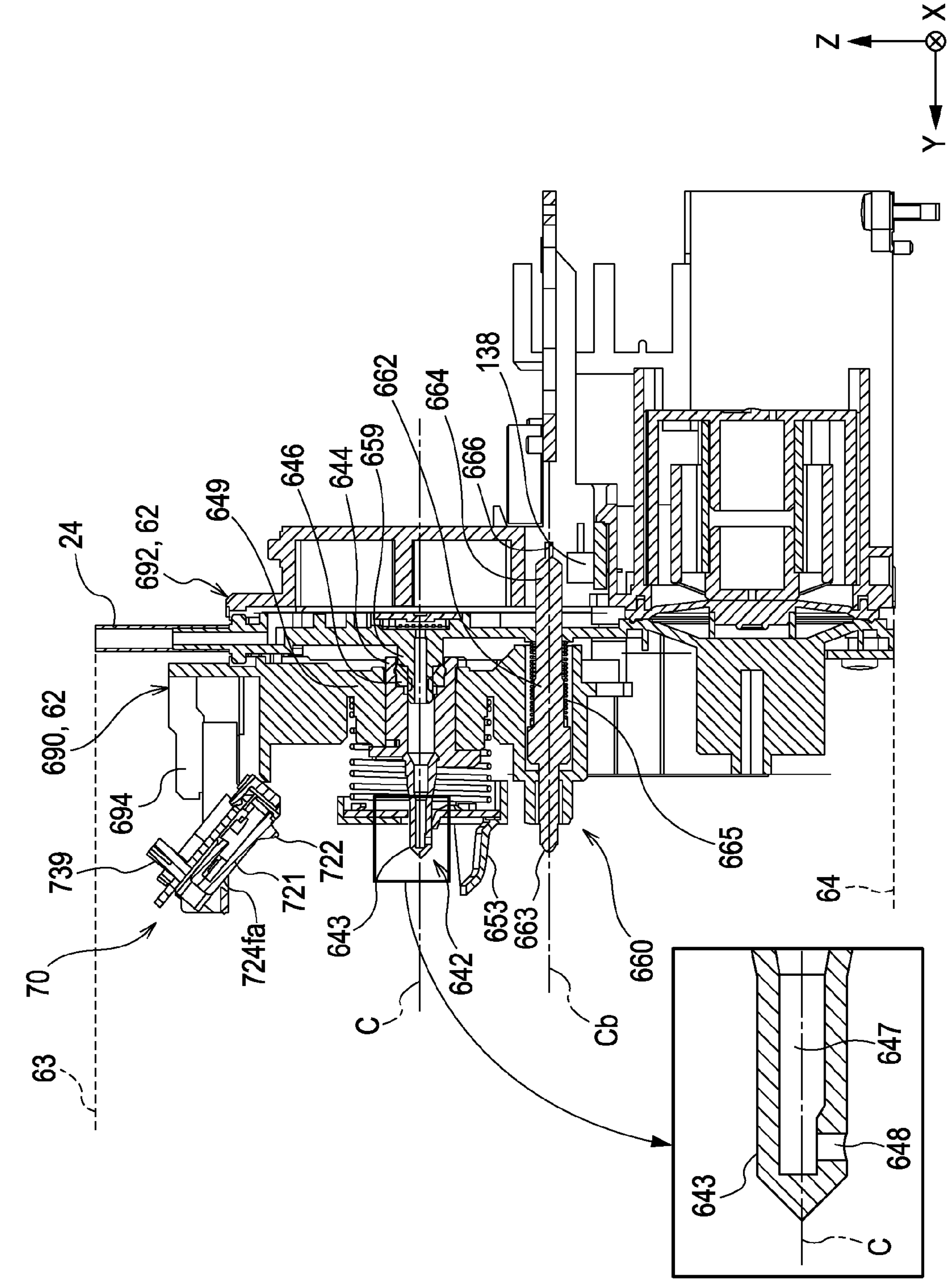
FIG. 13 is a cross-sectional view taken along the line XIII-XIII of FIG. 10.

A-3. Detailed Configuration of Each Constituent Member of Cartridge Mounting Unit Next, the detailed configurations of the members 70, 640, and 662 provided in the apparatus side front wall portion 62 will be described using FIGS. 10 to 13. FIG. 10 is a first external perspective view of the apparatus side front wall portion 62 and the peripheral members thereof. FIG. 11 is a second external perspective view of the apparatus side front wall portion 62 and the peripheral members thereof. FIG. 12 is an exploded perspective view of the apparatus side front wall portion 62 and the peripheral members thereof. FIG. 13 is a cross-sectional view taken along the line XIII-XIII of FIG. 10.

As illustrated in FIGS. 10 and 11, for each of the slots of the cartridge mounting unit 6, the apparatus side terminal unit 70, the printing material supply mechanism 640, and the rod 662 are provided in the apparatus side front wall portion 62 in this order from the +Z axis direction in the −Z axis direction. As illustrated in FIG. 12, the apparatus side front wall portion 62 includes a first front wall portion 690 and a second front wall portion 692. The first front wall portion 690 is mounted to the second front wall portion 692 by bolts BT.

A-3-1. Detailed Configuration of Printing Material Supply Mechanism 640

As illustrated in FIG. 12, the printing material supply mechanism 640 includes a cover member 650, the printing material supply tube 642, a seal member 646, and a mounting member 649.

The printing material supply tube 642 is connected to a circulation tube 659 provided in the second front wall portion 692. Specifically, the printing material supply tube 642 is inserted into the cylindrical mounting member 649 and is connected to the circulation tube 659 inserted in the mounting member 649 in the same manner. The circulation tube 659 communicates with the tube 24.

As illustrated in FIG. 13, the printing material supply tube 642 has a supply passage 647 having a circular passage cross-section therein. The +Y axis direction side of the circumference of the printing material supply tube 642 is provided with a communication hole 648 that causes the outside and the supply passage 647 to communicate with each other. The ink of the cartridge 4 circulates through the communication hole 648, the supply passage 647, and the internal passage of the circulation tube 659 and flows to the tube 24.

The seal member 646 is disposed between the outer periphery of the circulation tube 659 and the inner periphery of the printing material supply tube 642. The seal member 646 is an elastic member (for example, rubber) and prevents the ink from leaking out. In addition, in this example, the mounting member 649 is a part of the first front wall portion 690.

The printing material supply tube 642 has a center axis C. As illustrated in FIGS. 12 and 13, the printing material supply tube 642 has a base end portion 644 fixed to the apparatus side front wall portion 62 and a tip end portion 643 connected to the cartridge 4. Here, the axis parallel to the center axis C is the Y axis. In addition, regarding the direction along the Y axis (Y axis direction), the direction directed from the base end portion 644 to the tip end portion 643 is the +Y axis direction, and the reverse direction to the +Y axis direction is the −Y axis direction.

As illustrated in FIG. 12, the cover member 650 is a member for reducing the possibility of the ink scattering out of the printing material supply tube 642 (specifically, the communication hole 648) during attaching and detaching of the cartridge 4. The cover member 650 includes an impelling member 652, an abutting member 658, a scattering prevention portion 653, and a communication portion 655. The abutting member 658 has an approximately circular external form. The abutting member 658 abuts onto the cartridge 4. The abutting member 658 is configured to be movable in the Y axis direction. The center of the abutting member 658 is provided with a through-hole 656 through which the printing material supply tube 642 is inserted. The scattering prevention portion 653 receives, in a case where ink leaks from the printing material supply tube 642, the leaking ink. Accordingly, the possibility of the ink scattering at the periphery of the printing material supply tube 642 may be reduced. The scattering prevention portion 653 has a concave shape. The impelling member 652 is a coil spring. One end of the impelling member 652 abuts onto the abutting member 658, and the other end thereof abuts onto the first front wall portion 690. In the mounted state, the impelling member 652 impels the abutting member 658 to be pressed against the cartridge 4. When the cartridge 4 is mounted to the cartridge mounting unit 6, as the cartridge 4 causes the abutting member 658 to advance in the −Y axis direction, the scattering prevention portion 653 also moves in the −Y axis direction. The scattering prevention portion 653 is disposed on the −Z axis direction side of (immediately below) the printing material supply tube 642 regardless of the displacement between a state before the cartridge 4 is mounted and the mounted state. Specifically, the scattering prevention portion 653 is disposed on the −Z axis direction side of (immediately below) the communication hole 648 of the abutting member 658 regardless of the displacement between the state before the cartridge 4 is mounted and the mounted state. The ink received by the scattering prevention portion 653 circulates inside the communication portion 655 and reaches an absorbing material (not shown) provided in the cartridge mounting unit 6.

A-3-2. Detailed Configuration of Rod 662

As illustrated in FIGS. 12 and 13, the rod 662 includes a center axis Cb parallel to the Y axis direction. The outer periphery of the rod 662 is provided with an impelling member 665 and a rod cover 670. The rod cover 670 is cylindrical, and the rod 662 and the impelling member 665 are inserted therein. The rod cover 670 is a part of the first front wall portion 690. The rod 662 is configured to be movable in the Y axis direction. The rod 662 includes one end portion 663 positioned on the +Y axis direction side and the other end portion 664 positioned on the −Y axis direction side. As illustrated in FIGS. 10 and 11, the one end portion 663 protrudes from the rod cover 670 toward the +Y axis direction side. In the mounted state, the one end portion 663 abuts onto the lever member 490 (FIG. 4) of the cartridge 4. The other end portion 664 is positioned closer to the −Y axis direction side than the apparatus side front wall portion 62. The other end portion 664 has a light-shielding portion 666. In addition, a sensor 138 is provided closer to the −Y axis direction side than the apparatus side front wall portion 62, and by detecting the displacement of the light-shielding portion 666 using the sensor 138, the ink end state is detected by the control unit 31 of the printer 10. The impelling member 665 is a coil spring. The impelling member 665 impels the rod 662 against the +Y axis direction side. In addition, a method of detecting the ink end using the rod 662 will be described later.

The rod 662 is positioned an intermediate position between the first apparatus side side wall portion 63 and the second apparatus side side wall portion 64 in the apparatus side front wall portion 62. Specifically, in the Z axis direction, the rod 662 is provided at an intermediate position of a line segment that connects the inner surface of the first apparatus side side wall portion 63 and the second apparatus side side wall portion 64. That is, as illustrated in FIG. 13, the center axis Cb of the rod 662 is disposed at the intermediate position in the Z axis direction between the first apparatus side side wall portion 63 and the second apparatus side side wall portion 64. Here, the "intermediate position" may not necessarily be completely intermediate and may not be disposed to be inclined toward any one of the first and second apparatus side side wall portions 63 and 64. For example, the "intermediate position" includes a position in a range of 10% from the center position of the distance between the inner wall surfaces in the Z axis direction of the first apparatus side side wall portion 63 and the second apparatus side side wall portion 64.

A-3-3. Detailed Configuration of Apparatus Side Terminal Unit 70

As illustrated in FIGS. 10 and 11, the apparatus side terminal unit 70 is provided in a terminal mounting portion 694. Specifically, as illustrated in FIG. 12, the apparatus side terminal unit 70 is mounted to the terminal mounting portion 694 as a pair of terminal side fitting portions 762 are fitted in the terminal mounting portion 694. In addition, the apparatus side terminal unit 70 is mounted in a state of being movable in the X axis direction and the Z axis direction with respect to the apparatus side front wall portion 62 (specifically, the terminal mounting portion 694). Specifically, the apparatus side terminal unit 70 is mounted to be slightly movable in the X axis direction and the Z axis direction with respect to the apparatus side front wall portion 62.

Figure 14:
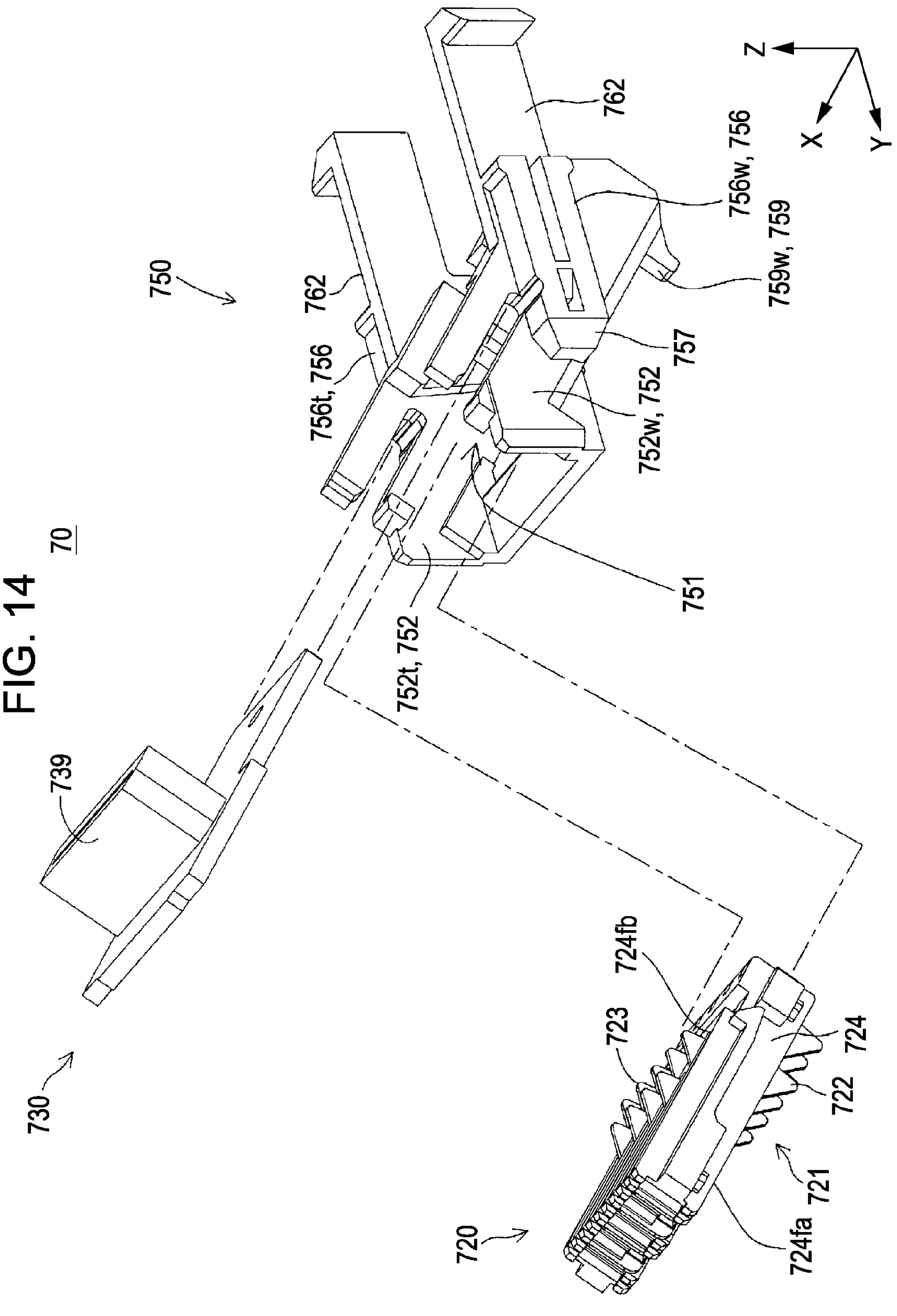
FIG. 14 is a first exploded perspective view of an apparatus side terminal unit.
Figure 15:
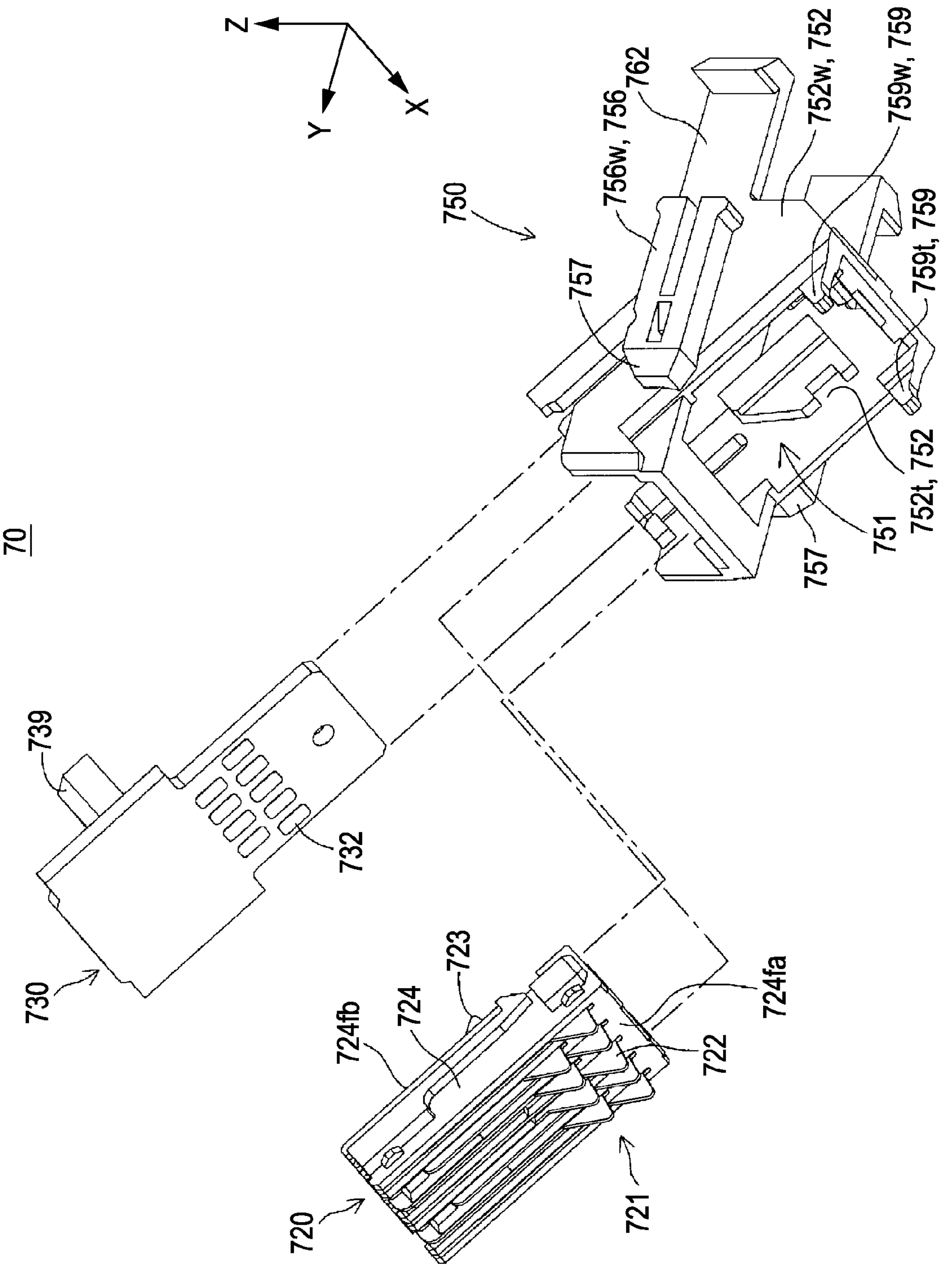
FIG. 15 is a second exploded perspective view of the apparatus side terminal unit.
Figure 16:
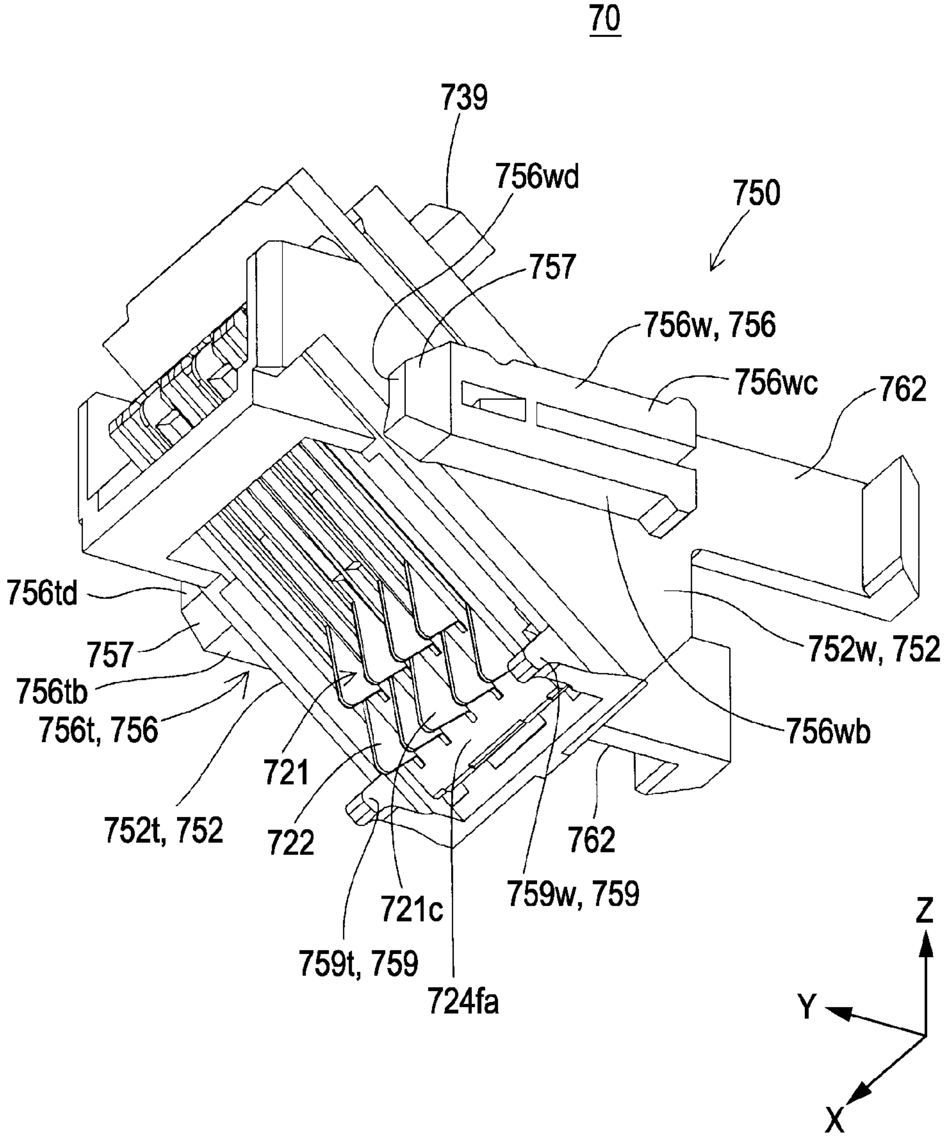
FIG. 16 is a first external perspective view of the apparatus side terminal unit.
Figure 17:
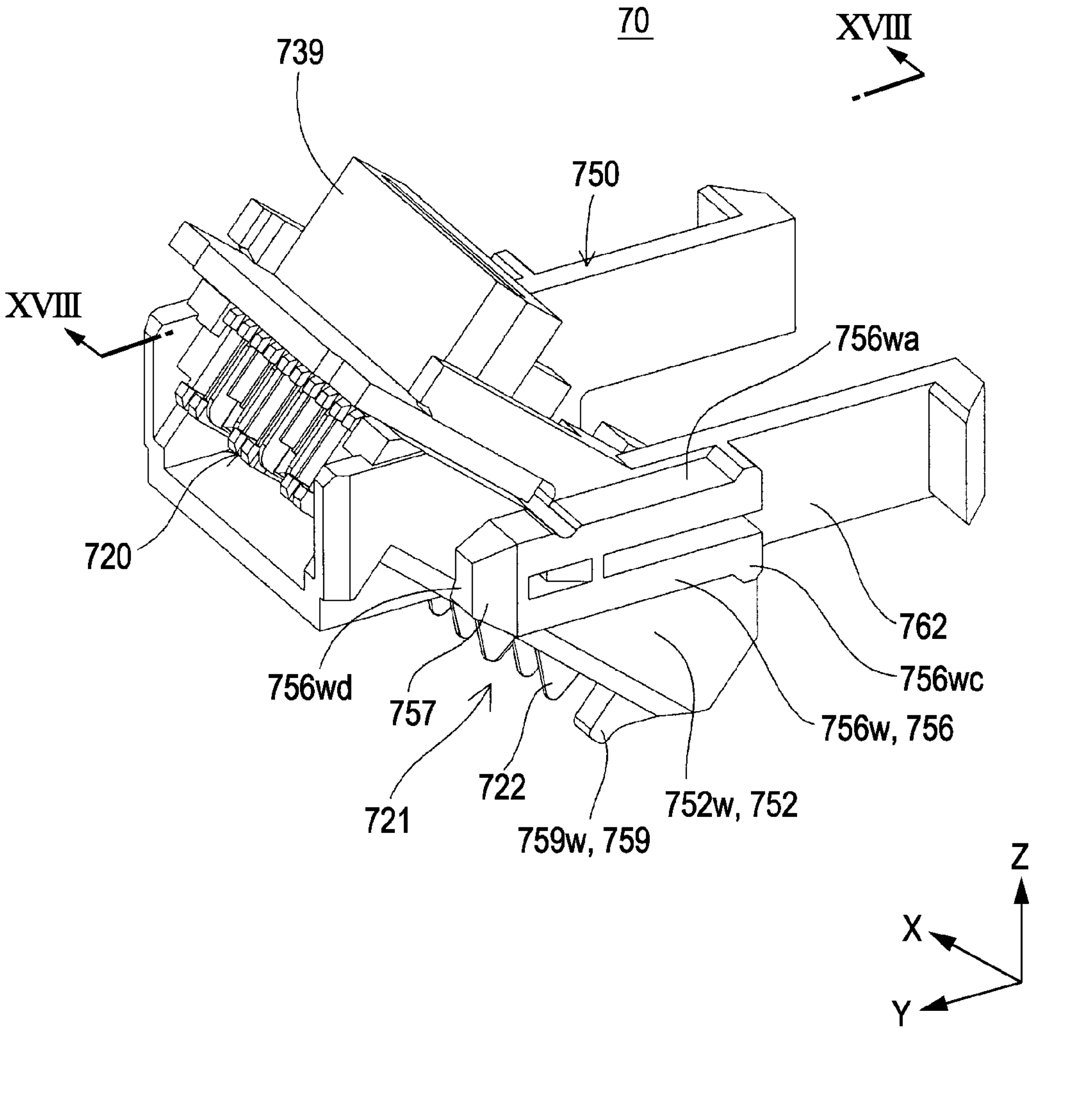
FIG. 17 is a second external perspective view of the apparatus side terminal unit.
Figure 18:
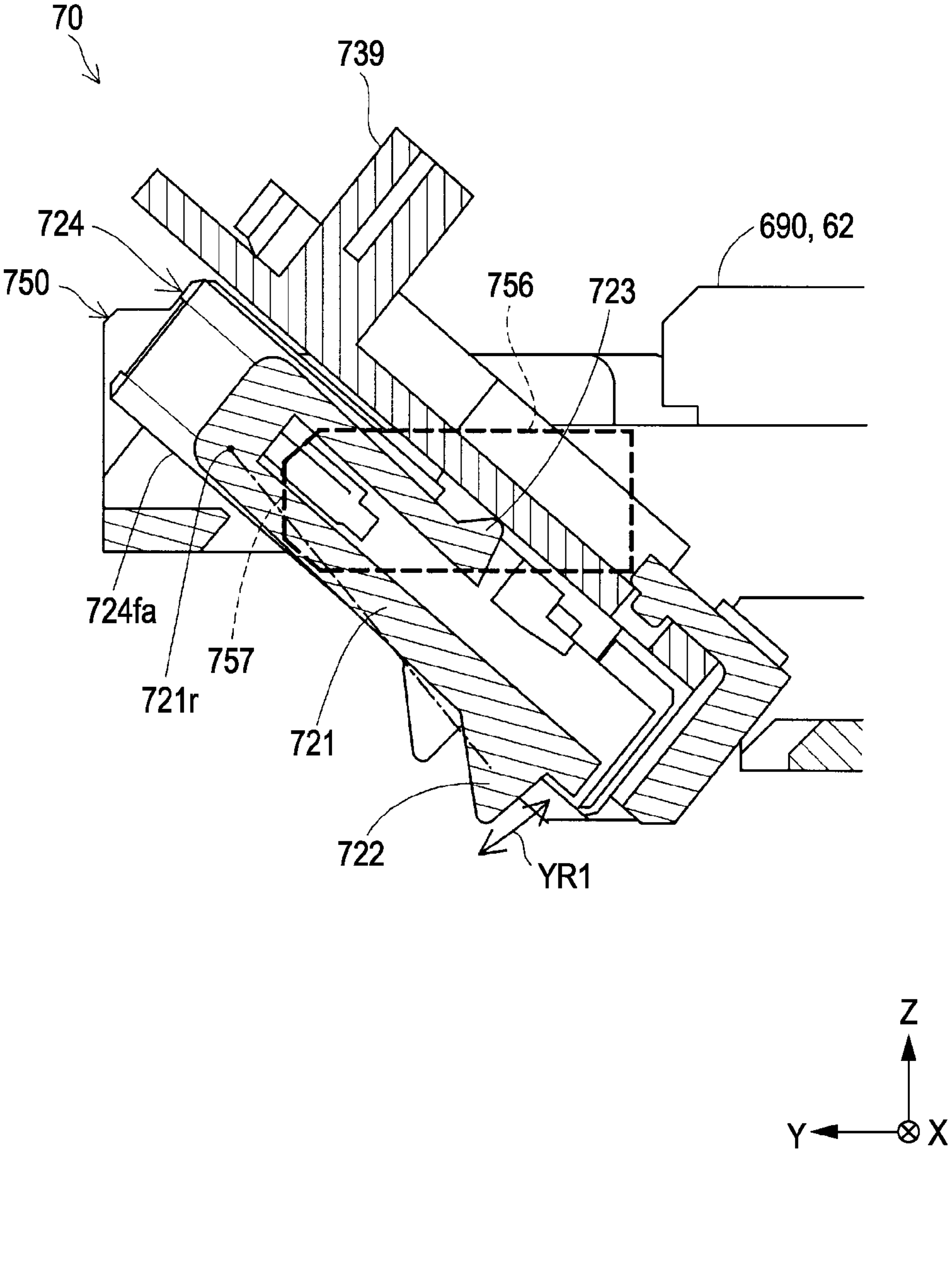
FIG. 18 is a cross-sectional view taken along the line XVIII-XVIII of FIG. 17.

Moreover, the apparatus side terminal unit 70 will be described using FIGS. 14 to 18. FIG. 14 is a first exploded perspective view of the apparatus side terminal unit 70. FIG. 15 is a second exploded perspective view of the apparatus side terminal unit 70. FIG. 16 is a first external perspective view of the apparatus side terminal unit 70. FIG. 17 is a second external perspective view of the apparatus side terminal unit 70. FIG. 18 is a cross-sectional view taken along the line XVIII-XVIII of FIG. 17. In addition, in FIG. 18, a part of the first front wall portion 690 is illustrated by solid lines and a positioning portion 756 is illustrated by a dotted line for ease of understanding.

As illustrated in FIGS. 14 and 15, the apparatus side terminal unit 70 includes the apparatus side terminal group 721, a terminal block 724, and a holder 750. In addition, the apparatus side terminal unit 70 includes a connector substrate 730. The connector substrate 730 includes a terminal group 732 (FIG. 15) provided on the surface and the connector 739 provided on the rear surface. The terminal group 732 is constituted by a plurality of (in this example, nine) terminals and is electrically connected to the connector 739.

The apparatus side terminal group 721 includes a plurality of (in this example, nine) terminals. Each of the terminals of the apparatus side terminal group 721 is configured so as to be elastically deformable. Each of the terminals of the apparatus side terminal group 721 is configured of a U-shaped leaf spring. One of the tip ends of each of the terminals is exposed from a surface **724*fa* of the terminal block 724. The tip end portion exposed from the surface 724*fa* of the terminal block 724 becomes a terminal contact point 722 that comes into contact with a corresponding cartridge side terminal of the circuit board 50 of the cartridge 4 in the mounted state. That is, the terminal contact point 722 is provided on the surface 724*fa* of the terminal block 724. The other of the tip ends of each of the terminals is exposed from a rear surface 724*fb* of the terminal block 724. The tip end portion exposed from the rear surface 724*fb* of the terminal block 724 becomes a terminal contact point 723 that comes into contact with a corresponding terminal of the terminal group 732. That is, the terminal contact point 723 is provided on the rear surface 724*fb* of the terminal block 724**.

The terminal block 724 holds the apparatus side terminal group 721. In addition, the terminal block 724 holds the apparatus side terminal group 721 so that the one tip end portion that constitutes the terminal contact point 722 is exposed from the surface 724*fa* thereof. In addition, the terminal block 724 holds the apparatus side terminal group 721 so that the other tip end portion that constitutes the terminal contact point 723 is exposed from the rear surface 724*fb* thereof. In addition, as illustrated in FIG. 18, the terminal block 724 holds the apparatus side terminal group 721 so that each of the terminals of the apparatus side terminal group 721 moves about an axis 721*r* parallel to the X axis direction through elastic deformation. In other words, the terminal block 724 holds the apparatus side terminal group 721 so that the terminal contact point 722 moves as each of the terminals of the apparatus side terminal group 721 elastically deforms along a predetermined plane.

As illustrated in FIGS. 14 to 18, the holder 750 holds the terminal block 724 and the connector substrate 730. Specifically, the holder 750 has an accommodation space 751, and the terminal block 724 and the connector substrate 730 are accommodated in the accommodation space 751 so as to be held by the holder 750. In addition, as illustrated in FIG. 18, the holder 750 holds the terminal block 724 in a state (called a "first state") where the surface 724*fa* of the terminal block 724 is in a direction parallel to the X axis while being tilted in a direction including a +Y axis direction component and a −Z axis direction component. In other words, the holder 750 holds the terminal block 724 so that the surface 724*fa* of the terminal block 724 is tilted with respect to the Y axis and the Z axis. As the terminal block 724 is held by the holder 750 in this state, the contact point 722 of the apparatus side terminal group 721 is provided on the surface 724*fa* tilted in the direction including the +Y axis direction component and the −Z axis direction component. In addition, the holder 750 holds the terminal block 724 in a state (called a "second state") where the axis 721*r* is positioned closer to the +Y axis direction side and the +Z axis direction side than the terminal contact point 722. As the holder 750 holds the terminal block 724 while satisfying the first state and the second state, the terminal contact point 722 is in a state of being elastically deformable in the direction of an arrow YR1 as illustrated in FIG. 18. From a different viewpoint, the elastic deformation of the apparatus side terminal group 721 will be described below. The holder 750 holds the terminal block 724 in a state where a predetermined plane on which each of the terminals of the apparatus side terminal group 721 elastically deforms is a plane (also called a "YZ plane") parallel to the Y axis and the Z axis. As the holder 750 holds the terminal block 724 as such, each of the contact points 722 is in a state of being movable on the YZ plane.

As illustrated in FIGS. 14 and 15, the holder 750 has a pair of wall portions 752 positioned on both sides in the X axis direction of the accommodation space 751 and a pair of the positioning portions 756 provided in the wall portions 752. Here, one of the pair of wall portions 752 positioned on the +X axis direction side with respect to the accommodation space 751 is also called a first wall portion 752*t*, and the other thereof positioned on the −X axis direction side is also called a second wall portion 752*w*. In addition, one of the pair of positioning portions 756 provided in the first wall portion 752*t* is also called a first positioning portion 756*t*, and the other thereof provided in the second wall portion 752*w* is also called a second positioning portion 756*w*. In addition, in a case of using the first wall portion 752*t* and the second wall portion 752*w* without distinguishment therebetween, the wall portion 752 is used for the description. In addition, in a case of using the first positioning portion 756*t* and the second positioning portion 756*w* without distinguishment therebetween, the positioning portion 756 is used for the description.

The first wall portion 752*t* and the second wall portion 752*w* are walls that partition and form the accommodation space 751. The first positioning portion 756*t* and the second positioning portion 756*w* are respectively positioned on the +X axis direction side and the −X axis direction side of the surface 724*fa* of the terminal block 724. The first and second positioning portions 756*t* and 756*w* guide the cartridge 4 and the apparatus side terminal unit 70 to the contact position where the terminals of the apparatus side terminal group 721 respectively come into contact with the corresponding terminals of the cartridge side terminal group when the cartridge 4 is mounted to the cartridge mounting unit 6. Specifically, the first positioning portion 756*t* and the second positioning portion 756*w* are configured to start being inserted into grooves formed in the cartridge 4 before contact between the apparatus side terminal group 721 and the cartridge side terminal group is started when the cartridge 4 is mounted to the cartridge mounting unit 6. Accordingly, the cartridge 4 and the apparatus side terminal unit 70 may be moved to the contact position with good accuracy. The first positioning portion 756*t* extends along the Y axis direction (the insertion direction of the cartridge 4). In addition, the first positioning portion 756*t* protrudes from the first wall portion 752*t* in the +X axis direction. The second positioning portion 756*w* extends along the Y axis direction (the insertion direction of the cartridge 4). In addition, the second positioning portion 756*w* protrudes from the second wall portion 752*w* in the −X axis direction. In this example, in order to realize the first configuration, as illustrated in FIG. 18, the positioning portion 756 is provided so that an end portion 757 on the +Y axis direction side of the positioning portion 756 is positioned closer to the +Y axis direction side than the closer contact point 722. In addition, the end portion 757 has a tapered shape in which the dimension in the Z axis direction increases in the −Y axis direction from the +Y axis direction. Accordingly, the positioning portion 756 may be easily inserted into a restriction portion of the cartridge 4 described later. Each of the positioning portions 756*t* and 756*w* has four contact surfaces that come into contact with the groove formed in the cartridge 4 in the mounted state in which the cartridge 4 is mounted to the cartridge mounting unit 6. In FIGS. 16 and 17, from the four contact surfaces, the contact surfaces 756*wa*, 756*wb*, 756*wc*, and 756*wd* of the positioning portion 756*w* and only the contact surfaces 756*tb* and 756*td* of the positioning portion 756*t* are illustrated. From the four contact surfaces, of the two surfaces that oppose each other in the Z axis direction, the surface positioned on the +Z axis direction side is called an A surface 756*ta* (FIGS. 33 to 36) and 756*wa*, and the surface positioned on the −Z axis direction side is called a B surface 756*tb* and 756*wb*. In addition, the surface intersecting the X axis direction is called a C surface 756*tc* (FIGS. 33 to 36) and 756*wc*. In addition, the front end surface in the +Y axis direction is called a D surface 756*td* and 756*wd*.

As illustrated in FIG. 16, the holder 750 has a pair of protrusions 759 that protrude in a direction in which the terminal contact points 722 of the apparatus side terminal group 721 are exposed (the direction including the +Y axis direction component and the −Z axis direction component) from the pair of wall portions 752. From the protrusions 759, one provided in the first wall portion 752*t* is called a first protrusion 759*t*, and the other provided in the second wall portion 752*w* is called a second protrusion 759*w*. The first protrusion 759*t* is provided to protrude in a direction that includes a +Y axis direction component and a −Z axis direction component with respect to the surface 724*fa* of the terminal block 724 from the +X axis direction side of the apparatus side terminal group 721. The second protrusion 759*w* is provided to protrude in the direction that includes the +Y axis direction component and the −Z axis direction component with respect to the surface 724*fa* of the terminal block 724 from the −X axis direction side of the apparatus side terminal group 721. The first protrusion 759*t* and the second protrusion 759*w* are received by a part (a bottom wall side concave portion 910 described later, see FIG. 27) of the cartridge 4 in the mounted state. In addition, in a case of using the first protrusion 759*t* and the second protrusion 759*w* without distinguishment therebetween, the protrusion 759 is used.

As illustrated in FIGS. 10 to 12, the holder 750 is mounted to the apparatus side front wall portion 62 in the state of holding the terminal block 724. Specifically, the holder 750 is mounted to the terminal mounting portion 694 of the first front wall portion 690. The terminal mounting portion 694 has a pair of support walls 696 that oppose each other in the X axis direction and a pair of fitting holes 698 provided in the walls. On the other hand, the apparatus side terminal unit 70 is provided with the pair of terminal side fitting portions 762 that oppose each other in the X axis direction. As the terminal side fitting portions 762 are fitted into the pair of fitting holes 698 of the holder 750, the apparatus side terminal unit 70 is mounted to the apparatus side front wall portion 62. Here, clearances in the X axis direction are provided between the pair of terminal side fitting portions 762 and the pair of support walls 696. Therefore, the apparatus side terminal unit 70 is in a state of being slightly movable in the X axis direction with respect to the apparatus side front wall portion 62. In addition, clearances in the Y axis direction are provided between the pair of terminal side fitting portions 762 and the pair of fitting holes 698. Therefore, the apparatus side terminal unit 70 is in a state of being slightly movable in the Z axis direction with respect to the apparatus side front wall portion 62.

In addition, the pair of support walls 696 of the terminal mounting portion 694 are respectively provided with a pair of engagement portions 696*a* and 696*b* that oppose each other in the Y axis direction. In addition, the pair of terminal side fitting portions 762 of the holder 750 are respectively provided with a pair of engagement portions 762*a* and 762*b* that oppose each other in the Y axis direction. When the terminal side fitting portions 762 are fitted into the pair of fitting holes 698 of the terminal mounting portion 649, the engagement portion 696*a* and the engagement portion 762*a* are engaged with each other in the −Y axis direction, and the engagement portion 696*b* and the engagement portion 762*b* are engaged with each other in the +Y axis direction. A clearance is rarely present between the engagement portion 696*a* and the engagement portion 762*a*. In addition, substantially no clearance is present even between the engagement portion 696*b* and the engagement portion 762*b*. Therefore, the apparatus side terminal unit 70 is not able to substantially move in the Y axis direction with respect to the apparatus side front wall portion 62.

A-4. External Configuration of Cartridge 4

Figure 19:
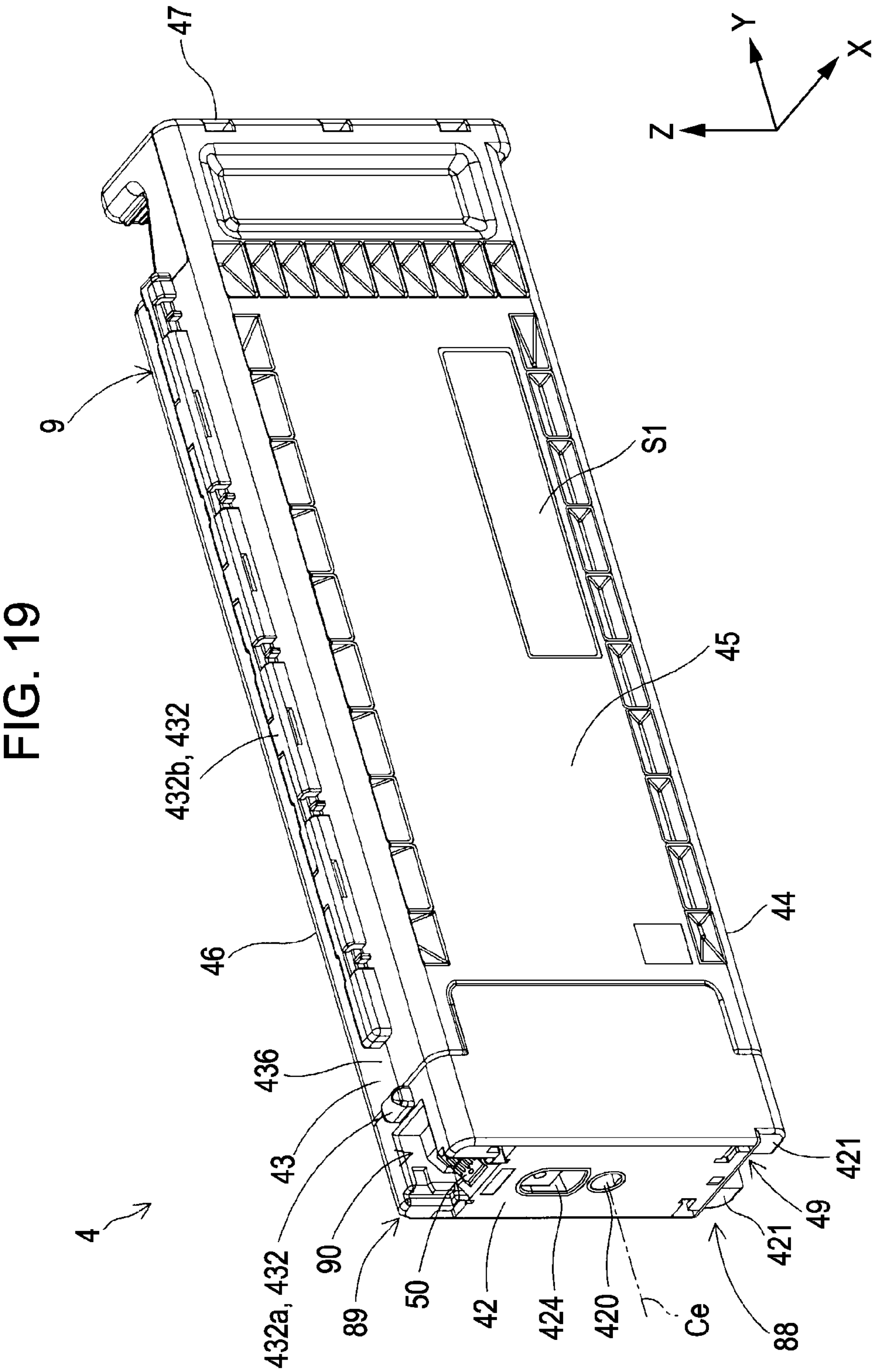
FIG. 19 is a first external perspective view of a cartridge.
Figure 20:
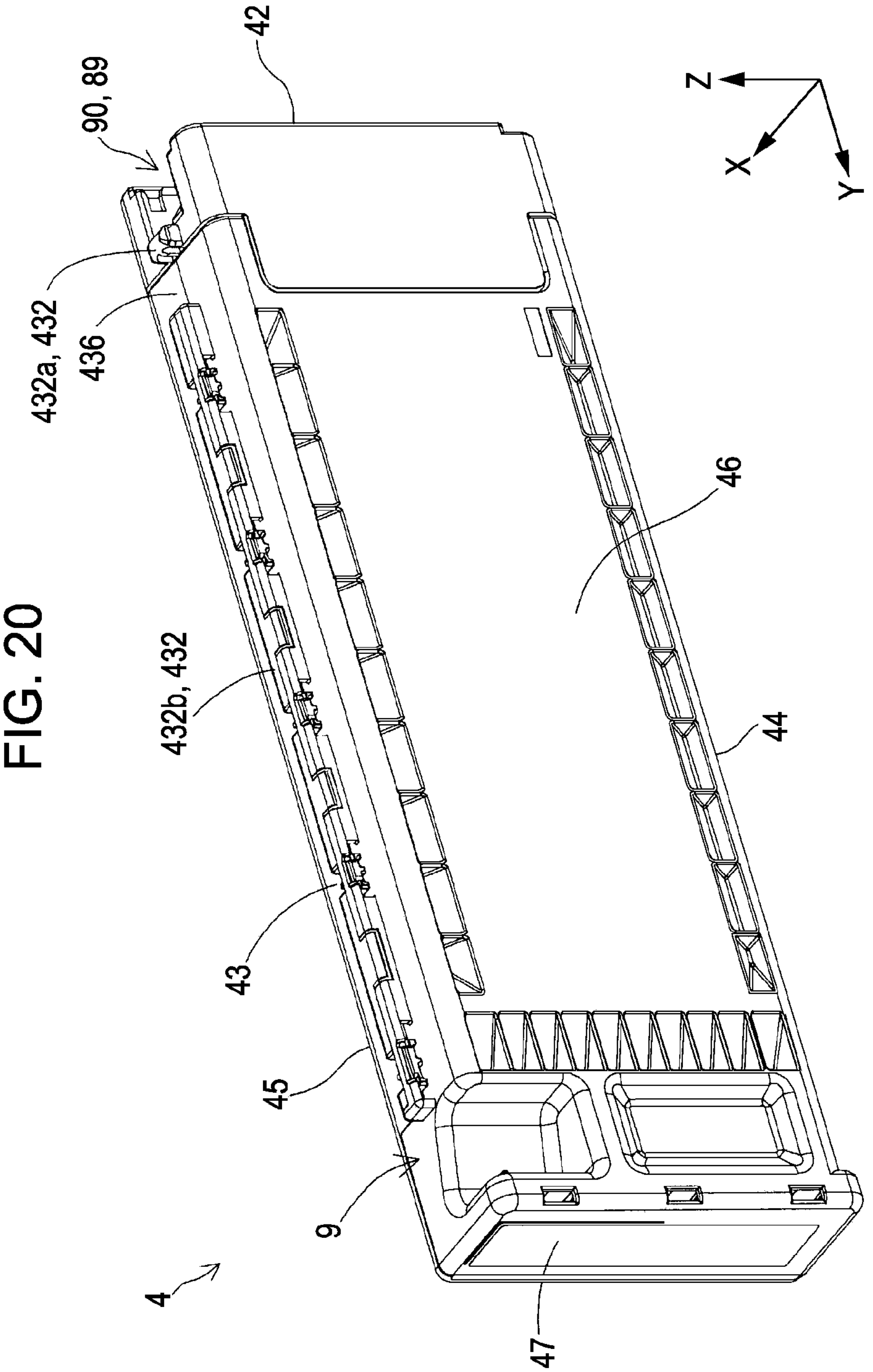
FIG. 20 is a second external perspective view of the cartridge.
Figure 21:
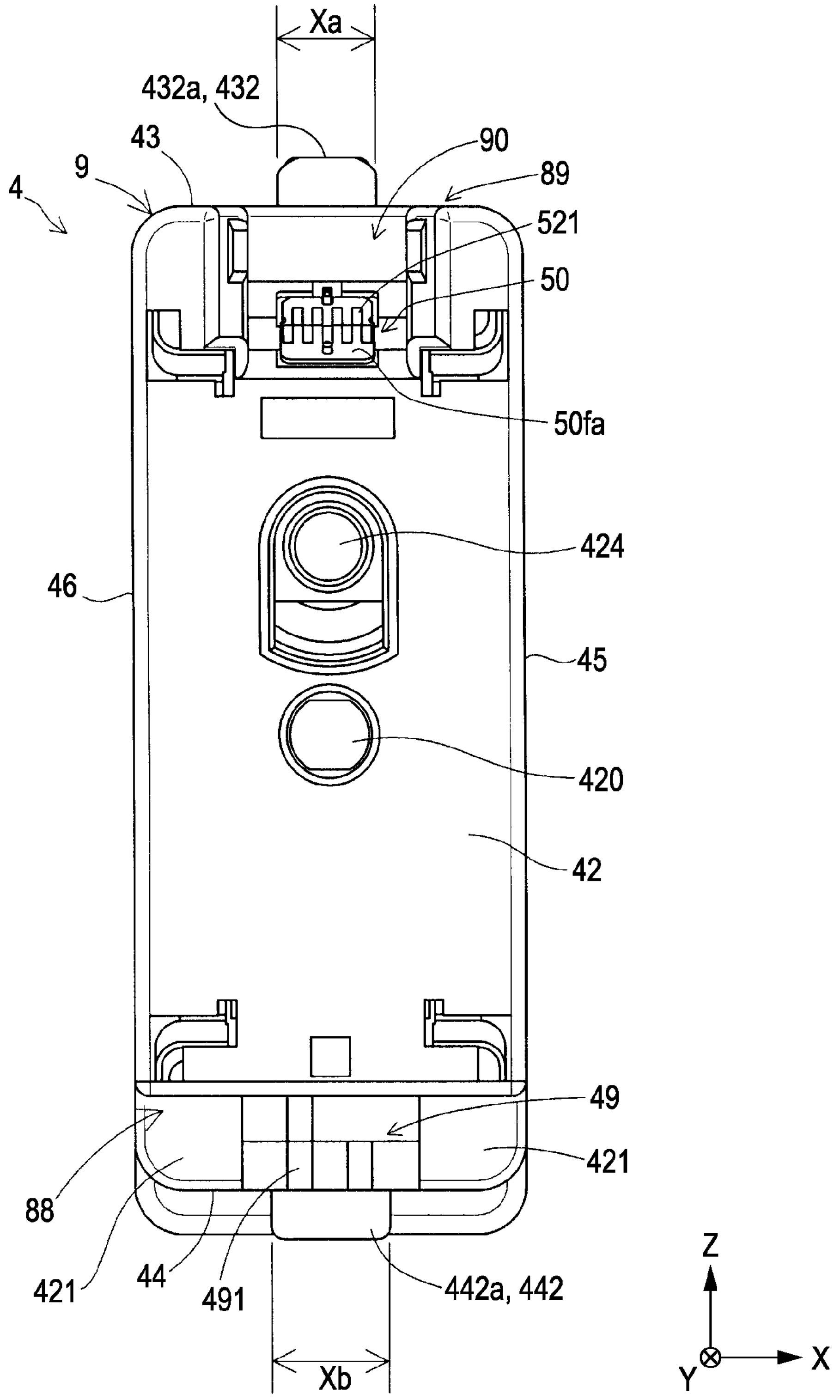
FIG. 21 is a front view of the cartridge.
Figure 22:
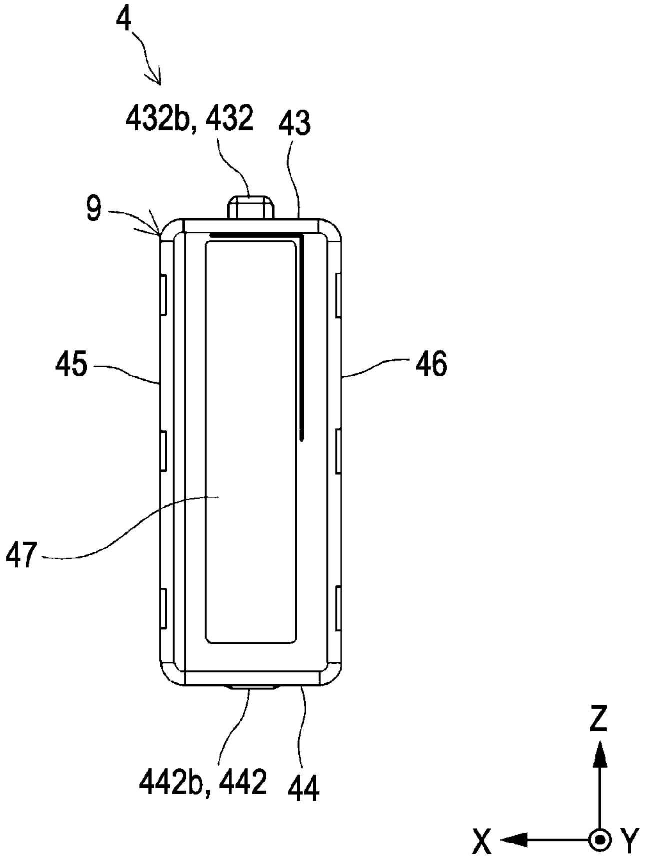
FIG. 22 is a rear view of the cartridge.
Figure 23:
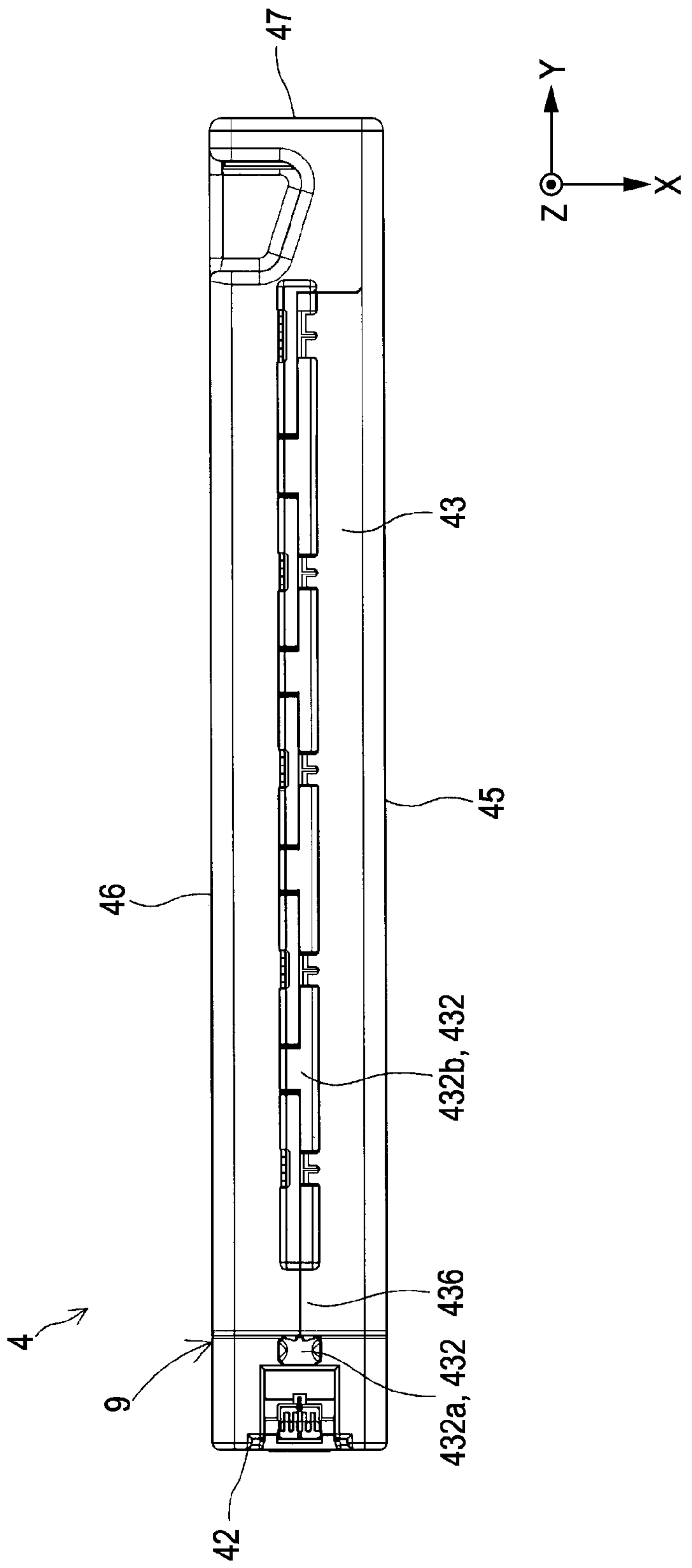
FIG. 23 is a top view of the cartridge.
Figure 24:
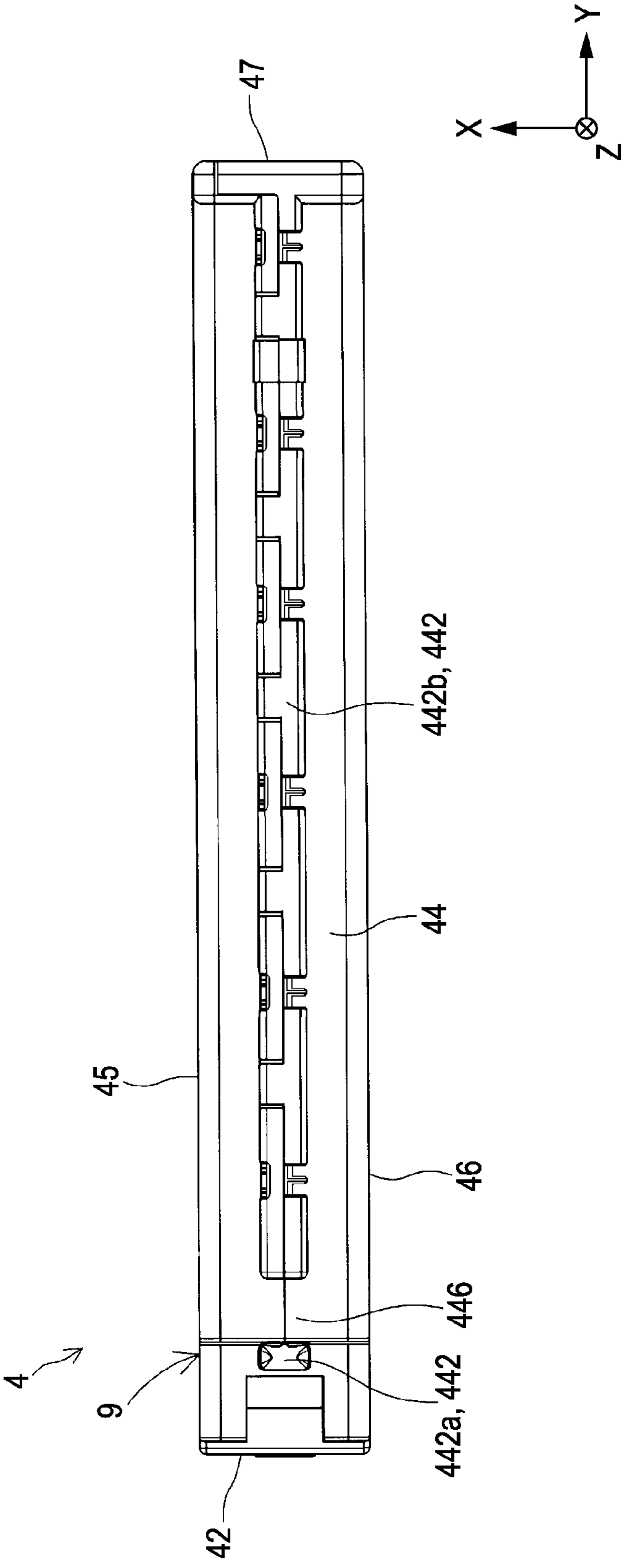
FIG. 24 is a bottom view of the cartridge.
Figure 25:
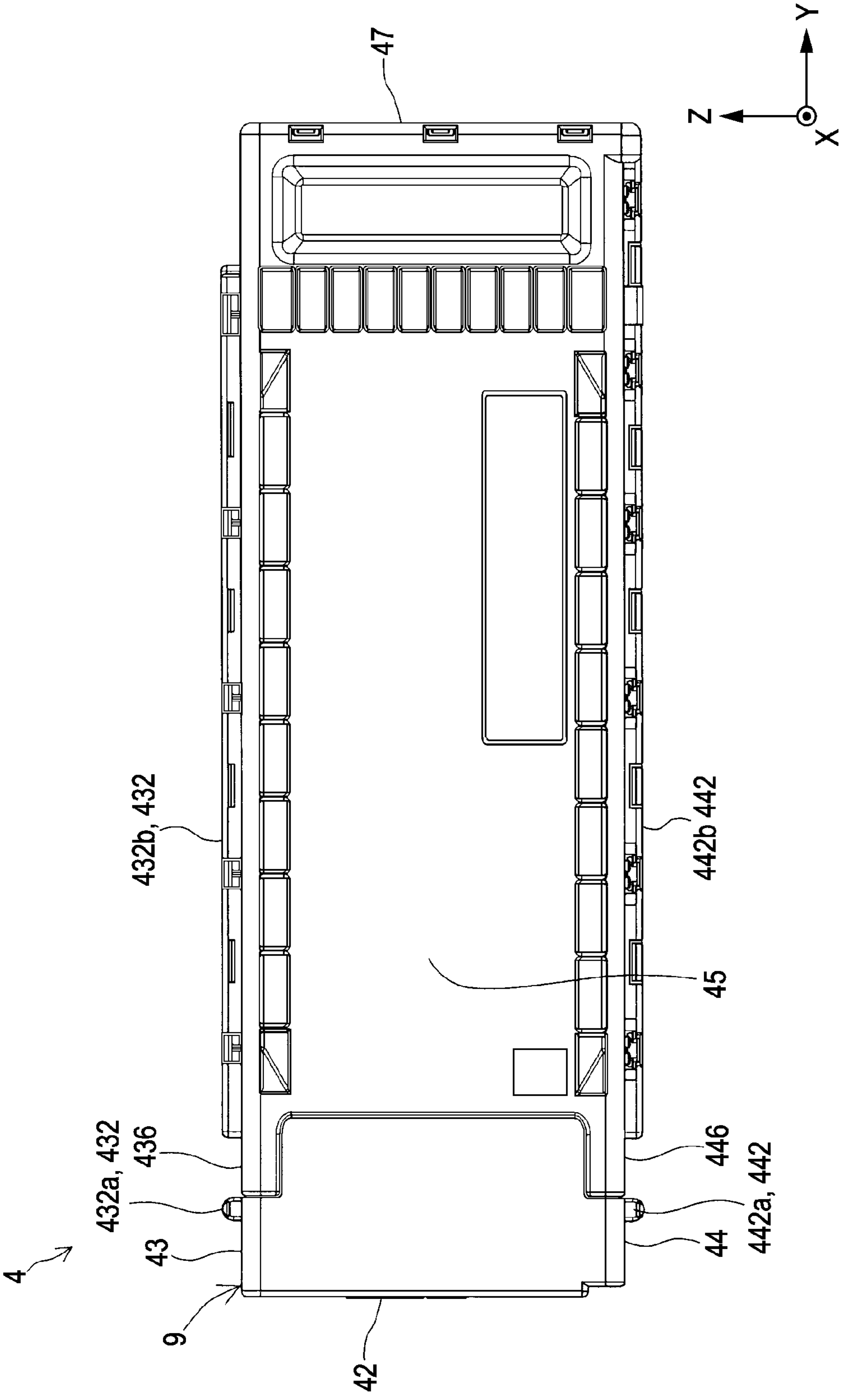
FIG. 25 is a first side view of the cartridge.
Figure 26:
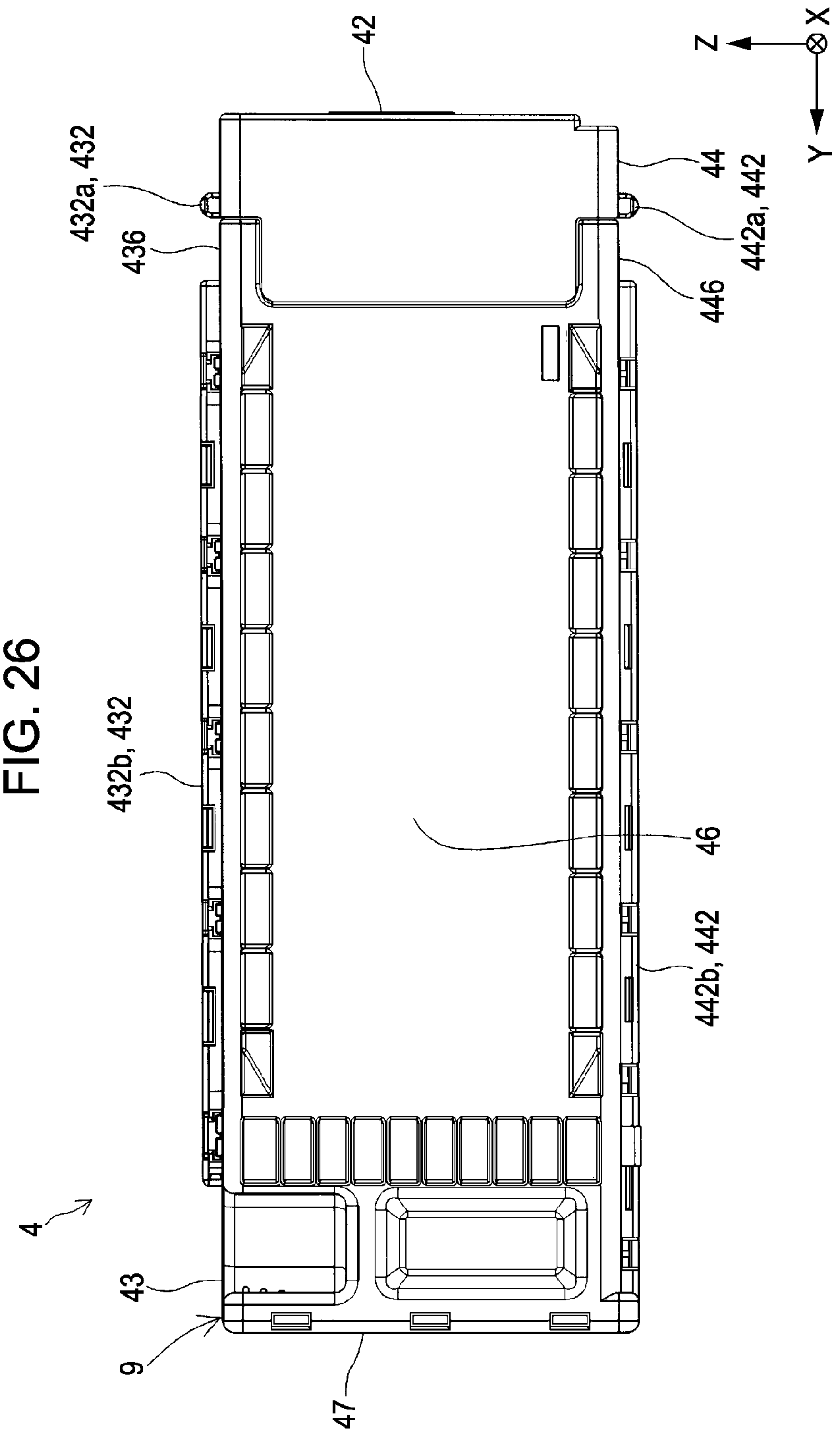
FIG. 26 is a second side view of the cartridge.

Next, the schematic configuration of the cartridge 4 will be described using FIGS. 19 to 26. In addition, the X, Y, and Z axes indicated in the figures illustrating the cartridge 4 correspond to the X, Y, and Z axes for the cartridge 4 in the mounted state. FIG. 19 is a first external perspective view of the cartridge 4. FIG. 20 is a second external perspective view of the cartridge 4. FIG. 21 is a front view of the cartridge 4. FIG. 22 is a rear view of the cartridge 4. FIG. 23 is a top view of the cartridge 4. FIG. 24 is a bottom view of the cartridge 4. FIG. 25 is a first side view of the cartridge 4. FIG. 26 is a second side view of the cartridge 4.

As illustrated in FIGS. 19 and 20, the external shape of the cartridge 4 is an approximate rectangular parallelepiped shape. In this example, the cartridge 4 has dimensions that are reduced in the order of the Y axis direction, the Z axis direction, and the X axis direction. The cartridge 4 includes a case 9 that accommodates ink therein. The case 9 is a housing formed by molding a synthetic resin. The cartridge 4 includes a front surface 42, a rear surface 47, a first side surface 43, a second side surface 44, a third side surface 45, and a fourth side surface 46. In addition, the first side surface 43 is also called an upper surface 43, the second side surface 44 is also called a bottom surface 44, the third side surface 45 is also called a right side surface 45, and the fourth side surface 46 is also called a left side surface 46. The front surface 42 and the rear surface 47 oppose each other in the Y axis direction, and the front surface 42 is positioned on the −Y axis direction and the rear surface 47 is positioned on the +Y axis direction. The first side surface 43 and the second side surface 44 intersect the front surface 42 and the rear surface 47 and oppose each other in the Z axis direction. The first side surface 43 is positioned on the +Z axis direction side and the second side surface 44 is positioned on the −Z axis direction. The third side surface 45 and the fourth side surface 46 intersect the front surface 42, the rear surface 47, the first side surface 43, and the second side surface 44 and oppose each other in the X axis direction. The third side surface 45 is positioned on the +X axis direction side and the fourth side surface 46 is positioned on the −X axis direction side.

The shape of the front surface 42 is an approximate rectangle in which the dimension in the Z axis direction is greater than the dimension in the X axis direction. The front surface 42 faces the apparatus side front wall portion 62 (FIG. 6) in the mounted state. The front surface 42 is provided with a rod insertion hole 420 and a supply tube insertion hole 424. The rod insertion hole 420 is provided at an intermediate position between the first side surface 43 and the second side surface 44 in the front surface 42. In other words, in the Z axis direction, the rod insertion hole 420 is provided at the intermediate position that connects the first side surface 43 and the second side surface 44. That is, a center axis Ce of the rod insertion hole 420 is disposed at the intermediate position in the Z axis direction between the first side surface 43 and the second side surface 44. Here, the "intermediate position" may not necessarily be completely intermediate and may not be disposed to be inclined toward any one of the first and second side surfaces 43 and 44. For example, the "intermediate position" includes a position in a range of 10% from the center position of the distance between the first side surface 43 and the second side surface 44 in the Z axis direction.

In the mounted state, the printing material supply tube 642 (FIG. 12) is inserted into the supply tube insertion hole 424. In addition, in the supply tube insertion hole 424, the printing material lead-out tube 484 (FIG. 4) for circulating the ink in the cartridge 4 to the outside is disposed. As the printing material supply tube 642 is connected to the printing material lead-out tube 484, the ink in the cartridge 4 is able to be circulated to the printing material supply tube 642.

In the mounted state, the rod 662 (FIG. 12) of which a part of the outer periphery is covered with the rod cover 670 is inserted into the rod insertion hole 420. As the rod 662 is inserted into the rod insertion hole 420, positioning of the entirety of the cartridge 4 with respect to the cartridge mounting unit 6 is performed, and thus a position from the correct mounting position is suppressed. In addition, in the mounted state, the rod 662 abuts onto the lever member 490 (FIG. 4).

As illustrated in FIGS. 19, 23, 25, and 26, the first side surface 43 has a first convex portion 432. The first convex portion 432 protrudes toward the +Z axis direction side from the first side surface 43. The first convex portion 432 extends along the Y axis direction. Specifically, as illustrated in FIGS. 25 and 26, the first convex portion 432 extends from a position close to the front surface 42 to a position close to the rear surface 47 in the first side surface 43. More specifically, the first convex portion 432 is divided into a first part 432*a* on the −Y axis direction side and a second part 432*b* on the +Y axis direction side, and a first locking portion 436 having a concave shape is formed therebetween. As illustrated in FIGS. 24 to 26, the second side surface 44 has a second convex portion 442. The second convex portion 442 protrudes toward the −Z axis direction side from the second side surface 44. The second convex portion 442 extends along the Y axis direction. Specifically, as illustrated in FIGS. 25 and 26, the second convex portion 442 extends from a position close to the front surface 42 to a position close to the rear surface 47 in the second side surface 44. More specifically, the second convex portion 442 is divided into a first part 442*a* on the −Y axis direction side and a second part 442*b* on the +Y axis direction side, and a second locking portion 446 having a concave shape is formed therebetween. When the cartridge 4 is mounted to the cartridge mounting unit 6, the first convex portion 432 is inserted into the first rail 682 (FIG. 7) and the second convex portion 442 is inserted into the second rail 602 (FIG. 6). Accordingly, the cartridge 4 may be caused to smoothly advance in the corresponding slot of the cartridge mounting unit 6.

As illustrated in FIG. 21, a dimension (width) Xa in the X axis direction of the first convex portion 432 and a dimension (width) Xb in the X axis direction of the second convex portion 442 are different from each other. In this example, a relationship of dimension Xa<dimension Xb is satisfied. In addition, the second convex portion 442 has a greater dimension in the X axis direction than the first rail 682 (FIG. 7), and thus the second convex portion 442 is not able to be inserted into the first rail 682. Accordingly, the possibility of the cartridge 4 being mounted to the cartridge mounting unit 6 in a state where the directions of the first side surface 43 and the second side surface 44 are reversed may be reduced. In addition, in the mounted state, the leaf spring 684 (FIG. 7) is inserted into the first locking portion 436, and the leaf spring 604 (FIG. 6) is inserted into the second locking portion 446. Accordingly, the cartridge 4 is prevented from carelessly deviating from the cartridge mounting unit 6.

As illustrated in FIG. 19, a label SI is adhered to the third side surface 45. In the label SI, information (notice in use and the like) regarding handling of the cartridge 4 is described.

As illustrated in FIG. 21, in a corner portion 88 at which the front surface 42 and the second side surface 44 intersect each other, a concave portion 49 and a pair of restriction surfaces 421 are provided. In the concave portion 49, a cartridge side identification member 491 is provided. The cartridge side identification member 491 is formed by one or more ribs and forms a different shape depending on the color of ink accommodated. In addition, the cartridge side identification member 491 is fitted to the apparatus side identification member 610 (FIG. 6) by being mounted to the right slot of the cartridge mounting unit 6. The pair of restriction surfaces 421 are disposed on both sides in the X axis direction of the concave portion 49. The pair of restriction surfaces 421 abut onto the restriction members 612 (FIG. 6) when the cartridge 4 reaches the correct mounting position.

As illustrated in FIGS. 19 and 21, the cartridge 4 further includes a concave portion 90 provided in a corner portion 89 at which the front surface 42 and the first side surface 43 intersect each other. In other words, the concave portion 90 is provided over the front surface 42 and the first side surface 43. In the concave portion 90, the circuit board 50 is disposed. A cartridge side terminal group 521 is formed on a surface 50*fa* (FIG. 21) of the circuit board 50. The cartridge side terminal group 521 includes a plurality of (in this example, nine) terminals. In the mounted state, each of the terminals of the cartridge side terminal group 521 is electrically connected to the corresponding terminal of the apparatus side terminal group 721 (FIG. 15).

Figure 27:
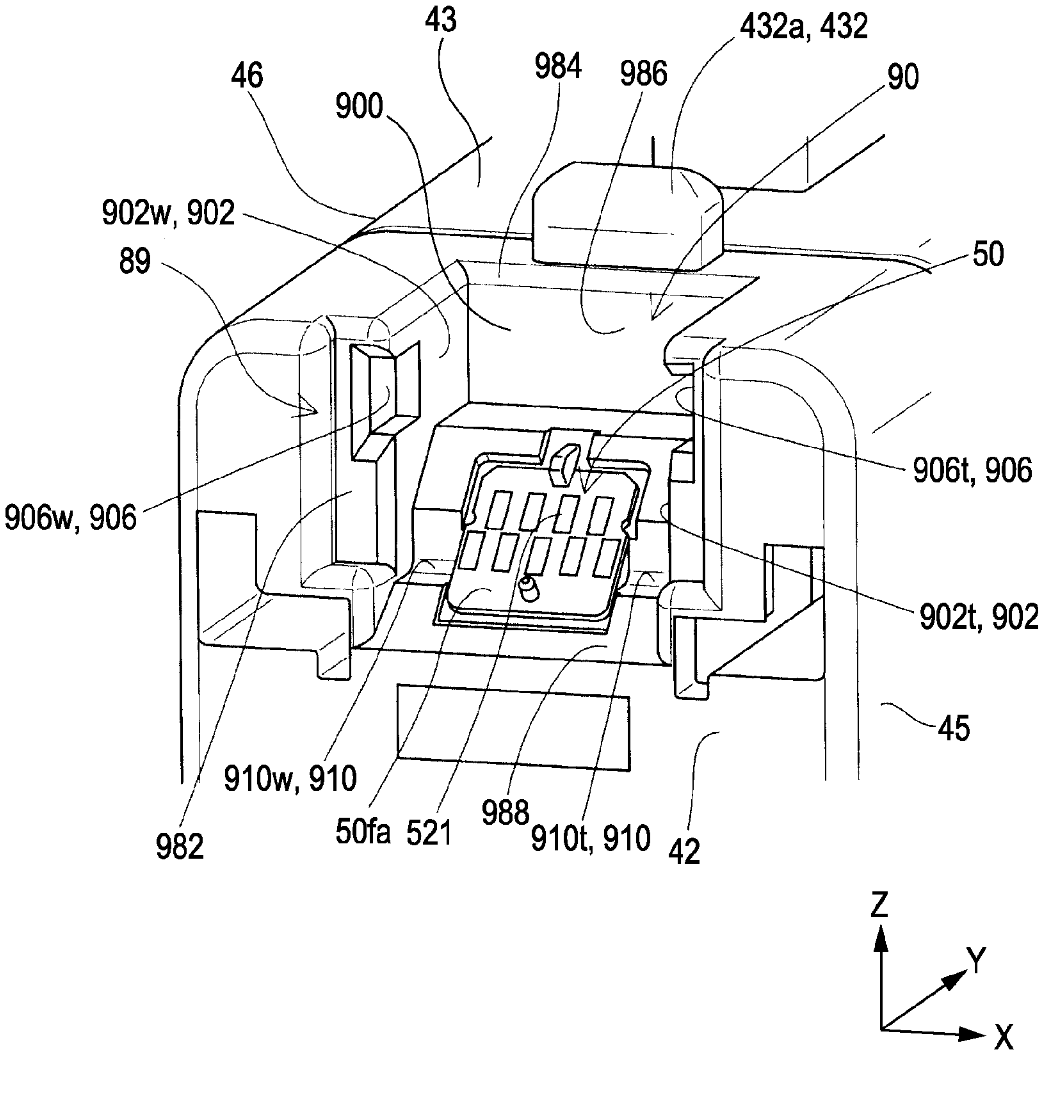
FIG. 27 is an external perspective view of the vicinity of a concave portion.
Figure 28:
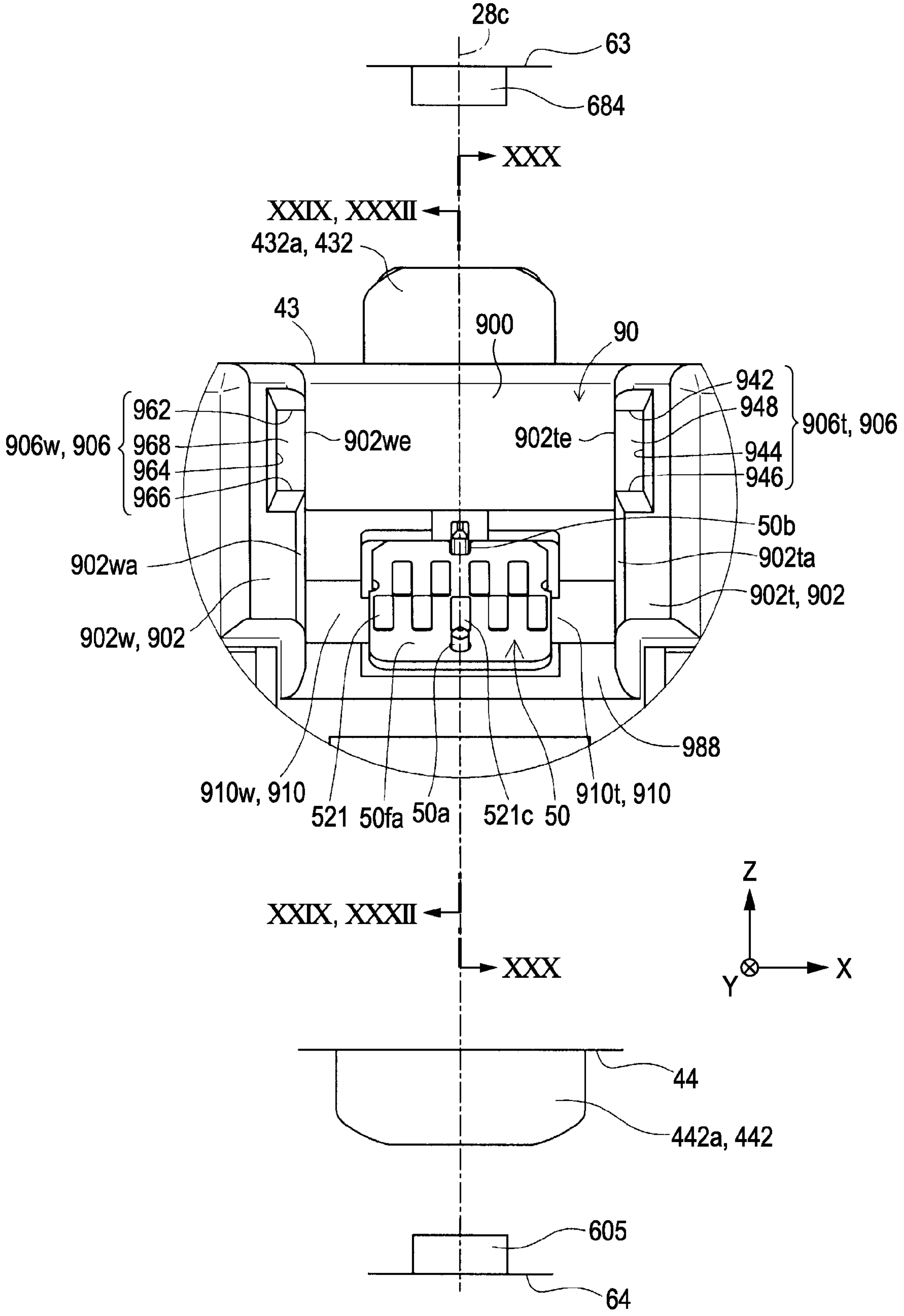
FIG. 28 is a front view of the vicinity of the concave portion.
Figure 29:
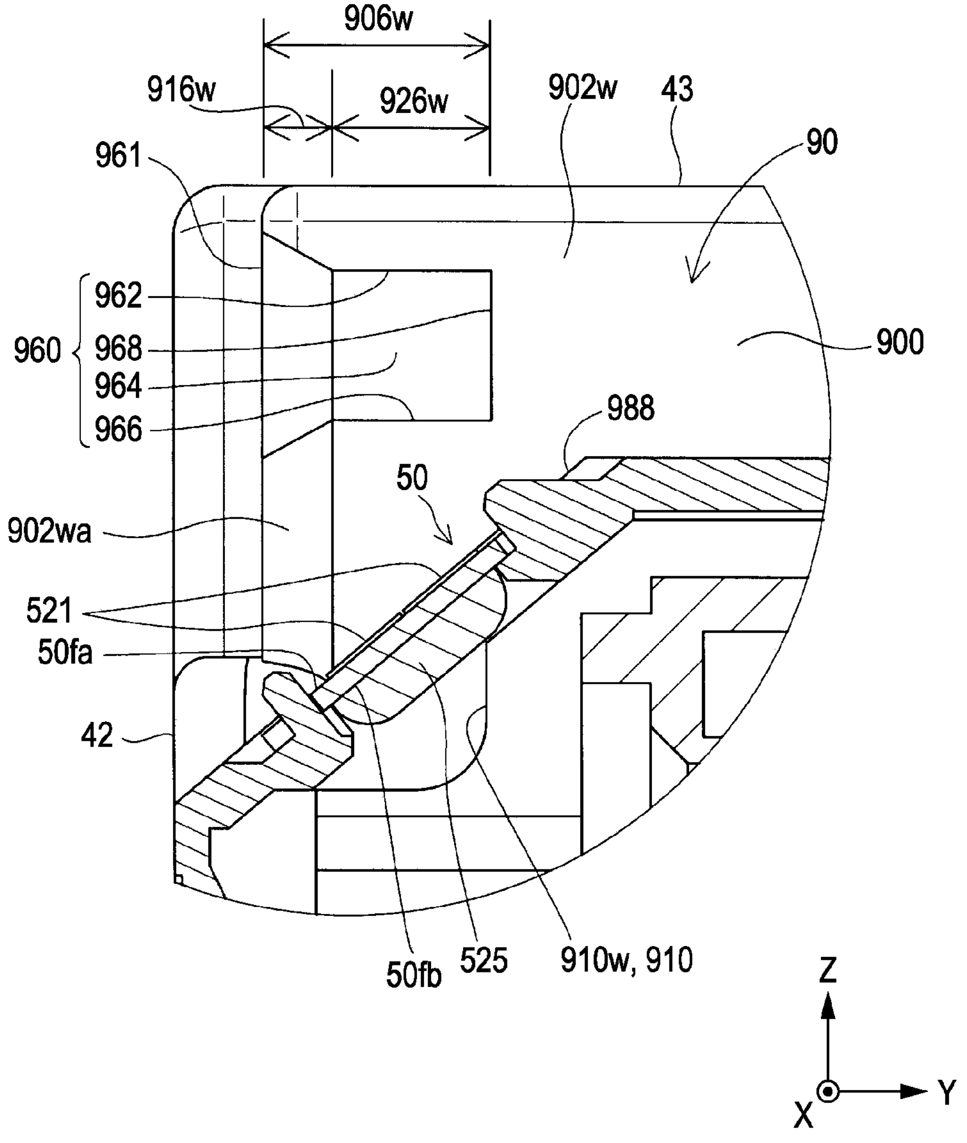
FIG. 29 is a cross-sectional view taken along the line XXIX-XXIX of FIG. 28.
Figure 30:
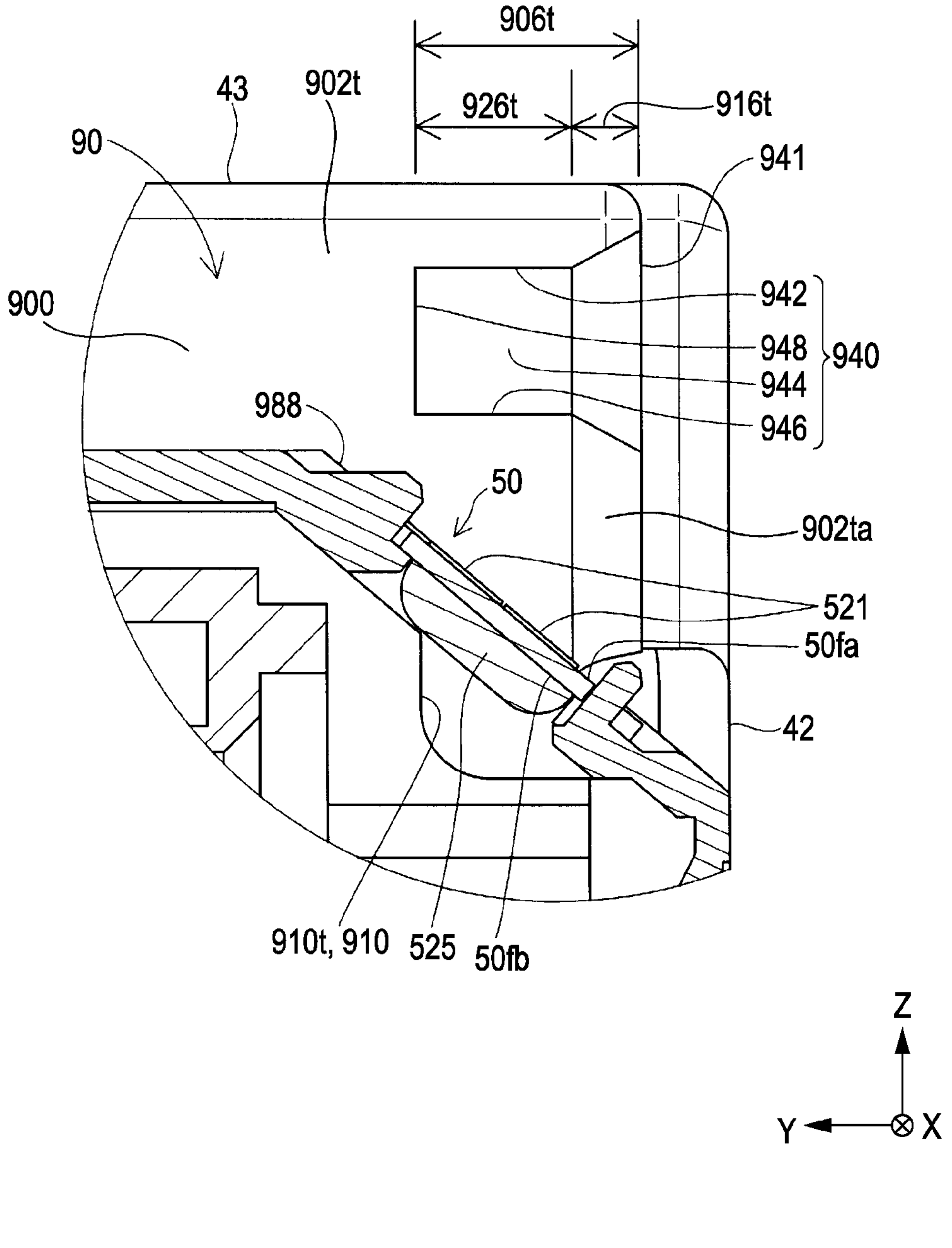
FIG. 30 is a cross-sectional view taken along the line XXX-XXX of FIG. 28.
Figure 31:
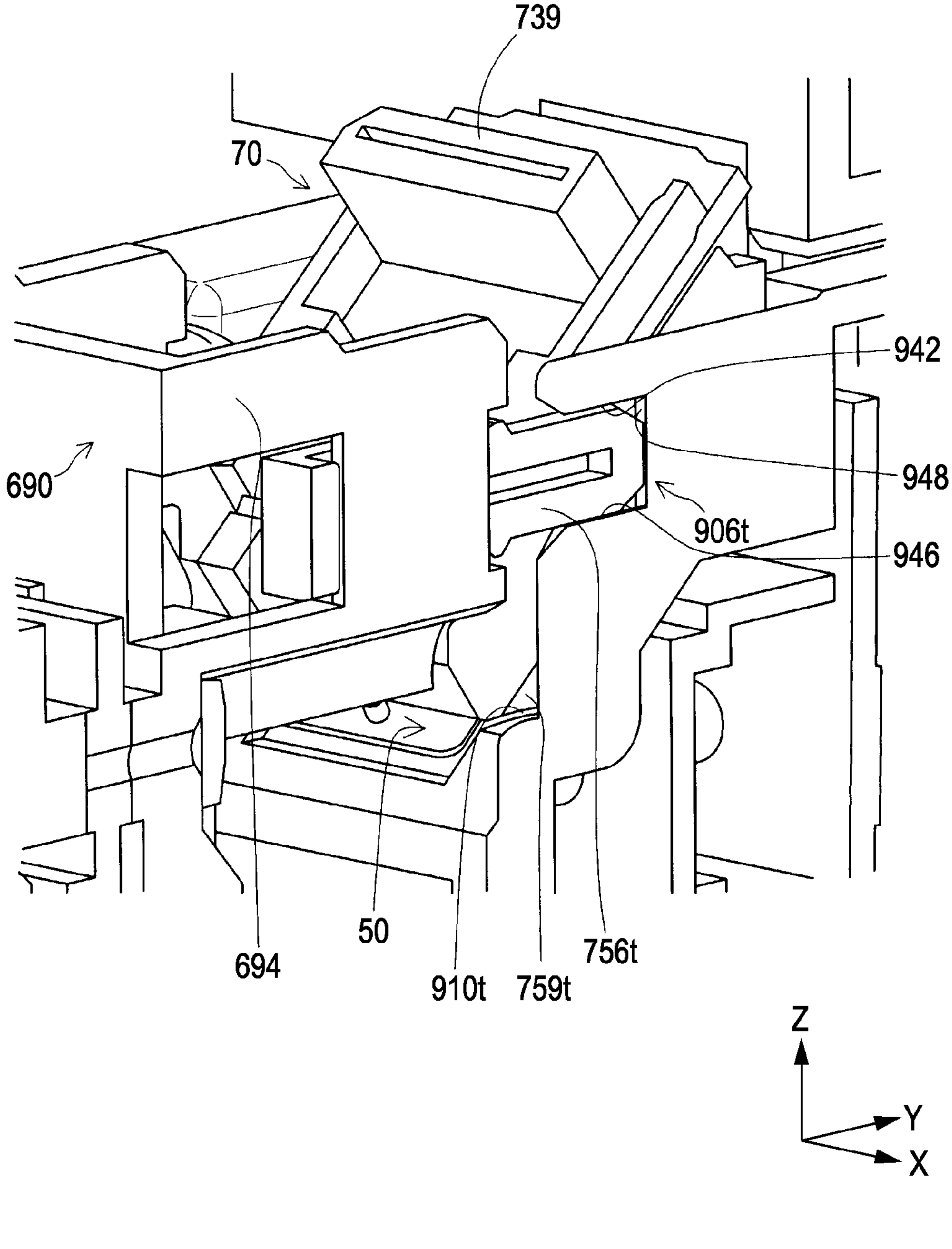
FIG. 31 is a diagram for explaining a state of the connection between the apparatus side terminal unit and a circuit board.
Figure 32:
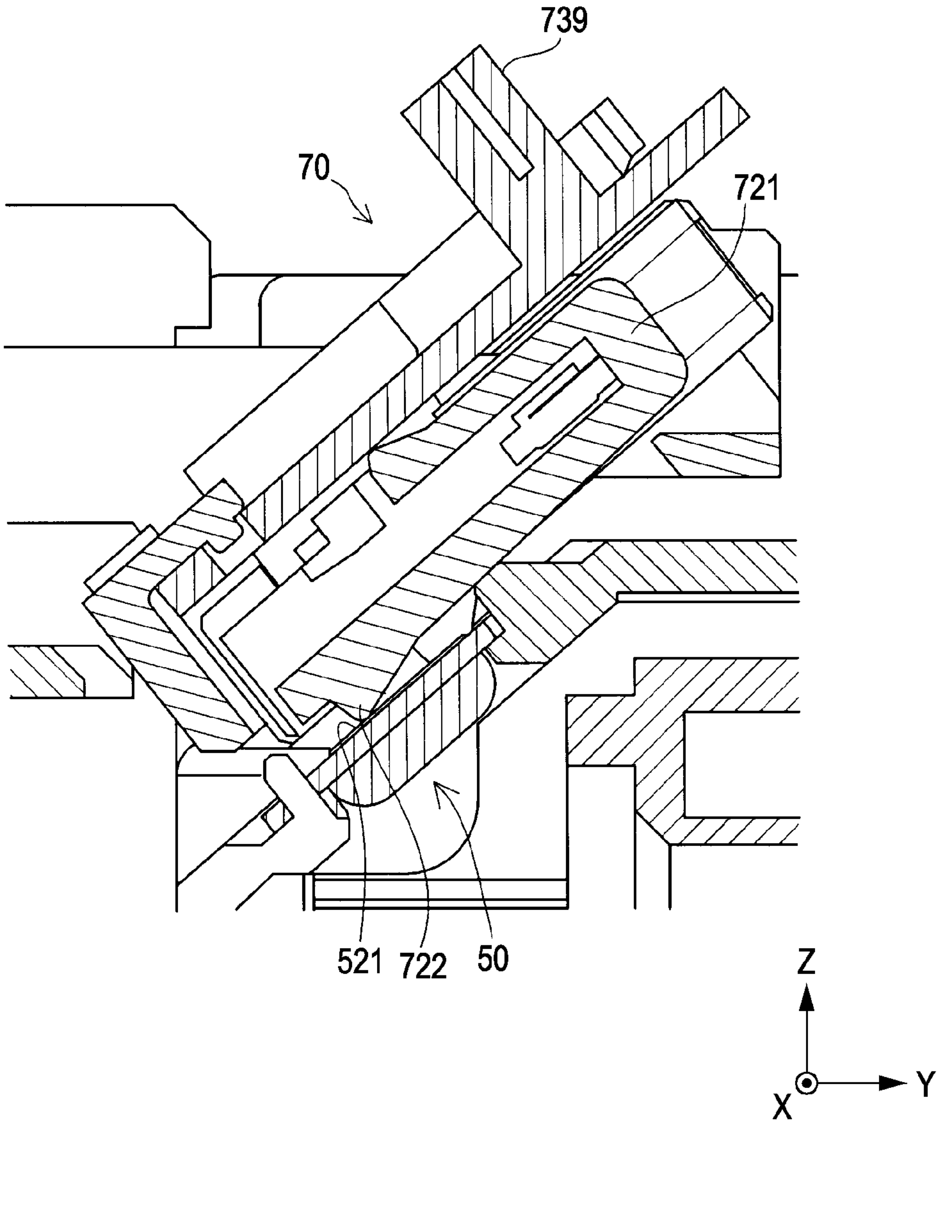
FIG. 32 is a cross-sectional view taken along the line XXXII-XXXII in the mounted state.

Moreover, the detailed configuration of the concave portion 90 will be described using FIGS. 27 to 32. FIG. 27 is an external perspective view of the vicinity of the concave portion 90. FIG. 28 is a front view of the vicinity of the concave portion 90. FIG. 29 is a cross-sectional view taken along the line XXIX-XXIX of FIG. 28. FIG. 30 is a cross-sectional view taken along the line XXX-XXX of FIG. 28. FIG. 31 is a diagram for explaining a state of the connection between the apparatus side terminal unit 70 and the circuit board 50. FIG. 32 is a cross-sectional view taken along the line XXXII-XXXII in the mounted state.

As illustrated in FIG. 27, the concave portion 90 has an opening 982 provided along a surface orthogonal to the Y axis and an opening 984 provided along a surface orthogonal to the Z axis. In addition, the inner walls of the concave portion 90 are mainly constituted by a pair of side walls 902 (902*t* and 902*w*), a bottom wall 988, and a rear wall 986. A terminal accommodation chamber 900 into which the apparatus side terminal unit 70 is inserted is partitioned and formed inside the concave portion 90 by the inner walls 902, 986, and 988. The concave portion 90 is an approximate hexahedron constituted by the opening 982, the opening 984, the pair of side walls 902*t* and 902*w*, the bottom wall 988, and the rear wall 986 as main surfaces. The opening 982 and the rear wall 986 oppose each other in the Y axis direction, and the opening 982 is positioned in the −Y axis direction and the rear wall 986 is positioned in the +Y axis direction. In addition, the pair of side walls 902*t* and 902*w* oppose each other in the X axis direction, and the first side wall 902*t* is positioned on the +X axis direction side and the second side wall 902*w* is positioned on the −X axis direction side. The opening 984 and the bottom wall 988 oppose each other in a nonparallel state in the Z axis direction, and the opening 984 is positioned on the +Z axis direction side and the bottom wall 988 is positioned on the −Z axis direction side. The opening 982 is an entrance when the apparatus side terminal unit 70 is inserted into the concave portion 90 in the case where the cartridge 4 is mounted to the cartridge mounting unit 6. The bottom wall 988 intersects the first side wall 902*t* and the second side wall 902*w*. The bottom wall 988 intersects the opening 982 at a side on the −Z direction side. In addition, the bottom wall 988 extends in the +Y axis direction while being tilted in the +Z direction from the position of the side on the −Z direction side of the opening 982, and intersects the rear wall 986. The rear wall 986 intersects the bottom wall 988, the first side wall 902*t*, and the second side wall 902*w*. The opening 984 intersects the rear wall 986, the first side wall 902*t*, the second side wall 902*w*, and the opening 982. In addition, in a case of using the first side wall 902*t* and the second side wall 902*w* without distinguishment therebetween, the side wall 902 is used.

The circuit board 50 is mounted in the bottom wall 988. Specifically, as illustrated in FIG. 29, the surface 50*fa* of the circuit board 50 is disposed to be tilted in a direction including a −Y axis direction component and a +Z axis direction component. That is, the surface 50*fa* of the circuit board 50 is tilted with respect to the Y axis and the Z axis. Here, the surface 50*fa* corresponds to the "tilted surface" described in Summary. As described above, the surface 50*fa* includes the cartridge side terminal group 521. That is, the cartridge side terminal group 521 is provided on the surface tilted with respect to the −Y axis direction which is the insertion direction of the cartridge 4 into the cartridge mounting unit 6. In addition, a rear surface 50*fb* of the circuit board 50 includes a storage device 525. The storage device 525 stores information (for example, ink colors, date of manufacture, and the like) regarding the cartridge 4. The cartridge side terminal group 521 and the storage device 525 are electrically connected to each other.

As illustrated in FIGS. 27 to 30, the pair of side walls 902*t* and 902*w* that oppose each other in the X axis direction of the concave portion 90 are respectively provided with a pair of grooves 906*t* and 906*w*. The grooves 906*t* and 906*w* are provided to face each other in the X axis direction. In addition, as illustrated in FIG. 28, the grooves 906*t* and 906*w* are provided to be symmetrical with respect to a YZ plane 28*c*. The YZ plane 28*c* is a surface that constitutes the center of the dimension (width) in the X axis direction of the cartridge. Elements that constitute each of the circuit board 50 and the concave portion 90 arranged in the concave portion 90 are provided to be symmetrical with respect to the YZ plane 28*c*. That is, the YZ plane 28*c* passes through the center of the dimension (width) in the X axis direction of the cartridge side terminal group 521. In addition, in the cartridge side terminal group 521, a terminal 521*c* provided at the center in the width direction of the cartridge side terminal group 521 intersects the YZ plane 28*c*. In addition, the YZ plane 28*c* passes through the center of the dimension (width) in the X axis direction of the circuit board 50. In addition, the YZ plane 28*c* passes through the mounting portions 50*a* and 50*b* provided on the bottom wall 988 in order to mount the circuit board 50 to the bottom wall 988. In addition, the YZ plane 28*c* passes through the terminal 521*c* provided at the center portion in the X axis direction in the cartridge side terminal group 521. The terminal 521*c* is a terminal that comes into contact with a terminal 721*c* (see FIG. 16) provided at the center portion in the X axis direction in the apparatus side terminal group 721. In addition, the grooves 906*t* and 906*w* of the concave portion 90 and the pair of side walls 902*t* and 902*w* are provided to be symmetrical with respect to the YZ plane 28*c*. Moreover, the YZ plane 28*c* passes through the centers of the dimensions (widths) in the X axis direction of the first convex portion 432 (432*a* and 432*b*) and the second convex portion 442 (442*a* and 442*b*, see FIGS. 21 and 25) described previously. In addition, although not illustrated in FIG. 28, the YZ plane 28*c* passes through the centers of the dimensions (widths) in the X axis direction of the first locking portion 436 (FIG. 25) provided in the first side surface 43 and the second locking portion 446 (FIG. 25) provided in the second side surface 44. In addition, the leaf springs 684 and 604 (FIGS. 6 and 7) that lock the first locking portion 436 and the second locking portion 446 intersect the YZ plane 28*c*.

As illustrated in FIGS. 27 and 30, the first side wall 902*t* is provided with the first groove 906*t* as a first restriction portion. The first groove 906*t* is formed in a shape in which a part of the first side wall 902*t* is dug in the +X axis direction. That is, the first groove 906*t* is recessed in the +X axis direction from the first side wall 902*t*. The first groove 906*t* extends along the Y axis direction. Specifically, the first groove 906*t* extends along the +Y axis direction from a position of the opening 982 toward the rear wall 986. The first positioning portion 756*t* (FIG. 16) is inserted into the first groove 906*t* in the mounted state. The end surface on the −Y axis direction side and the surface on the −X axis direction side of the first groove 906*t* are open. As illustrated in FIGS. 27 and 29, the second side wall 902*w* is provided with the second groove 906*w* as a second restriction portion. The second groove 906*w* is formed in a shape in which a part of the second side wall 902*w* is dug in the −X axis direction. That is, the second groove 906*w* is recessed in the −X axis direction from the second side wall 902*w*. The second groove 906*w* extends along the Y axis direction. Specifically, the second groove 906*w* extends along the +Y axis direction from a position of the opening 982 toward the rear wall 906 side. The end surface on the −Y axis direction side and the surface on the +X axis direction side of the second groove 906*w* are open.

As illustrated in FIGS. 29 and 30, the grooves 906*t* and 906*w* respectively have openings 941 and 961 at the end surfaces on the −Y axis direction side. The grooves 906*t* and 906*w* include entrance parts 916*t* and 916*w* that extend toward the +Y axis direction side from the openings 941 and 961 and contact parts 926*t* and 926*w* that extend toward the +Y axis direction side from the end portions in the +Y axis direction of the entrance parts 916*t* and 916*w*. The openings 941 and 961 of the end surfaces on the −Y axis direction side respectively are entrances into which the positioning portions 756*t* and 756*w* are inserted when the cartridge 4 is mounted to the cartridge mounting unit 6. Since the openings 941 and 961 are formed closer to the −Y axis direction side than the cartridge side terminal group 521, before starting contact between the apparatus side terminal group 721 and the cartridge side terminal group 521, the insertion of the positioning portions 756*t* and 756*w* into the grooves 906*t* and 906*w* is started.

The entrance parts 916*t* and 916*w* are parts in the grooves 906*t* and 906*w* into which the positioning portions 756*t* and 756*w* are initially inserted. As illustrated in FIGS. 28 to 30, the dimensions in the Z axis direction of the entrance parts 916*t* and 916*w* are monotonically decreased in the +Y axis direction. In addition, as illustrated in FIG. 28, the dimensions in the X axis direction of the entrance parts 916*t* and 916*w* are decreased in the +Y axis direction from the −Y axis direction. That is, the entrance parts 916*t* and 916*w* are provided to be tapered by being gradually decreased in the dimensions in the Z axis direction and the X axis direction. Furthermore, in other words, the entrance parts 916*t* and 916*w* have tapered shapes in which the areas of the openings 941 and 961 are greatest.

In addition, as illustrated in FIGS. 28 to 30, entrance parts 902*wa* and 902*ta* of the side walls 902*w* and 902*t* of the concave portion 90 have tapered shapes to correspond to the entrance parts 916*t* and 916*w*. That is, the distance (the interval in the X axis direction) between the side walls 902*w* and 902*t* at the parts of the entrance parts 902*wa* and 902*ta* are decreased in the +Y axis direction from the −Y axis direction.

The contact parts 926*t* and 926*w* respectively come into contact with the positioning portions 756*t* and 756*w* in the mounted state. As illustrated in FIGS. 29 and 30, the contact parts 926*t* and 926*w* respectively have contact surfaces 940 and 960 that come into contact with the positioning portions 756*t* and 756*w* in the mounted state. As illustrated in FIG. 30, the contact surface 940 that comes into contact with the first positioning portion 756*t*, that is, the contact surface 940 of the groove 906*t* has four surfaces 942, 946, 948, and 944. Similarly, as illustrated in FIG. 29, the contact surface 960 that comes into contact with the second positioning portion 756*w*, that is, the contact surface 960 of the groove 906*w* also has four surfaces 962, 966, 968, and 964. The four contact surfaces are respectively called an A surface 942 and 962, a B surface 946 and 966, a C surface 944 and 964, and a D surface 948 and 968.

As illustrated in FIG. 30, the A surface 942 and the B surface 946 of the groove 906*t* oppose each other in the Z axis direction, and the A surface 942 is positioned on the +Z axis direction side and the B surface 946 is positioned on the −Z axis direction side. The D surface 948 of the groove 906*t* opposes the opening 941 in the Y axis direction, and the opening 941 is positioned on the −Y axis direction side and the D surface 948 is positioned on the +Y axis direction side. In addition, the D surface 948 intersects the A surface 942 and the B surface 946. As illustrated in FIG. 28, the C surface 944 of the groove 906*t* opposes an extension surface 902*te* of the first side wall 902*t* and is positioned on the +X axis direction side with respect to the extension surface 902*te* of the first side wall 902*t*. In addition, the C surface 944 intersects the A surface 942, the B surface 946, and the D surface 948. The A surface 942 of the groove 906*t* comes into contact with the end portion on the +Z axis direction side of the first positioning portion 756*t* (FIG. 16). The B surface 946 comes into contact with the end portion on the −Z axis direction side of the first positioning portion 756*t*. The first D surface 948 comes into contact with the end portion on the +Y axis direction side of the first positioning portion 756*t*. The first C surface 944 comes into contact with the end portion on the +X axis direction side of the first positioning portion 756*t*.

As illustrated in FIG. 29, the A surface 962 and the B surface 966 of the groove 906*w* oppose each other in the Z axis direction, and the A surface 962 is positioned on the +Z axis direction side and the B surface 966 is positioned on the −Z axis direction side. The D surface 968 of the groove 906*w* opposes the opening 961 in the Y axis direction, and the opening 961 is positioned on the −Y axis direction side and the D surface 968 is positioned on the +Y axis direction side. In addition, the D surface 968 intersects the A surface 962 and the B surface 966. As illustrated in FIG. 28, the C surface 964 of the groove 906*w* opposes an extension surface 902*we* of the second side wall 902*w* and is positioned on the −X axis direction side with respect to the extension surface 902*te* of the second side wall 902*w*. In addition, the C surface 964 intersects the A surface 962, the B surface 966, and the D surface 968. The A surface 962 of the groove 906*w* comes into contact with the end portion on the +Z axis direction side of the second positioning portion 756*w* (FIG. 16). The B surface 966 comes into contact with the end portion on the −Z axis direction side of the second positioning portion 756*w*. The D surface 968 comes into contact with the end portion on the +Y axis direction side of the second positioning portion 756*w*. The C surface 964 comes into contact with the end portion on the −X axis direction side of the second positioning portion 756*w*.

Here, in a case of using the first groove 906*t* and the second groove 906*w* without distinguishment therebetween, they are simply called the "groove 906". In addition, in a case of using the first contact part 926*t* and the second contact part 926*w* without distinguishment therebetween, they are simply called the "contact part 926". In addition, in a case of using the first entrance part 916*t* and the second entrance part 916*w* without distinguishment therebetween, they are simply called the "entrance part 916".

As illustrated in FIG. 27, in the bottom wall 988, a pair of bottom wall side concave portions 910*t* and 910*w* are respectively formed between the tilted surface 50*fa* and the first side wall 902*t* and between the tilted surface 50*fa* and the second side wall 902*w*. As illustrated in FIG. 31, the pair of bottom wall side concave portions 910*t* and 910*w* are configured to respectively receive the pair of protrusions 759*t* and 759*w* (FIG. 16) of the apparatus side terminal unit 70 in the mounted state. In addition, the pair of bottom wall side concave portions 910*t* and 910*w* are collectively called a first bottom wall side concave portion 910.

A-5. Embodiment of Contact Between Cartridge Side Terminal Group 521 and Apparatus Side Terminal Group 721

Figure 33:
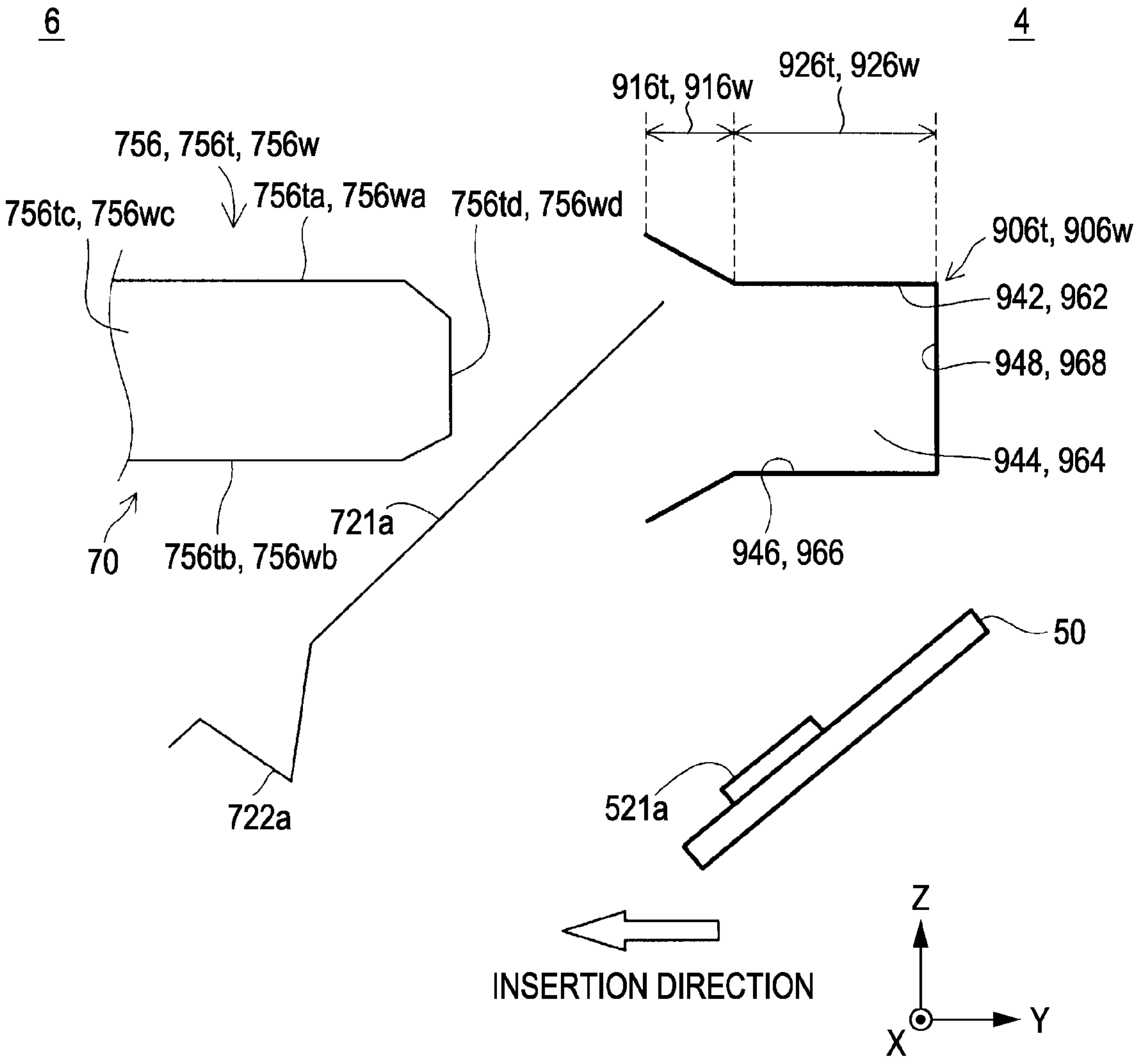
FIG. 33 is a first diagram illustrating an embodiment of the contact.
Figure 34:
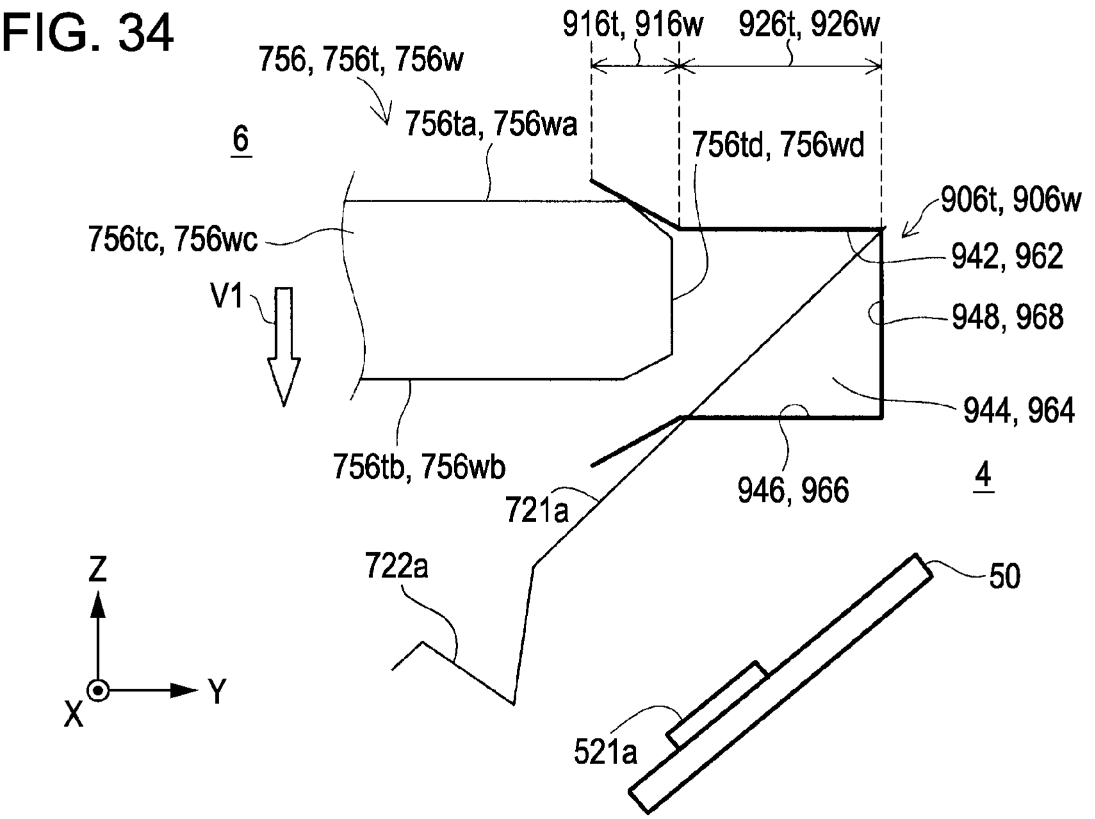
FIG. 34 is a second diagram illustrating the embodiment of the contact.
Figure 35:
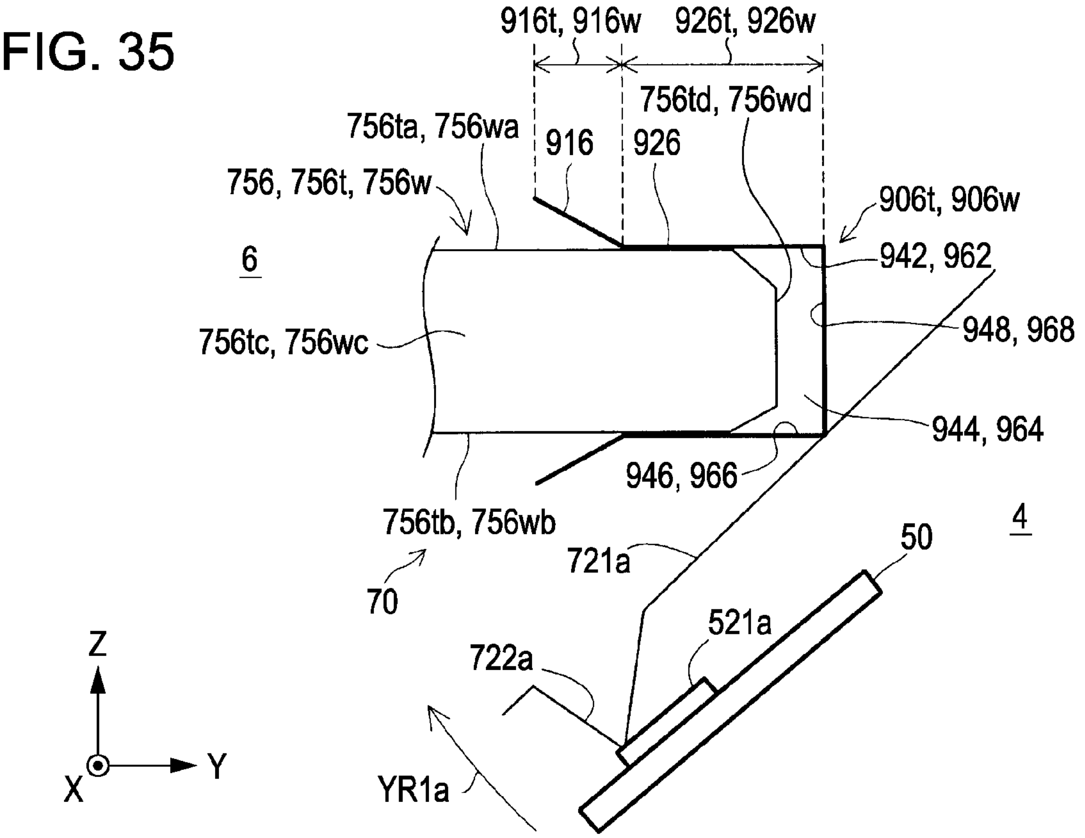
FIG. 35 is a third diagram illustrating the embodiment of the contact.
Figure 36:
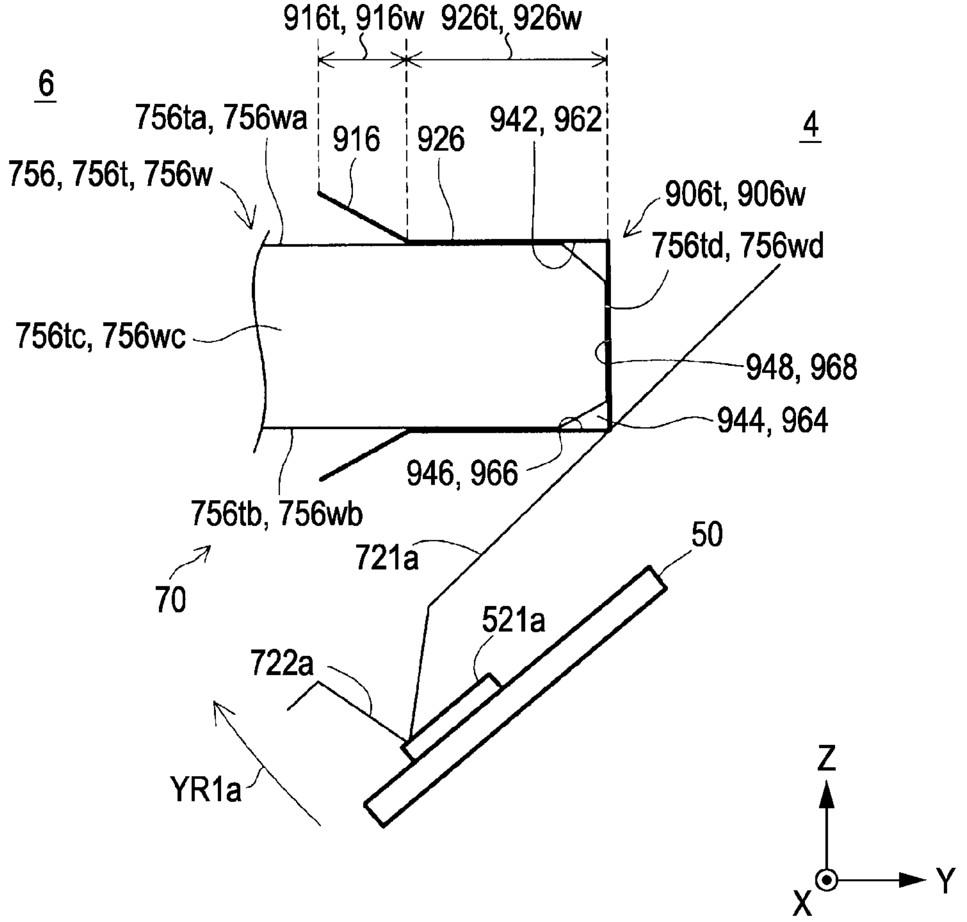
FIG. 36 is a fourth diagram illustrating the embodiment of the contact.

Next, an embodiment of contact between the cartridge side terminal group 521 and the apparatus side terminal group 721 when the cartridge 4 is mounted to the cartridge mounting unit 6 will be described using FIGS. 33 to 36. FIG. 33 is a first diagram illustrating the embodiment of the contact. FIG. 34 is a second diagram illustrating the embodiment of the contact. FIG. 35 is a third diagram illustrating the embodiment of the contact. FIG. 36 is a fourth diagram illustrating the embodiment of the contact. A form of the cartridge 4 during mounting is illustrated in time series in the order of figures from FIGS. 33 to 36. In addition, FIGS. 33 to 36 are illustrated focusing on a single cartridge side terminal 521*a* of the cartridge side terminal group 521 and a single apparatus side terminal 721*a* of the apparatus side terminal group 721. In addition, the other terminals have the same mounting form. Since the shapes of the first and second positioning portions 756*t* and 756*w* are the same and the first and second grooves 906*t* and 906*w* are the same, for ease of understanding, reference numerals 756*t* and 756*w* are described together and reference numerals 906*t* and 906*w* are described together in FIGS. 33 to 36.

As illustrated in FIG. 33, when the cartridge 4 (FIG. 19) is mounted to the cartridge mounting unit 6 (FIG. 5), the cartridge 4 is caused to advance into the slot of the cartridge mounting unit 6 in the −Y axis direction. Here, as illustrated in FIG. 34, before the cartridge side terminal 521*a* comes into contact with the terminal contact point 722*a* of the apparatus side terminal 721*a*, the insertion of the positioning portion 756 into the groove 906 is started. Here, even in a case where the cartridge mounting unit 6 has a slight manufacturing error, the apparatus side terminal unit 70 is guided into the concave portion 90 of the cartridge 4 while absorbing the error by moving in the X axis direction and the Z axis direction. As the cartridge 4 is caused to advance in the −Y axis direction while the positioning portion 756 comes into contact with the surface of the entrance part 916 of the groove 906, the apparatus side terminal unit 70 is guided to the position at which the cartridge side terminal 521*a* and the apparatus side terminal 721*a* come into contact with each other. In FIG. 34, a form in which the apparatus side terminal unit 70 is guided into the concave portion 90 (FIG. 27) while moving slightly in a direction (−Z axis direction) indicated by the arrow V1 is illustrated.

As illustrated in FIG. 35, the cartridge 4 is caused to further advance in the −Y axis direction, and when the positioning portions 756*t* and 756*w* are inserted into the contact parts 926*t* and 926*w* of the groove 906, the C surfaces 756*tc* and 756*wc* of the positioning portions 756*t* and 756*w* respectively come into contact with the C surfaces 944 and 964 of the grooves 906*t* and 906*w* and thus the movement in the X axis direction of the apparatus side terminal unit 70 (FIG. 10) is restricted. In addition, here, the A surfaces 756*ta* and 756*wa* of the positioning portions 756*t* and 756*w* respectively come into contact with the A surfaces 942 and 962 of the grooves 906*t* and 906*w*, and the B surfaces 756*tb* and 756*wb* respectively come into contact with the B surfaces 946 and 966, thereby restricting the movement in the Z axis direction of the apparatus side terminal unit 70. Accordingly, the positions in the X axis direction and the Z axis direction of the cartridge side terminal 521*a* and the terminal contact point 722*a* are determined. In addition, after the insertion of the positioning portion 756 into the contact part 926 is started, immediately before completing the full insertion, the terminal contact point 722*a* initially comes into contact with the cartridge side terminal 521*a*. At this time point, it is possible to cause the cartridge 4 to advance while the tip end surfaces 756*td* and 756*wd* of the positioning portions 756*t* and 756*w* do not come into contact with the D surfaces 948 and 968 of the grooves 906*t* and 906*w*. When the cartridge 4 is caused to further advance in the −Y axis direction from the state illustrated in FIG. 35, the apparatus side terminal 721*a* elastically deforms, and the contact point 722*a* of the apparatus side terminal 721*a* moves in the direction of the arrow YR1*a* while coming into contact with the cartridge side terminal 521*a*. Here, the apparatus side terminal group and the cartridge side terminal group slightly rub against each other. In addition, finally, as illustrated in FIG. 36, the tip end surfaces 756*td* and 756*tw* of the positioning portions 756*t* and 756*w* come into contact with the D surfaces 948 and 968 of the grooves 906*t* and 906*w* and thus the positions in the Y axis direction between the cartridge side terminal 521*a* and the terminal contact point 722*a* are determined. In this state, the mounting of the cartridge 4 to the cartridge mounting unit 6 is completed. In addition, during the completion of the mounting and in the mounted state, as in the final stage of the mounting illustrated in FIG. 36, the A surfaces 756*ta* and 756*wa* of the positioning portions 756*t* and 756*w* come into contact with the A surfaces 942 and 944 of the grooves 906*t* and 906*w* in the +Z axis direction. In addition, the B surfaces 756*tb* and 756*wb* come into contact with the B surfaces 946 and 966 of the grooves 906*t* and 906*w* in the −Z axis direction. In addition, the C surface 756*tc* of the first positioning portion comes into contact with the C surface 944 of the first groove 906*t* in the +X axis direction, and the C surface 756*wc* of the second positioning portion comes into contact with the C surface 964 of the second groove 906*w* in the −X axis direction. Therefore, the movements in the Z axis direction and the X axis direction of the positioning portions 756*t* and 756*w* are restricted by the grooves 906*t* and 906*w*. Accordingly, at the position where contact between the apparatus side terminal 721*a* and the cartridge side terminal 521*a* is properly achieved, both 721*a* and 521*a* may be held.

A-6. Other Configurations of Cartridge 4

Figure 37:
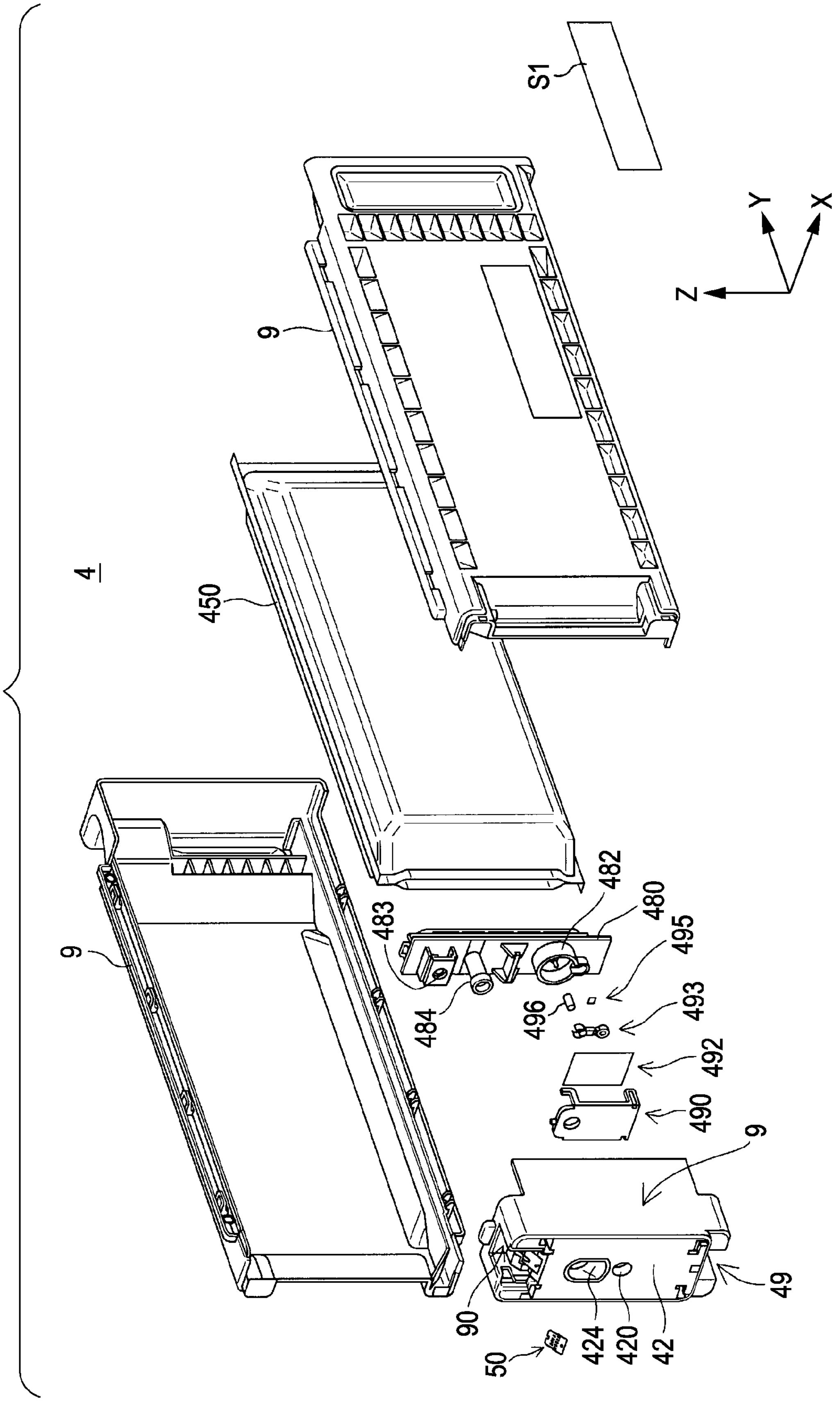
FIG. 37 is an exploded perspective view of the cartridge.

FIG. 37 is an exploded perspective view of the cartridge 4. As illustrated in FIG. 37, the case 9 accommodates the printing material accommodation portion 450 and the cartridge side passage member 480. The printing material accommodation portion 450 accommodates ink therein. In addition, the printing material accommodation portion 450 is a bag body having flexibility. In this example, the printing material accommodation portion 450 is formed of an aluminum-laminated multilayer film in which an aluminum layer is laminated and formed on a resin film layer. The cartridge side passage member 480 forms a passage (also called a "printing material lead-out passage") that causes the printing material accommodation portion 450 to communicate with the outside. That is, the one end portion of the cartridge side passage member 480 is connected to the printing material accommodation portion 450, and the printing material lead-out tube 484 provided in the other end portion thereof is connected to the printing material supply tube 642 (FIG. 4). A detection chamber 482 is proved part way through the printing material lead-out passage. In the detection chamber 482, a coil spring 496 as an impelling member, a check valve 495, and a pressure-receiving plate 493 are accommodated. In addition, an opening which is in one side surface of the detection chamber 482 is covered with a film 492 having flexibility. The pressure-receiving plate 493 is disposed between the coil spring 496 and the film 492. The coil spring 496 impels the pressure-receiving plate 493 so as to increase the volume of the detection chamber 482. The case 9 further accommodates a lever member 490. The lever member 490 comes into contact with the film 492 from the outside of the detection chamber 482. The volume of the detection chamber 482 changes according to a change in the internal pressure. The lever member 490 is displaced by the change in the volume of the detection chamber 482. As described above, the rod 662 (FIG. 4) abuts onto the lever member 490. In a case where the inside of the printing material accommodation portion 450 is suctioned by the pumping mechanism 7 in a state where ink is accommodated in the printing material accommodation portion 450, the ink is also supplied into the detection chamber 482 along with the suctioning. Accordingly, the pressure in the detection chamber 482 is maintained at a predetermined pressure. Here, since the volume of the detection chamber 482 is maintained to be large, the rod 662 (FIG. 4) is in a state of being pressured in the −Y axis direction by the lever member 490 against the impelling force applied by the impelling member 665 (FIG. 4). On the other hand, in a case where the inside of the printing material accommodation portion 450 is suctioned by the pumping mechanism 7 in a state where the ink of the printing material accommodation portion 450 is exhausted, the inside of the detection chamber 482 has a negative pressure. Through the inside of the detection chamber 482 having a negative pressure, the volume of the inside of the detection chamber 482 is reduced more than when at a predetermined pressure, and thus the lever member 490 is displaced. Accordingly, the rod 662 (FIG. 4) is displaced in the +Y axis direction by the impelling force exerted by the impelling member 665 (FIG. 4). As the displacement of the rod 662 (FIG. 4) accompanied by the displacement of the lever member 490 is detected by the sensor 138 (FIG. 4), the ink end state may be detected by the control unit 31. In addition, the detection chamber 482, the coil spring 496, the pressure-receiving plate 493, the film 492, and the lever member 490 constitute a detection mechanism used for detecting the ink end state on the printer 10 side. In addition, the cartridge side passage member 480 further has an injection passage 483 for injecting the ink into the printing material accommodation portion 450 from the outside. After the ink is injected into the printing material accommodation portion 450, the injection passage 483 is blocked.

A-7. Effects

First, as described with reference to FIGS. 10 to 12, in this example, the apparatus side terminal unit 70 is movable in the X axis direction and the Z axis direction. In addition, as illustrated in FIGS. 27 to 30, the cartridge 4 has the concave portion 90 into which the apparatus side terminal unit 70 is inserted. Accordingly, even in the case where the cartridge mounting unit 6 or the cartridge 4 has a manufacturing error, the apparatus side terminal unit 70 is guided into the concave portion 90 of the cartridge 4 while absorbing the error by moving when the cartridge 4 is mounted to the cartridge mounting unit 6 (FIG. 34). In addition, finally, the positioning of the apparatus side terminal group 721 and the cartridge side terminal group 521 is performed by the first and second restriction portions 906*t* and 906*w* provided in the concave portion 90. That is, during the completion of the mounting and in the mounted state, the first and second restriction portions 906*t* and 906*w* provided in the concave portion 90 of the cartridge 4 restrict the movements in the Z axis direction and the X axis direction of the first and second positioning portions 756*t* and 756*w* of the apparatus side terminal unit 70, thereby positioning the apparatus side terminal group 721 and the cartridge side terminal group 521. Therefore, contact between the apparatus side terminal group 721 and the cartridge side terminal group 521 may be properly achieved.

In addition, in the example, as illustrated in FIG. 13, the rod 662 having the center axis Cb parallel to the Y axis direction is provided at the intermediate position between the first apparatus side side wall portion 63 and the second apparatus side side wall portion 64 in the apparatus side front wall portion 62. In addition, as illustrated in FIG. 21, the rod insertion hole 420 into which the rod 662 is inserted is provided at the intermediate position in the Z axis direction between the first and second side surfaces 43 and 44 in the front surface 42 of the cartridge 4. In this embodiment, as the rod 662 is inserted into the rod insertion hole 420, positioning of the entirety of the cartridge 4 with respect to the cartridge mounting unit 6 is performed, and thus a positional deviation from the correct mounting position is suppressed. Therefore, a positional deviation in the vicinity of the rod insertion hole 420 may be properly suppressed. However, the cartridge side terminal group 521 (FIG. 21) provided in the corner portion 89 of the front surface 42 and the rod insertion hole 420 are at positions separated from each other, and thus there may be cases where it is difficult to suppress a positional deviation of such a member that is at a position separated from the rod insertion hole 420. In particular, since the cartridge 4 of this example is the large-capacity type cartridge 4 used in the printer 10 for large-sized printing, the size thereof is large, and the cartridge side terminal group 521 and the rod insertion hole 420 are at the positions somewhat separated from each other. However, as described above, by employing the configurations of the apparatus side terminal unit 70 that is movable in the X axis direction and the Z axis direction and the concave portion 90 into which the apparatus side terminal unit 70 is inserted; positioning of the cartridge side terminal group 521 and the apparatus side terminal group 721 may be performed with good accuracy. That is, according to this example, even with the large capacity type cartridge 4 having a large size, it is possible to position the apparatus side terminal group 721 and the cartridge side terminal group 521 while performing the positioning of the entirety of the cartridge 4 and absorbing a manufacturing error in the cartridge 4.

In addition, in this embodiment, the printing material supply tube 642 is provided between the rod 662 and the apparatus side terminal unit 70 (FIG. 13). In addition, the supply tube insertion hole 424 into which the printing material supply tube 642 is inserted is provided between the rod insertion hole 420 and the concave portion 90 (FIG. 21). That is, the printing material supply tube 642 is provided at a position close to the rod 662. In addition, the supply tube insertion hole 424 is provided at a position close to the rod insertion hole 420. Therefore, a positional deviation between the printing material supply tube 642 and the supply tube insertion hole 424 may be properly suppressed.

In addition, as illustrated in FIG. 18, the apparatus side terminal group 721 is provided on the surface 724*fa* tilted in a direction including the +Y axis direction component and the −Z axis direction component. In addition, as illustrated in FIG. 29, the cartridge side terminal group 521 is provided on the tilted surface 50*fa* tilted in the direction including the −Y axis direction component and the +Z axis direction component. That is, both the apparatus side terminal group 721 and the cartridge side terminal group 521 are provided on the surfaces tilted with the same tilt in the −Y axis direction which is the insertion direction of the cartridge 4 into the cartridge mounting unit 6. As previously described with reference to FIGS. 33 to 36, when the cartridge 4 is inserted into the cartridge mounting unit 6, the cartridge 4 proceeds in the −Y axis direction. Here, the cartridge side terminal group 521 also proceeds in the −Y axis direction and slowly approaches the apparatus side terminal group 721. However, the two do not come into contact with each other immediately before completing the mounting. In the final stage of the mounting, after the apparatus side terminal unit 70 is inserted into the concave portion 90 of the cartridge 4, the apparatus side terminal group 721 and the cartridge side terminal group 521 slightly rub against each other immediately before completing the mounting (FIGS. 35 and 36). In addition, during the completion of the mounting and in the mounted state, the first and second restriction portions 906*t* and 906*w* provided in the concave portion 90 of the cartridge 4 restrict the movements in the Z axis direction and the X axis direction of the first and second positioning portions 756*t* and 756*w* of the apparatus side terminal unit 70, thereby positioning the apparatus side terminal group 721 and the cartridge side terminal group 521. As such, while the apparatus side terminal group 721 and the cartridge side terminal group 521 rarely rub against each other during the mounting of the cartridge 4, the apparatus side terminal group 721 and the cartridge side terminal group 521 rub slightly against each other immediately before completing the mounting of the cartridge 4, thereby reducing the possibility of shavings being generated as the apparatus side terminal group 721 rubs against the case 9 and the like of the cartridge 4 during the mounting of the cartridge 4. In addition, even in a case where dust is present in the vicinity of the apparatus side terminal group 721 and is interposed between the apparatus side terminal group 721 and the cartridge side terminal group 521, the apparatus side terminal group 721 comes into contact while linearly rubbing on the surface of the cartridge side terminal group 521 and thus an effect of discharging the dust from the contact portion (a wiping effect) is exhibited, thereby reducing the possibility of dust being interposed between the apparatus side terminal group 721 and the cartridge side terminal group 521.

In addition, according to the above-described example, as illustrated in FIGS. 16, 17, and 36, the end portions on the +Z axis direction side of the first and second positioning portions 756*t* and 756*w* of the apparatus side terminal unit 70 are provided with the A surfaces 756*ta* and 756*wa*, and the end portions on the −Z axis direction side thereof are provided with the B surfaces 756*tb* and 756*wa*. In addition, as illustrated in FIGS. 28 to 30 and 36, the grooves 906*t* and 906*w* as the first and second restriction portions provided in the concave portion 90 are respectively provided with the A surfaces 942 and 962 and the B surfaces 946 and 966. As illustrated in FIG. 36, the A surfaces 942 and 962 of the grooves 906*t* and 906*w* come into contact with the A surfaces 756*ta* and 756*wa* provided at the end portions on the +Z axis direction side of the first and second positioning portions 756*t* and 756*w* in the mounted state. The B surfaces 946 and 966 of the grooves 906*t* and 906*w* come into contact with the B surfaces 756*tb* and 756*wb* provided at the end portions on the −Z axis direction side of the first and second positioning portions 756*t* and 756*w* in the mounted state. That is, the first and second restriction portions 906*t* and 906*w* restrict the movements in the ±Z direction of the first and second positioning portions 756*t* and 756*w*. Accordingly, positioning in the Z axis direction of the cartridge side terminal group 521 with respect to the apparatus side terminal group 721 may be performed with good accuracy. Therefore, contact between the apparatus side terminal group 721 and the cartridge side terminal group 521 may be more properly achieved. Moreover, since the apparatus side terminal unit 70 is able to be held on both sides in the +Z axis direction and the −Z axis direction, even when vibration or impacts from the outside are exerted during the use of the printer 10, a deviation of the contact position between the apparatus side terminal group 721 and the cartridge side terminal group 521 due to the vibration and impacts may be suppressed.

Moreover, according to the above-described example, as illustrated in FIGS. 16, 17, 27, and 28, the movement in the +X axis direction of the first positioning portion 756*t* is restricted by the contact with the first groove 906*t* as the first restriction portion, and the movement in the −X axis direction of the second positioning portion 756*w* is restricted by the contact with the second groove 906*w* as the second restriction portion. That is, the movements in the ±X axis direction of the apparatus side terminal unit 70 are restricted by the first groove 906*t* and the second groove 906*w*. Accordingly, positioning in the X axis direction of the cartridge side terminal group 521 with respect to the apparatus side terminal group 721 may be performed with good accuracy. Therefore, contact between the apparatus side terminal group 721 and the cartridge side terminal group 521 may be more properly achieved. Moreover, since the apparatus side terminal unit 70 is able to be held on both sides in the +X axis direction and the −X axis direction, even when vibration or impacts from the outside are exerted during the use of the printer 10, a deviation of the contact position between the apparatus side terminal group 721 and the cartridge side terminal group 521 due to the vibration and impacts may be further suppressed.

Moreover, in the above-described example, as illustrated in FIGS. 28 to 30 and 36, the grooves 906*t* and 906*w* as the first and second restriction portions respectively have the D surfaces 948 and 968 that come into contact with the D surfaces 756*td* and 756*wd* of the end portions on the +Y axis direction side of the first and second positioning portions. Accordingly, the apparatus side terminal unit 70 may be prevented from strongly impacting the bottom wall 988 in the cartridge concave portion 90 due to proceeding to far in the +Y axis direction when the cartridge 4 is inserted into the cartridge mounting unit 6. Accordingly, the apparatus side terminal unit 70 may be prevented from being broken.

In addition, in the above-described example, as illustrated in FIGS. 27 to 30, since the grooves 906*t* and 906*w* are respectively formed in the first and second side walls 902*t* and 902*w*, the first and second restriction portions for restricting the movements of the first and second positioning portions 756*t* and 756*w* may be easily formed. In addition, in this embodiment, as illustrated in FIGS. 27 to 30, the constituent elements of the cartridge 4 attached and detached by the user are the grooves 906, and as illustrated in FIGS. 15 and 17, the constituent elements of the cartridge mounting unit 6 which is stationary are the protruding members 756. Therefore, the possibility of the printer 10 or the cartridge 4 being damaged as the first and second restriction portions 906*t* and 906*w* of the cartridge 4 impact on the constituent members of the printer 10 during attaching and detaching may be reduced.

In addition, in the above-described embodiment, as illustrated in FIGS. 29, 30, and 33 to 36, the first and second restriction portions 906*t* and 906*w* respectively include the entrance parts 916*t* and 916*w* which extend in the +Y axis direction from the openings 941 and 961 provided at the end surfaces on the −Y axis direction side and of which the dimensions in the Z axis direction are decreased in the +Y axis direction. That is, the entrance parts 916*t* and 916*w* are provided to be tapered by being gradually decreased in the dimensions in the Z axis direction. Accordingly, even in a case where the cartridge 4 or the cartridge mounting unit 6 has a manufacturing error in the Z axis direction, the restriction portion 906 provided in the concave portion 90 of the cartridge 4 easily guides the positioning portion 756 of the apparatus side terminal unit 70 that is movable in the Z axis direction (FIG. 34). In addition, the first and second restriction portions 906*t* and 906*w* have the contact parts 926*t* and 926*w* that extend from the end portions in the +Y axis direction of the entrance parts 916*t* and 916*w*, have constant dimensions in the Z axis direction, and respectively come into contact with the first and second positioning portions 745*t* and 745*w* in the mounted state. Accordingly, as the positioning portions 745*t* and 745*w* of the apparatus side terminal unit 70 are guided to the entrance parts 916*t* and 916*w* and thereafter advance to the contact parts 926*t* and 926*w*, positioning of the apparatus side terminal group 721 with respect to the cartridge side terminal group 521 may be performed with good accuracy.

In addition, as illustrated in FIG. 28, in the above-described example, the dimensions in the X axis direction of the entrance part 916 are decreased in the +Y axis direction from the −Y axis direction. Accordingly, even in the case where the cartridge 4 or the cartridge mounting unit 6 has a manufacturing error in the X axis direction, the restriction portion 906 may easily guide the positioning portion 756. However, since the dimension (width) in the X axis direction of each of the slots of the cartridge 4 or the cartridge mounting unit 6 is significantly smaller than the dimension in the Z axis direction thereof, it is thought that the manufacturing error in the X axis direction is relatively smaller than the manufacturing error in the Z axis direction. Therefore, it is possible to sufficiently achieve an effect of facilitating the guiding of the positioning portions 756*t* and 756*w* only by providing the tapered portions in the Z axis direction of the entrance parts 916, without providing the tapered portions in the X axis direction.

Moreover, as illustrated in FIGS. 28 to 30, in this embodiment, the entrance parts 902*wa* and 902*ta* of the side walls 902*w* and 902*t* of the concave portion 90 also have the tapered shapes to correspond to the entrance parts 916*t* and 916*w*. That is, the distance (the interval in the X axis direction) between the side walls 902*w* and 902*t* at the parts of the entrance parts 902*wa* and 902*ta* is reduced in the +Y axis direction from the −Y axis direction. As such, by widening the openings that receive the apparatus side terminal unit 70 in the entrance parts 902*wa* and 902*ta* of the concave portion 90, it is possible to easily guide the apparatus side terminal unit 70 to the concave portion 90 of the cartridge 4.

In addition, as illustrated in FIG. 27, in the above-described embodiment, at both side parts in the X axis direction of the surface 50*fa* in the bottom wall 988 of the concave portion 90, that is, between the tilted surface 50*fa* provided with the cartridge side terminal group 521 and the first and second side walls 902*t* and 902*w* of the concave portion 90, the pair of bottom wall side concave portions 910*t* and 910*w* into which parts of the holder are inserted are provided. Due to the pair of bottom wall side concave portions 910*t* and 910*w*, approximately triangular surfaces are exposed on the +X axis direction side and the −X axis direction side of the cartridge side terminal group 521. Accordingly, in the case where the cartridge side terminal group 521 is provided on the circuit board 50, it is possible to easily perform mounting or removal of the circuit board 50. In addition, as illustrated in FIG. 16, the pair of protrusions 759*t* and 759*w* are provided on the +X axis direction side and the −X axis direction side of the apparatus side terminal group 721 so as to protrude in the direction including the +Y axis direction component and the −Z axis direction component with respect to the surface 724*fa*. The bottom wall side concave portions 910*t* and 910*w* provided in the concave portion 90 are spaces that respectively receive the protrusions 759*t* and 759*w*. In addition, as the protrusions 759*t* and 759*w* are received by the bottom wall side concave portions 910*t* and 910*w*, in addition to positioning of or suppressing of a positional deviation between the cartridge side terminal group 521 and the apparatus side terminal group 721 by the restriction portion 906 and the positioning portion 756, it is possible to position the two or suppress a positional deviation therebetween even at the positions close to the cartridge side terminal group 521 and the apparatus side terminal group 721. Accordingly, contact between the apparatus side terminal group 721 and the cartridge side terminal group 521 may be more properly achieved.

In addition, in the above-described embodiment, as illustrated in FIG. 28, elements that constitute each of the circuit board 50 and the concave portion 90 are provided to be symmetrical with respect to the YZ plane 28*c* that constitutes the center of the dimension in the X axis direction of the cartridge 4. In addition, although not shown in FIG. 28, the YZ plane 28*c* passes through the centers of the dimensions (widths) in the Z axis direction of the first locking portion 436 (FIG. 25) provided in the first side surface 43 and the second locking portion 446 (FIG. 25) provided in the second side surface 44. In addition, the leaf springs 684 and 604 (FIGS. 6 and 7) that lock the first locking portion 436 and the second locking portion 446 intersect the YZ plane 28*c*. Therefore, a force is exerted by the apparatus side terminal unit 70, the leaf springs 604 and 684 (FIGS. 6 and 7), and the like on the cartridge 4 with a good balance in the state where the cartridge 4 is mounted to the cartridge mounting unit 6, and thus the cartridge 4 is not easily tilted. Even according to this, it is possible to more properly achieve contact between the apparatus side terminal group 721 and the cartridge side terminal group 521.

In addition, in the above-described embodiment, the cartridge mounting unit 6 has the holder 750 that holds the terminal block 724 (FIGS. 14 to 16). That is, in the above-described embodiment, the terminal block 724 is not directly mounted to the apparatus side front wall portion 62 but is mounted to the apparatus side front wall portion 62 via the holder 750. Therefore, the terminal block 724 and the apparatus side terminal group 721 are components having excellent versatility. That is, there may be cases where the positioning portion 756 for positioning the apparatus side terminal group 721 and the cartridge side terminal group 521 varies depending on the specification of the cartridge 4 or the printer 10. The positioning portion 756 that needs a design change is not provided in the terminal block 724 but is provided in the holder 750, and thus the shapes of the terminal block 724 and the apparatus side terminal group 721 held in the terminal block 724 may be made constant. Accordingly, the terminal block 724 and the apparatus side terminal group 721 are components having excellent versatility.

B. Modified Embodiment of Restriction Portion

Figure 38A:
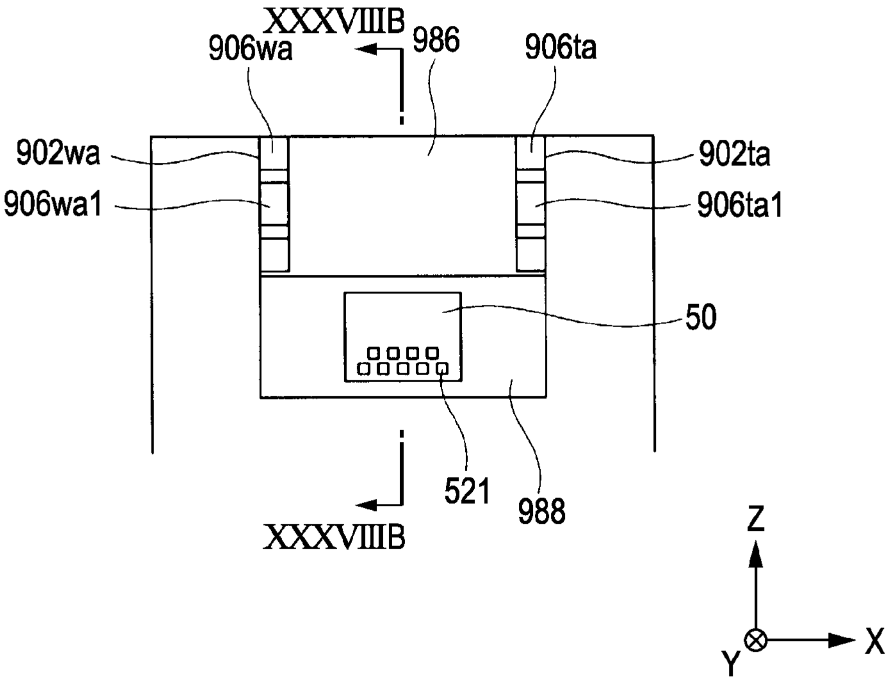
FIG. 38A is a front view of a first modified embodiment.
Figure 46A:
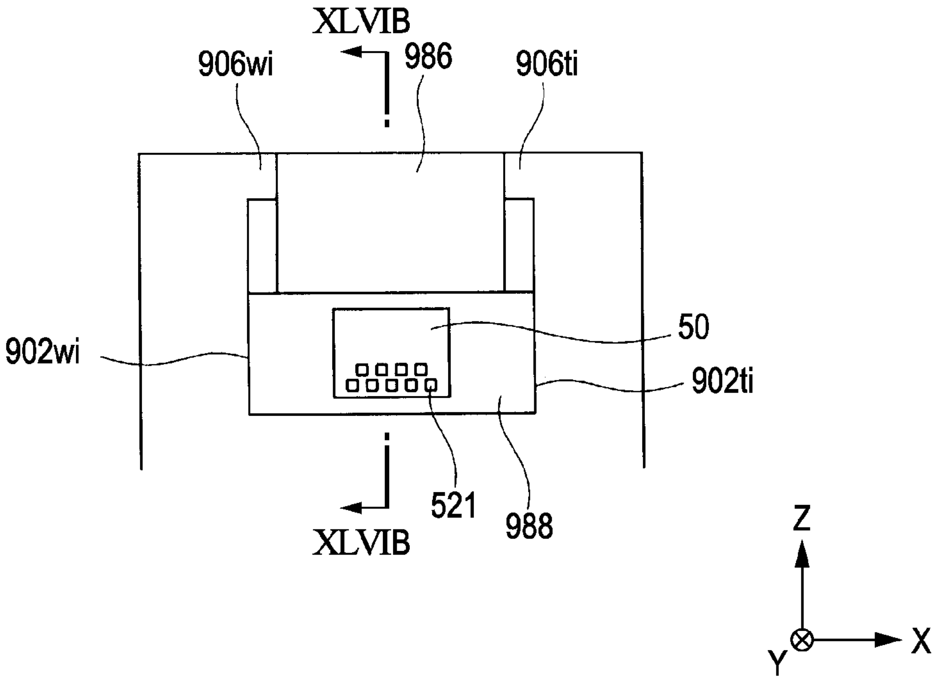
FIG. 46A is a front view of a ninth modified embodiment.
Figure 46B:
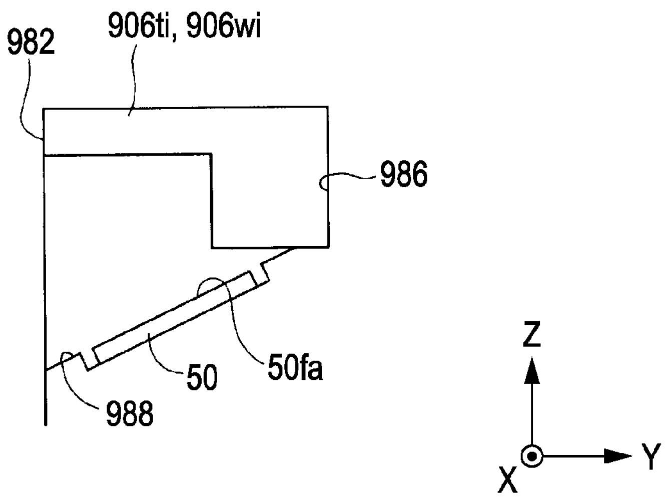
FIG. 46B is a cross-sectional view taken along the line XXXXVIB-XXXXVIB of FIG. 46A.

FIGS. 38A to 46B are schematic diagrams illustrating various modified embodiments of the restriction portion provided in the concave portion 90. FIG. 38A is a front view of a first modified embodiment. FIG. 38B is a cross-sectional view taken along the line XXXVIIIB-XXXVIIIB of FIG. 38A. FIG. 39A is a front view of a second modified embodiment. FIG. 39B is a cross-sectional view taken along the line XXXIXB-XXXIXB of FIG. 39A. FIG. 40A is a front view of a third modified embodiment, and FIG. 40B is a cross-sectional view taken along the line XXXXB-XXXXB of FIG. 40A. FIG. 41A is a front view of a fourth modified embodiment. FIG. 41B is a cross-sectional view taken along the line XXXXIB-XXXXIB of FIG. 41A. FIG. 42A is a front view of a fifth modified embodiment. FIG. 42B is a cross-sectional view taken along the line XXXXIIB-XXXXIIB of FIG. 42A. FIG. 43A is a front view of a sixth modified embodiment. FIG. 43B is a cross-sectional view taken along the line XXXXIIIB-XXXXIIIB. FIG. 44A is a front view of a seventh modified embodiment. FIG. 44B is a cross-sectional view taken along the line XXXXIVB-XXXXIVB of FIG. 44A. FIG. 45A is a front view of an eighth modified embodiment. FIG. 45B is a cross-sectional view taken along the line XXXXVB-XXXXVB of FIG. 45A. FIG. 46A is a front view of a ninth modified embodiment. FIG. 46B is a cross-sectional view taken along the line XXXXVIB-XXXXVIB of FIG. 46A. In FIGS. 38A to 46B, the front views schematically illustrate the concave portion 90 and the vicinity thereof, and the cross-sectional views schematically illustrate the concave portion 90 and the vicinity thereof. Regarding all the modified embodiments of FIGS. 38A to 46B, the configurations other than the configuration of the restriction portion into which the positioning portion 756 of the holder 750 is inserted are the same as those of the first example. In addition, in FIGS. 38A to 46B, like elements in the same configurations as those of the first example are denoted by like reference numerals, and description thereof will be omitted. In addition, the configuration of the printer 10 is the same as the configuration of the first example. In addition, since the first and second restriction portions have the same shape, in the cross-sectional views in FIGS. 38A to 46B, for ease of understanding, the reference numerals illustrating the first restriction portion in addition to the reference numerals illustrating the second restriction portion are described together.

In all the modified embodiments of FIGS. 38A to 46B, convex portions that protrude in the −X axis direction from the first side wall of the concave portion 90 and convex portions that protrude in the +X axis direction from the second side wall are provided, and the first and second restriction portions are configured by the convex portions. The convex portions may be provided separately from the first and second side walls of the concave portion 90 and may also be provided integrally.

Figure 38B:
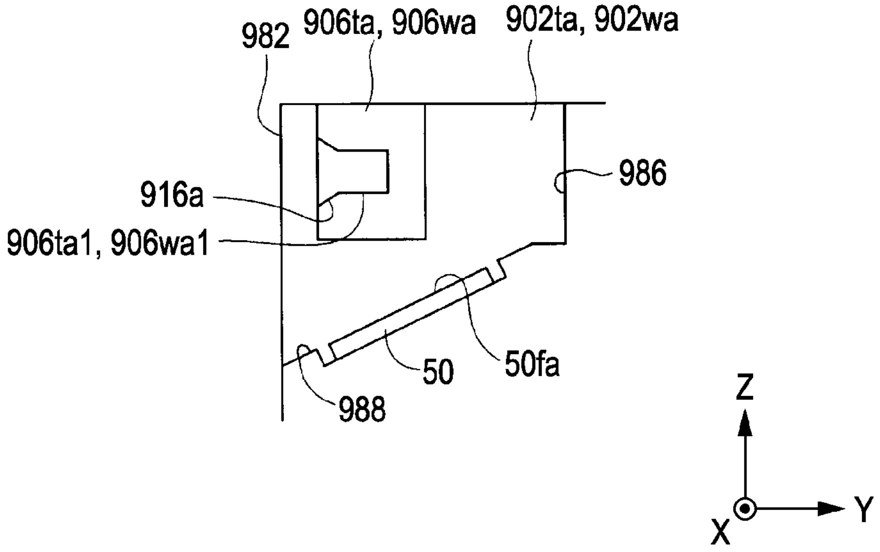
FIG. 38B is a cross-sectional view taken along the line XXXVIIIB-XXXVIIIB of FIG. 38A.

In the first modified embodiment illustrated in FIGS. 38A and 38B, grooves 906*ta*1 and 906*wa*1 having shapes similar to those of the first example are formed by convex portions 906*ta* and 906*wa* and side walls 902*ta* and 902*wa*, and the positioning portions 756*t* and 756*w* of the apparatus side terminal unit 70 are inserted into the grooves 906*ta*1 and 906*wa*1. Entrance parts 916*a* of the grooves 906*ta*1 and 906*wa*1 are provided with tapered shapes only in the Z axis direction. Restriction of the movements in the fZ direction of the positioning portions 756*t* and 756*w* of the apparatus side terminal unit 70 is performed by A surfaces (surfaces on the +Z axis direction side) and B surfaces (surfaces on the −X axis direction side) of the grooves 906*ta*1 and 906*wa*1, and restriction of the movements in the +Y axis direction is performed by D surfaces (surfaces on the +Y axis direction side) of the grooves 906*ta*1 and 906*wa*1. Restriction of the movements in the +X axis direction is performed by C surfaces formed by the side walls 902*ta* and 902*wa*. That is, the C surfaces are formed by parts of the side walls 902*ta* and 902*wa*.

Figure 39A:
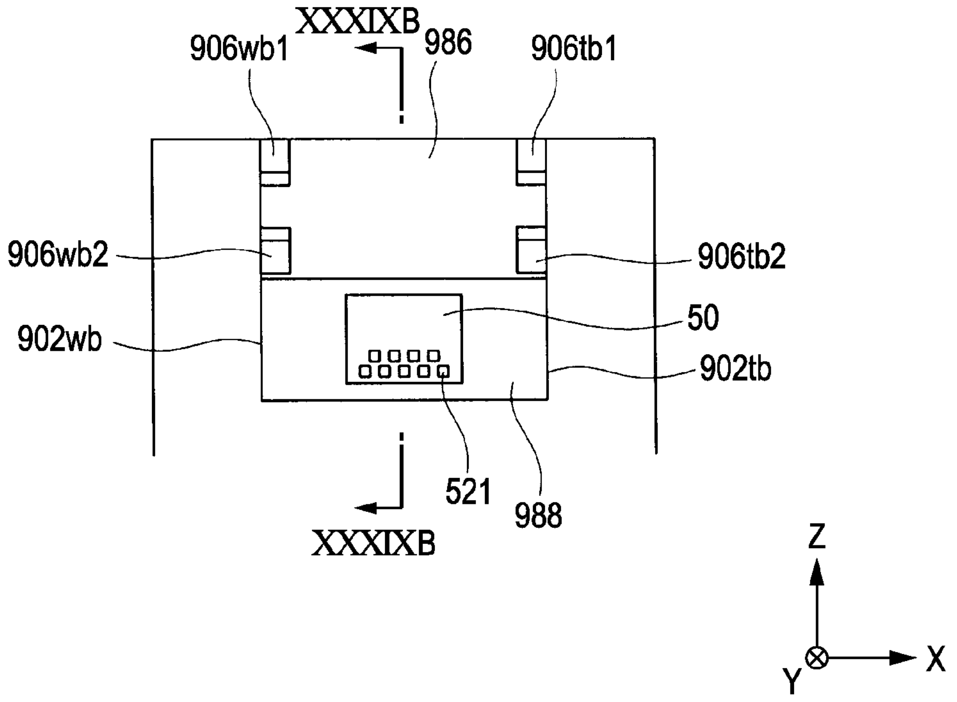
FIG. 39A is a front view of a second modified embodiment.
Figure 39B:
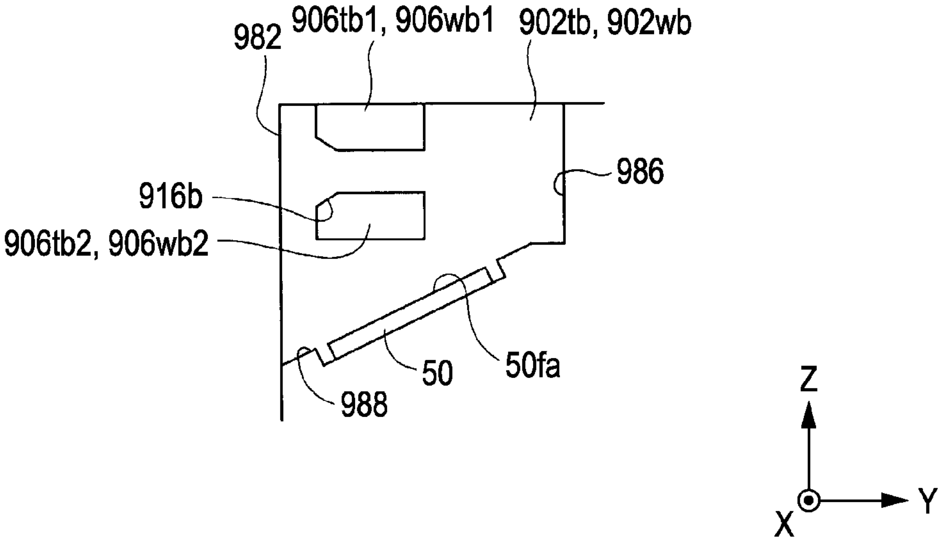
FIG. 39B is a cross-sectional view taken along the line XXXIXB-XXXIXB of FIG. 39A.

In the second modified embodiment illustrated in FIGS. 39A and 39B, a pair of convex portions 906*tb*1 and 906*tb*2 that protrude in the −X axis direction from a first side wall 902*tb* of the concave portion 90 and a pair of convex portions 906*wb*1 and 906*wb*2 that protrude in the +X axis direction from a second side wall 902*wb* are provided. The convex portions 906*tb*1, 906*tb*2, 906*wb*1, and 906*wb*2 correspond to omission of the D surfaces (the surfaces on the +Y axis direction side) from the grooves 906*ta*1 and 906*wa*1 of the first modified embodiment illustrated in FIGS. 38A and 38B. Restriction of the movements in the +Z direction of the positioning portions 756*t* and 756*w* of the apparatus side terminal unit 70 is performed by the convex portions 906*tb*1 and 906*wb*1. Restriction of the movements in the −Z direction of the positioning portions 756*t* and 756*w* of the apparatus side terminal unit 70 is performed by the convex portions 906*tb*2 and 906*wb*2. Restriction of the movements in the ±X axis direction is performed by the side walls 902*tb* and 902*wb*.

Figure 40A:
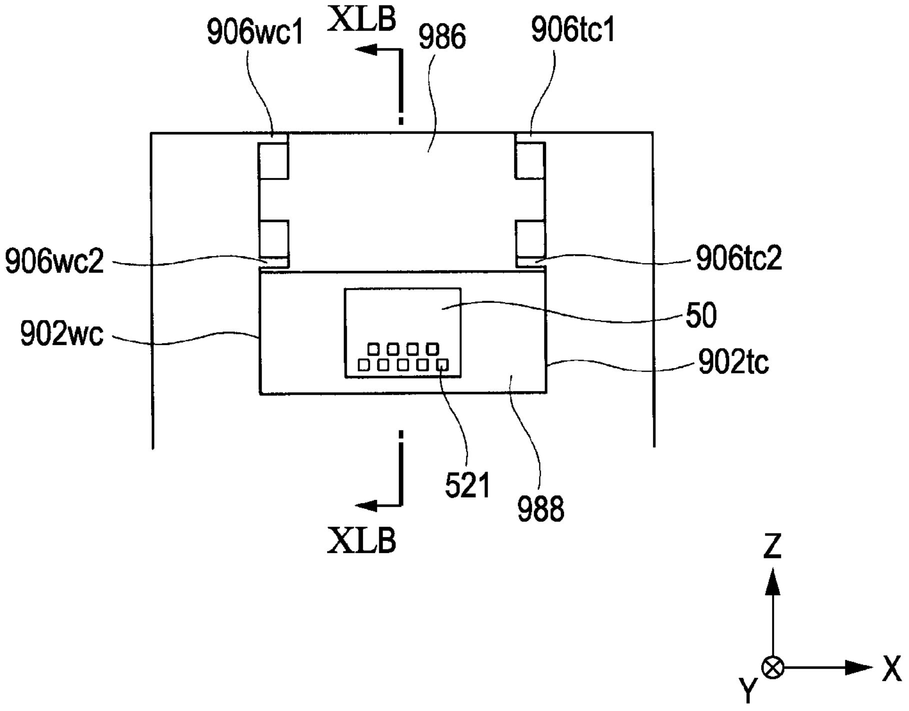
FIG. 40A is a front view of a third modified embodiment.
Figure 40B:
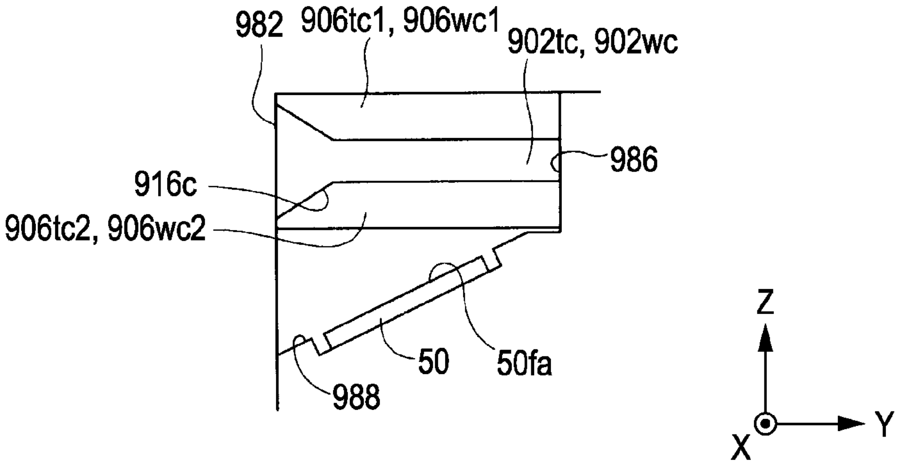
FIG. 40B is a cross-sectional view taken along the line XXXXB-XXXXB of FIG. 40A.

In the third modified embodiment illustrated in FIGS. 40A and 40B, a pair of convex portions 906*tc*1 and 906*tc*2 that protrude in the −X axis direction from a first side wall 902*tc* of the concave portion 90 and a pair of convex portions 906*wc*1 and 906*wc*2 that protrude in the +X axis direction from a second side wall 902*wc* are provided. The third modified embodiment is different from the second modified embodiment illustrated in FIGS. 39A and 39B in that the opening ends in the −Y axis direction of the convex portions 906*tc*1, 906*tc*2, 906*wc*1, and 906*wc*2 are provided at the position of the opening 982 of the concave portion 90 and the end portions in the +Y axis direction extend to the position of the rear wall 986 of the concave portion 90, but other points are common to the second modified embodiment.

Figure 41A:
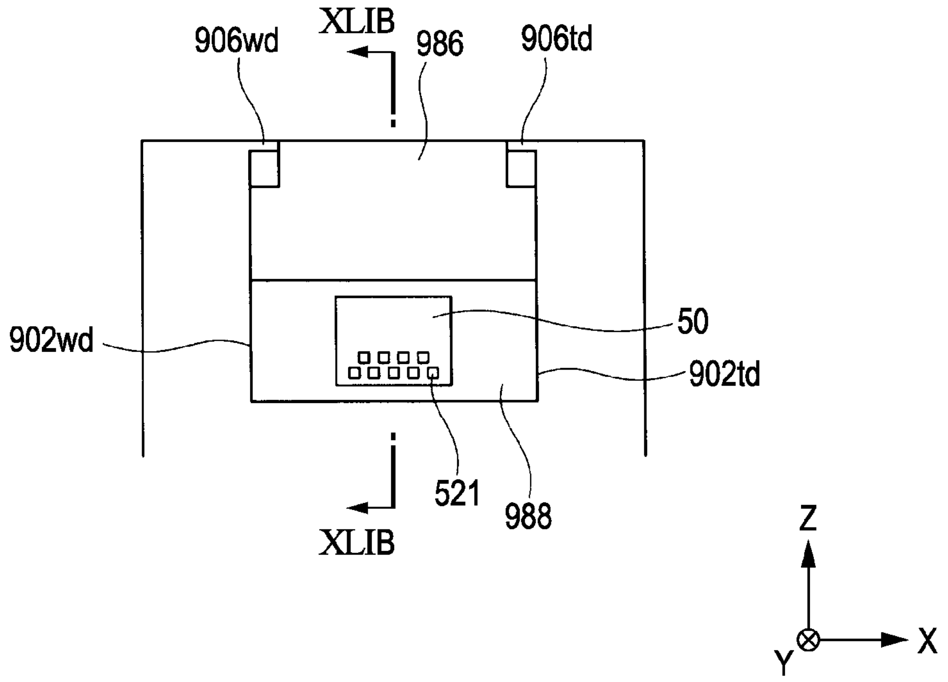
FIG. 41A is a front view of a fourth modified embodiment.
Figure 41B:
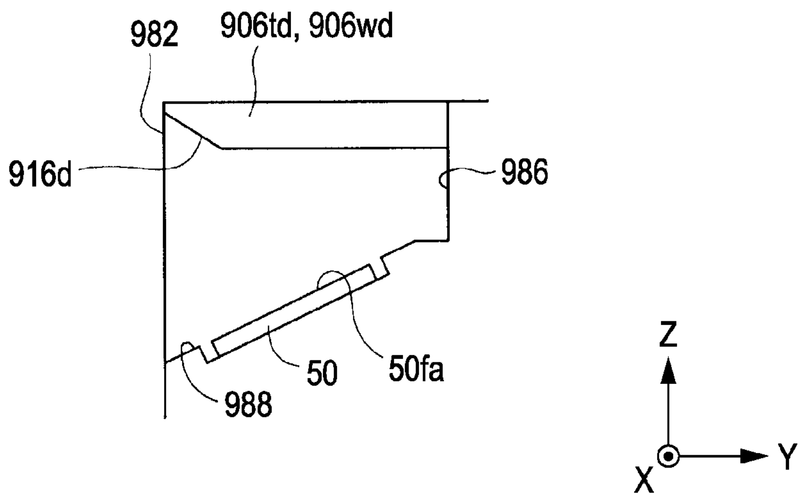
FIG. 41B is a cross-sectional view taken along the line XXXXIB-XXXXIB of FIG. 41A.

In the fourth modified embodiment illustrated in FIGS. 41A and 41B, a convex portion 906*td* that protrudes in the −X axis direction from a first side wall 902*td* of the concave portion 90 and a convex portion 906*wd* that protrudes in the +X axis direction from a second side wall 902*wd* are provided. In the fourth modified embodiment, the convex portions 906*tc*2 and 906*wc*2 that restrict the movements in the −Z axis direction of the positioning portions 756*t* and 756*w* of the apparatus side terminal unit 70 are removed from the third modified embodiment illustrated in FIGS. 40A and 40B. It is possible to restrict the movements in the +Z direction of the positioning portions 756*t* and 756*w* of the apparatus side terminal unit 70 by the convex portions 906*td* and 906*wd*. Since the movement in the −Z axis direction is restricted as the apparatus side terminal group 721 and the cartridge side terminal group 521 come into contact with each other, it is possible to omit the function of restricting the movement in the −Z axis direction. In addition, restriction in the ±X axis direction is performed by the side walls 902*td* and 902*wd*.

Figure 42A:
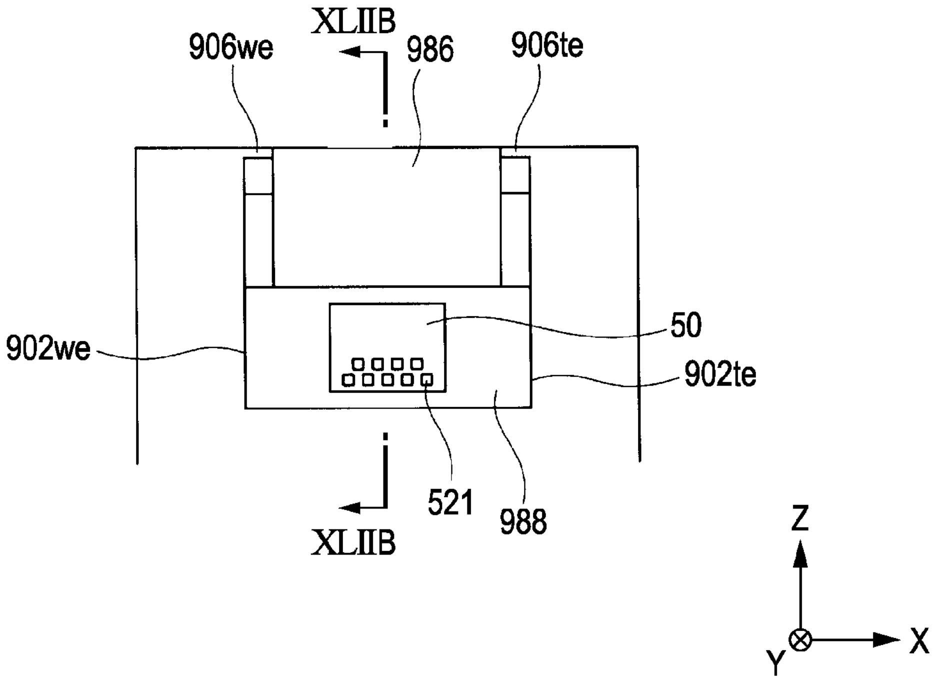
FIG. 42A is a front view of a fifth modified embodiment.
Figure 42B:
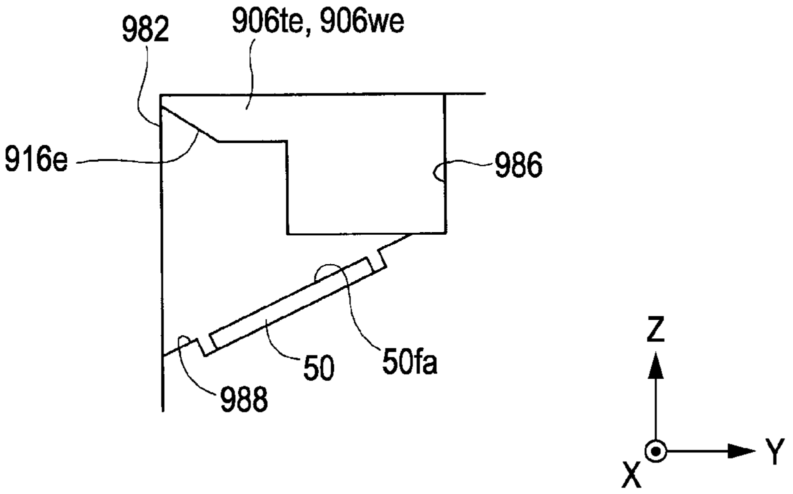
FIG. 42B is a cross-sectional view taken along the line XXXXIIB-XXXXIIB of FIG. 42A.
Figure 43A:
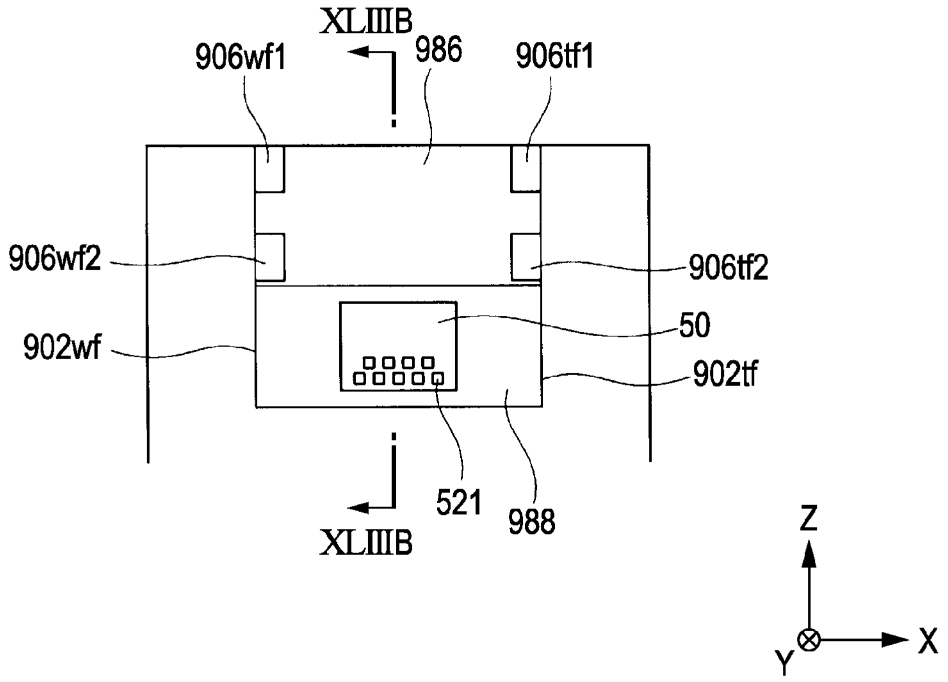
FIG. 43A is a front view of a sixth modified embodiment.
Figure 43B:
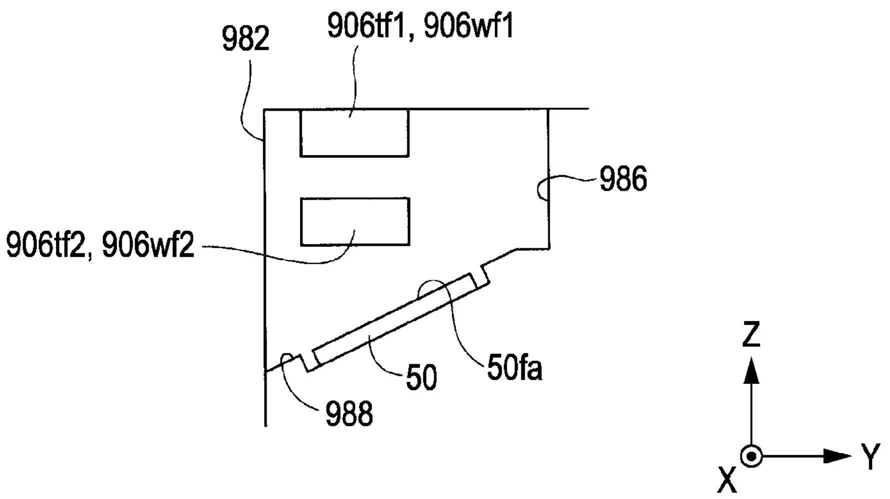
FIG. 43B is a cross-sectional view taken along the line XXXXIIIB-XXXXIIIB of FIG. 43A.
Figure 44A:
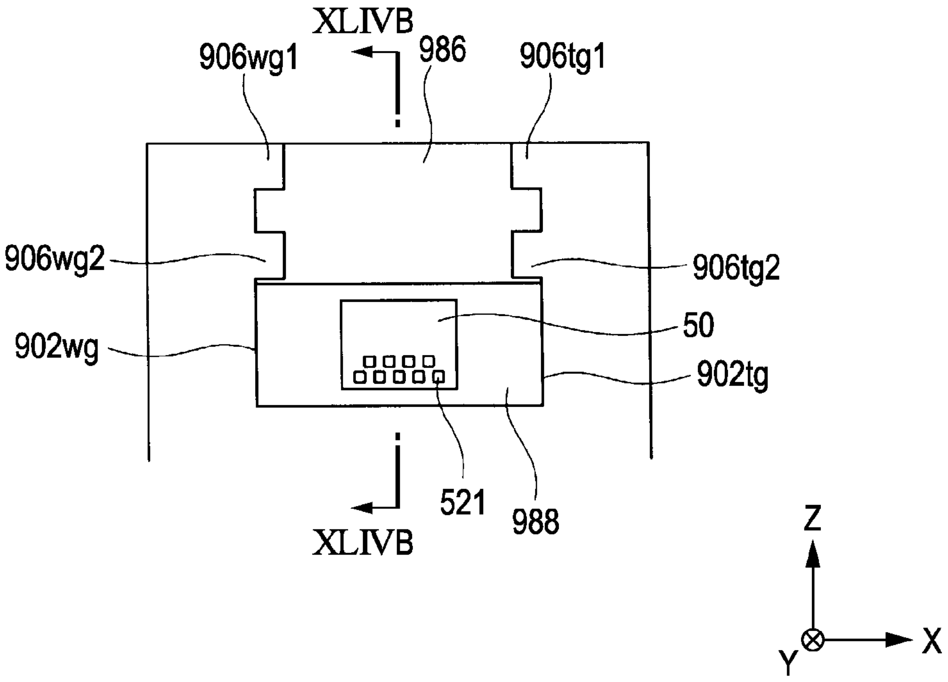
FIG. 44A is a front view of a seventh modified embodiment.
Figure 44B:
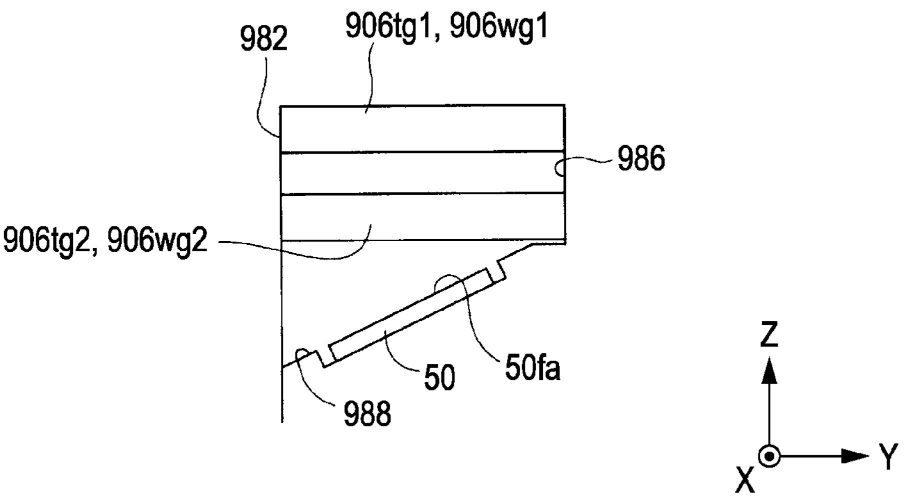
FIG. 44B is a cross-sectional view taken along the line XXXXIVB-XXXXIVB of FIG. 44A.
Figure 45A:
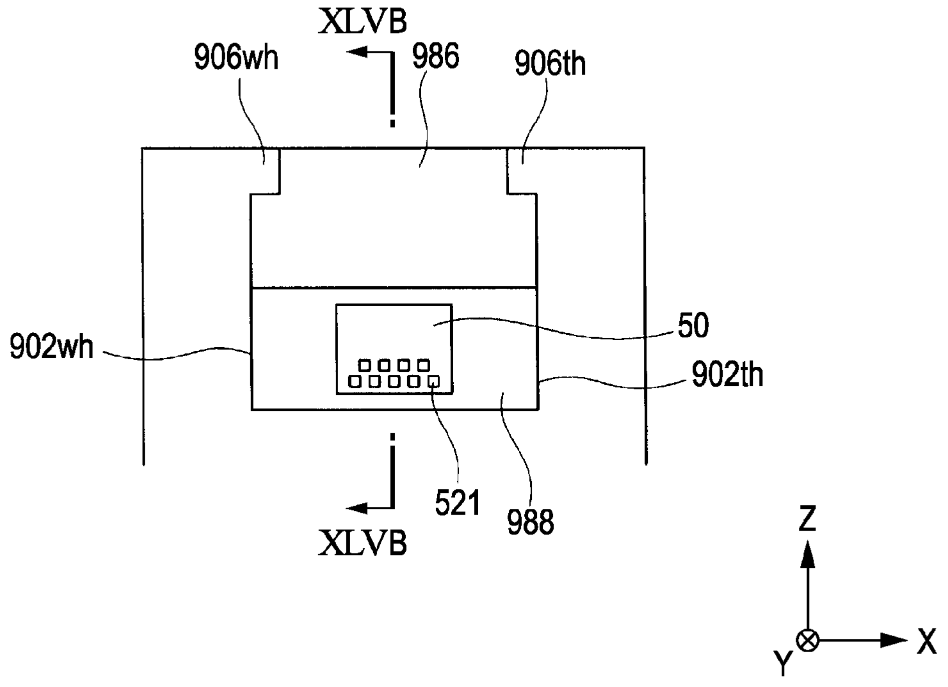
FIG. 45A is a front view of an eighth modified embodiment.
Figure 45B:
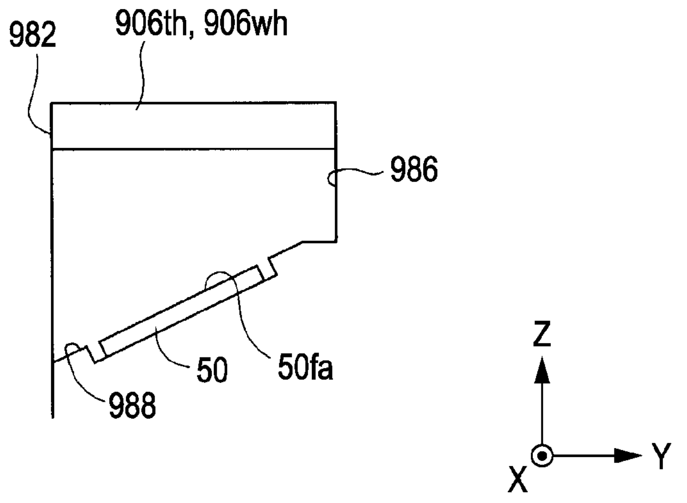
FIG. 45B is a cross-sectional view taken along the line XXXXVB-XXXXVB of FIG. 45A.

In the fifth modified embodiment illustrated in FIGS. 42A and 42B, a convex portion 906*te* that protrudes in the −X axis direction from a first side wall 902*te* of the concave portion 90 and a convex portion 906*we* that protrudes in the +X axis direction from a second side wall 902*we* are provided. In the fifth modified embodiment, D surfaces that restrict the movements in the +Y axis direction of the positioning portions 756*t* and 756*w* of the apparatus side terminal unit 70 are added to the convex portions 906*td* and 906*wd* of the fourth modified embodiment illustrated in FIGS. 41A and 41B. Other points are common to the fourth modified embodiment.

In the sixth to ninth embodiments of FIGS. 43A to 46B, the entrance parts 916*b* to 916*e* formed in the tapered shapes are respectively omitted from the second to fifth modified embodiments illustrated in FIGS. 38A to 42B. Other points are common to the second to fifth modified embodiments.

The same effects as those of the first example may also be obtained by the modified embodiments as described above. However, it is natural that the effect of the restriction of the movements in the −Z direction is not obtained by the restriction portions of the fourth, fifth, eighth, and ninth modified embodiments in which the function of restricting the movements in the −Z axis direction of the positioning portions 756*t* and 756*w* of the apparatus side terminal unit 70 is not provided, and the effect of the restriction of the movements in the +Y direction is not obtained by the restriction portions of the second to fourth and sixth to eighth modified embodiments in which the function of restricting the movements in the +Y direction is not provided. In addition, according to the above-described modified examples, since the convex portions that protrude in the X axis direction are respectively provided to the first side wall and the second side wall, the first positioning portion and the second positioning portion may be easily formed.

C. Modified Example

While the single example of the invention has been described above, the invention is not limited to the example and may employ various configurations without departing from the spirit thereof. For example, the following modifications can be made.

C-1. First Modified Example

In the above-described example, the cartridges 4 and **4*a* have the printing material accommodation portion 450. However, the case 9** may directly accommodate ink.

C-2. Second Modified Example

In the above-described example, the positioning portion 756 is provided in the holder 750. However, the positioning portion 756 may be provided in the terminal block 724 by simplifying the configuration of the holder 750. In addition, in the above-described example, the apparatus side terminal group 721 that elastically deforms is employed. However, the apparatus side terminal group 721 that does not elastically deform may be employed. Even though the apparatus side terminal group 721 does not elastically deform, the apparatus side terminal group 721 moves slightly in the +Z axis direction after coming into contact with the cartridge side terminal group 521 when being inserted into the concave portion 90, and thus there is a possibility of the above-mentioned wiping effect being obtained.

C-3. Third Modified Example

In addition, the cartridge may be configured by the following embodiment.

First Embodiment

A cartridge detachably mounted to a printing apparatus which includes a cartridge mounting unit for mounting a cartridge, an apparatus side terminal unit that has a surface tilted with respect to an insertion direction when the cartridge is mounted and an apparatus side terminal having a contact point exposed from the surface, is disposed inside the cartridge mounting unit, is the apparatus side being mounted to be movable in a direction orthogonal to the insertion direction with respect to the cartridge mounting unit, the cartridge including:

a case which has an approximately rectangular parallelepiped shape that accommodates a printing material therein and has a concave portion at a part where two surfaces from among a plurality of surfaces constituting the case intersect each other; and a cartridge side terminal which comes into contact with the contact point of the apparatus side terminal in a mounted state in which the cartridge is mounted to the cartridge mounting unit and is provided on a tilted surface that is tilted with respect to the insertion direction from among surfaces that partition and form the concave portion, wherein the concave portion is a restriction portion into which a part of the apparatus side terminal unit is inserted to restrict a movement of the apparatus side terminal unit, and into which the part of the apparatus side terminal unit is inserted before starting a contact between the cartridge side terminal and the apparatus side terminal.

Even in the cartridge of the first embodiment, the same effect as that of Application Example 1 is exhibited.

In addition, the first embodiment may employ the configurations described in any one of Application Examples 1 to 8. For example, as in Application Example 2, the restriction portion (first and second restriction portions) may include contact surfaces with which parts (first and second positioning portions) of the apparatus side terminal unit come into contact, and the contact surfaces may include a +Z axis direction side contact surface that comes into contact with a +Z axis direction side end portion of the parts of the apparatus side terminal unit, and a −Z axis direction side contact surface that comes into contact with a −Z axis direction side end portion of the parts of the apparatus side terminal unit.

In addition, for example, as in Application Example 3, the restriction portion (first and second restriction portions) may include an entrance part and a contact part.

C-4. Fourth Modified Example

The invention is not limited to the ink jet printer and the ink cartridges thereof, and can also be applied to arbitrary printing apparatuses that eject liquids other than ink and cartridges thereof. For example, the invention is able to be applied to various printing apparatuses and cartridges thereof as follows:

(1) Image recording apparatuses such as fax devices (2) Printing apparatuses that eject color materials to be used for manufacturing color filters for image display devices such as liquid crystal displays (3) Printing apparatuses that eject electrode materials to be used for forming electrodes of organic EL (electroluminescence) displays, field emission displays (FED), and the like (4) Printing apparatuses that eject liquid containing biological organic materials used for manufacturing biochips (5) Specimen printing apparatuses as precision pipettes (6) Printing apparatuses of lubricating oil (7) Printing apparatuses of resin liquids (8) Printing apparatuses that eject lubricating oil to precision machinery such as watches or cameras with pinpoint precision (9) Printing apparatuses that eject transparent resin liquids such as ultraviolet curable resin liquids onto substrates to form micro-hemispherical lenses (optical lenses) or the like used for optical communication elements or the like

(10) Printing apparatuses that eject acidic or alkaline etchants for etching substrates or the like

(11) Printing apparatuses including liquid ejecting heads that discharge a minute amount of other arbitrary liquid droplets In addition, the "liquid droplets" represent liquid states discharged from the printing apparatus, the liquid states including granular, tear-like, and thread-like shapes with trails. The "liquid" mentioned herein may be any material that can be ejected by the printing apparatus. For example, the "liquid" may be a material in a state where the material has a liquid phase, and liquid-state materials with high or low viscosities, sol, gel water, liquid-state materials such as inorganic solvents, organic solvents, solutions, liquid resin, and liquid metal (metallic melt), and the like belong to the "liquid". In addition to liquids as a state of a material, a material in which particles of functional materials made of solids such as pigments or metallic particles are dissolved, dispersed, or mixed with the solvent also belongs to the "liquid". As a representative example of the liquid, there is the ink described above in the embodiment or liquid crystals. Here, the ink may include various kinds of liquid-like compositions such as general water-based ink, oil-based ink, gel ink, and hot-melt ink.

What is claimed is:

1. A cartridge detachably mountable to a printing apparatus, assuming that three orthogonal spatial directions respectively are an X axis direction, a Y axis direction, and a Z axis direction, positive directions along the X axis direction, the Y axis direction, and the Z axis direction are a +X direction, a +Y direction, and a +Z direction, negative directions along the X axis direction, the Y axis direction, and the Z axis direction are a −X direction, a −Y direction, and a −Z direction, the printing apparatus including an apparatus side terminal unit being movable in the X axis direction and the Z axis direction, the apparatus side terminal unit having an apparatus side terminal group, and a first positioning portion and a second positioning portion provided on both sides of the apparatus side terminal group in the X axis direction, the cartridge is configured to be mounted to the printing apparatus by moving from the +Y axis direction to the −Y axis direction, the cartridge comprising:

a terminal connection portion configured to be connected to the apparatus side terminal unit when the cartridge is mounted to the printing apparatus, the terminal connection portion including:

a tilted surface tilted in a direction including the −Y axis direction component and the +Z axis direction component and provided with a cartridge side terminal group which is configured to contact the apparatus side terminal group in a mounted state in which the cartridge is mounted to the printing apparatus;

a first restriction portion provided on the +X side of the cartridge side terminal group; and a second restriction portion provided on the −X side of the cartridge side terminal group, wherein:

the first restriction portion and the second restriction portion configured to receive the first positioning portion and the second positioning portion, respectively, from the −Y axis direction to the +Y axis direction, and restrict the apparatus side terminal unit from moving in the X axis direction and the Z axis direction in the mounted state.

2. The cartridge according to claim 1, wherein the first restriction portion and the second restriction portion include a +Z axis direction side contact surface which is configured to contact a +Z axis direction end portion of a respective one of the first positioning portion and the second positioning portion in the mounted state.

3. The cartridge according to claim 1 wherein the first restriction portion and the second restriction portion include a −Z axis direction side contact surface which is configured to contact a −Z axis direction end portion of the respective one of the first positioning portion and the second positioning portion in the mounted state.

4. The cartridge according to claim 1, wherein the first restriction portion and the second restriction portion include a +Y axis direction side contact surface which is configured to contact a +Y axis direction end portion of a respective one of the first positioning portion and the second positioning portion in the mounted state.

5. The cartridge according to claim 1, wherein the first restriction portion and the second restriction portion include:

an entrance part which extends toward the +Y axis direction side from an opening provided at an end portion on the −Y axis direction side, wherein a length of the entrance part in the Z axis direction at a −Y axis direction side is longer than the length of the entrance part in the Z axis direction at a +Y axis direction side; and a contact part which extends toward the +Y axis direction side from an end portion of the entrance part at the +Y axis direction side of the entrance part, has a constant length in the Z axis direction, and is configured to contact a respective one of the first positioning portion and the second positioning portion in the mounted state.

6. The cartridge according to claim 5, wherein the opening is closer to the −Y axis direction side than the cartridge side terminal group.

7. The cartridge according to claim 5, wherein the opening is positioned such that the opening receives at least a portion of a respective one of the first and second positioning portions before the cartridge side terminal group contacts the apparatus side terminal.

8. The cartridge according to claim 5, wherein the opening is closer to the −Y axis direction side than a contact portion in the cartridge side terminal group which is configured to contact the apparatus side terminal group.

9. The cartridge according to claim 1, wherein the terminal connection portion includes a first side wall provided in a +X axis direction from the tilted surface and a second side wall provided in a −X axis direction from the tilted surface, the first restriction portion comprises a groove recessed in the +X axis direction from the first side wall, the second restriction portion comprises a groove recessed in the −X axis direction from the second side wall.

10. The cartridge according to claim 1, wherein the terminal connection portion includes a first side wall provided in a +X axis direction from the tilted surface and a second side wall provided in a −X axis direction from the tilted surface, the first restriction portion comprises a convex portion that protrudes in the −X axis direction from the first side wall, and the second restriction portion comprises a convex portion that protrudes in the +X axis direction from the second side wall.

11. The cartridge according to claim 1, wherein, in the mounted state, the +Z axis direction is opposite a gravity direction.

12. The cartridge according to claim 1, wherein the terminal connection portion is provided in a concave portion configured to receive the apparatus side terminal unit.

* * * * *